US010355283B2

United States Patent
Swiegers et al.

(10) Patent No.: US 10,355,283 B2
(45) Date of Patent: Jul. 16, 2019

(54) ELECTRO-SYNTHETIC OR ELECTRO-ENERGY CELL WITH GAS DIFFUSION ELECTRODE(S)

(71) Applicant: AquaHydrex Pty Ltd, North Wollongong (AU)

(72) Inventors: Gerhard Frederick Swiegers, Woonona (AU); Peter Gordon Symons, Buffalo, NY (US)

(73) Assignee: AQUAHYDREZ PTY LTD, North Wollongong (AU)

( * ) Notice: Subject to any disclaimer, the term of this patent is extended or adjusted under 35 U.S.C. 154(b) by 447 days.

(21) Appl. No.: 14/908,444

(22) PCT Filed: Jul. 30, 2014

(86) PCT No.: PCT/AU2014/050162
§ 371 (c)(1),
(2) Date: Jan. 28, 2016

(87) PCT Pub. No.: WO2015/013767
PCT Pub. Date: Feb. 5, 2015

(65) Prior Publication Data
US 2016/0168732 A1    Jun. 16, 2016

(30) Foreign Application Priority Data

Jul. 31, 2013 (AU) ................................ 2013902844
Dec. 10, 2013 (AU) ................................ 2013904802
(Continued)

(51) Int. Cl.
*H01M 4/86*    (2006.01)
*C25B 15/02*    (2006.01)
(Continued)

(52) U.S. Cl.
CPC ............. *H01M 4/8626* (2013.01); *C25B 1/13* (2013.01); *C25B 1/14* (2013.01); *C25B 1/245* (2013.01);
(Continued)

(58) Field of Classification Search
CPC ............. H01M 4/8626; H01M 4/8657; H01M 4/8807; H01M 8/04104
(Continued)

(56) References Cited

U.S. PATENT DOCUMENTS 3,284,243 A    11/1966    Von Sturm
3,553,029 A    1/1971    Kordesch et al.
(Continued)

FOREIGN PATENT DOCUMENTS

CA    2238738    6/1997
DE    29823321    8/1999
(Continued)

OTHER PUBLICATIONS

Bingkun Guo, et al "Chemical power sources battery principle and manufacturing technology", Central South University Press, 1st ed, Dec. 31, 2009.
(Continued)

*Primary Examiner* — James M Erwin
(74) *Attorney, Agent, or Firm* — Leydig, Voit & Mayer, Ltd.

(57) ABSTRACT

There is provided a new type of electro-synthetic (electro-chemical) or electro-energy cell, such as a fuel cell. The cell includes a liquid electrolyte and at least one gas diffusion electrode (GDE). The GDE operates as a gas depolarized electrode and includes a gas permeable material that is substantially impermeable to the liquid electrolyte, as well as a porous conductive material provided on a liquid electrolyte facing side of the gas diffusion electrode. The porous
(Continued)

conductive material can be attached to the gas permeable material by being laminated. Alternatively, the porous conductive material is deposited or coated on at least part of the gas permeable material. A depolarizing gas can be received by the at least one gas diffusion electrode to gas depolarize the electrode. The depolarizing gas changes a half-reaction that would occur at the gas diffusion electrode to a half-reaction that is energetically more favorable.

30 Claims, 19 Drawing Sheets

(30) Foreign Application Priority Data

| Dec. 10, 2013 | (AU) | ................................ | 2013904803 |
|---|---|---|---|
| Dec. 10, 2013 | (AU) | ................................ | 2013904804 |
| Dec. 10, 2013 | (AU) | ................................ | 2013904806 |

(51) Int. Cl.

| C25C 7/00 | (2006.01) |
|---|---|
| C25B 9/08 | (2006.01) |
| H01M 8/04089 | (2016.01) |
| C25B 1/13 | (2006.01) |
| C25B 1/14 | (2006.01) |
| C25B 1/24 | (2006.01) |
| C25B 1/26 | (2006.01) |
| C25B 1/30 | (2006.01) |
| C25B 3/00 | (2006.01) |
| C25B 11/03 | (2006.01) |
| H01M 8/08 | (2016.01) |
| H01M 4/88 | (2006.01) |
| H01M 8/083 | (2016.01) |

(52) U.S. Cl.
CPC ............... *C25B 1/26* (2013.01); *C25B 1/265* (2013.01); *C25B 1/30* (2013.01); *C25B 3/00* (2013.01); *C25B 9/08* (2013.01); *C25B 11/035* (2013.01); *C25B 15/02* (2013.01); *C25C 7/00* (2013.01); *H01M 4/8605* (2013.01); *H01M 4/8807* (2013.01); *H01M 8/04104* (2013.01); *H01M 8/08* (2013.01); *H01M 8/083* (2013.01); *H01M 2300/0011* (2013.01); *Y02E 60/366* (2013.01)

(58) Field of Classification Search
USPC .................................................. 429/500, 516
See application file for complete search history.

(56) References Cited

U.S. PATENT DOCUMENTS

| 3,697,410 | A | | 10/1972 | Johnson et al. |
|---|---|---|---|---|
| 3,854,994 | A | | 12/1974 | Binder et al. |
| 3,923,629 | A | | 12/1975 | Shaffer |
| 4,048,383 | A | | 9/1977 | Clifford |
| 4,091,176 | A | | 5/1978 | Alfenaar |
| 4,431,494 | A | * | 2/1984 | McIntyre ............... C25B 1/30 205/465 |
| 4,568,442 | A | | 2/1986 | Goldsmith |
| 4,581,116 | A | | 4/1986 | Plowman et al. |
| 4,586,999 | A | | 5/1986 | Goldsmith et al. |
| 4,722,773 | A | | 2/1988 | Plowman et al. |
| 4,865,925 | A | | 9/1989 | Ludwig et al. |
| 5,242,765 | A | | 9/1993 | Naimer et al. |
| 5,300,206 | A | | 4/1994 | Allen et al. |
| 5,336,570 | A | | 8/1994 | Dodge |
| 5,376,253 | A | | 12/1994 | Rychen et al. |
| 5,396,253 | A | | 3/1995 | Chia |
| 5,423,967 | A | | 6/1995 | Kunimatsu et al. |
| 5,538,608 | A | | 7/1996 | Furuya |
| 6,203,676 | B1 | | 3/2001 | Phillips et al. |
| 6,368,473 | B1 | | 4/2002 | Furuya et al. |
| 6,733,639 | B2 | | 5/2004 | Busse et al. |
| 7,229,944 | B2 | | 6/2007 | Shao-Horn et al. |
| 7,326,329 | B2 | | 2/2008 | Gomez |
| 7,651,602 | B2 | | 1/2010 | Helmke et al. |
| 8,182,959 | B2 | * | 5/2012 | Du ..................... H01M 8/10 429/497 |
| 2002/0150812 | A1 | | 10/2002 | Kaz et al. |
| 2003/0035990 | A1 | | 2/2003 | Washima |
| 2005/0036941 | A1 | | 2/2005 | Bae et al. |
| 2005/0106450 | A1 | | 5/2005 | Castro et al. |
| 2006/0228606 | A1 | * | 10/2006 | Fiebig ................. H01M 8/0297 429/410 |
| 2007/0131556 | A1 | | 6/2007 | Lambie |
| 2007/0246351 | A1 | | 10/2007 | Smola et al. |
| 2008/0070076 | A1 | | 3/2008 | Makita et al. |
| 2008/0155813 | A1 | | 7/2008 | Dopp et al. |
| 2009/0078568 | A1 | | 3/2009 | Ramaswami et al. |
| 2009/0101521 | A1 | | 4/2009 | Bayer et al. |
| 2009/0162714 | A1 | | 6/2009 | Nakanishi et al. |
| 2009/0165933 | A1 | | 7/2009 | Losch et al. |
| 2009/0272648 | A1 | | 11/2009 | Pratt |
| 2009/0305084 | A1 | | 12/2009 | Crookes et al. |
| 2010/0314261 | A1 | | 12/2010 | Perry |
| 2011/0229790 | A1 | | 9/2011 | Sato et al. |
| 2011/0253526 | A1 | | 10/2011 | McAlister |
| 2012/0021303 | A1 | | 1/2012 | Amendola et al. |
| 2012/0028154 | A1 | * | 2/2012 | Owejan ............... H01M 4/8626 429/434 |
| 2012/0149789 | A1 | | 6/2012 | Greenbaum |
| 2012/0183879 | A1 | * | 7/2012 | Okada ................. H01M 4/8605 429/480 |
| 2012/0237848 | A1 | * | 9/2012 | Mittelsteadt ............ C25B 13/04 429/480 |
| 2012/0308807 | A1 | | 12/2012 | Edwards |
| 2012/0308903 | A1 | * | 12/2012 | Masel ..................... H01M 4/92 429/409 |
| 2013/0017414 | A1 | | 1/2013 | He |
| 2013/0092532 | A1 | | 4/2013 | Monzyk et al. |
| 2013/0183591 | A1 | | 7/2013 | Dickson |
| 2013/0189592 | A1 | | 7/2013 | Roumi et al. |
| 2013/0209919 | A1 | | 8/2013 | Amendola et al. |

FOREIGN PATENT DOCUMENTS

| EP | 1449292 | 8/2004 |
|---|---|---|
| EP | 1843415 | 10/2007 |
| EP | 1658652 | 1/2011 |
| GB | 1542690 | 3/1979 |
| JP | 2004-250736 | 9/2004 |
| WO | WO 2002/014224 | 2/2002 |
| WO | WO 2003/035939 | 5/2003 |
| WO | WO 2003/042430 | 5/2003 |
| WO | WO 2003/047011 | 6/2003 |
| WO | WO 2009/015127 | 1/2009 |
| WO | WO 2011/089904 | 7/2011 |
| WO | WO 2011/094295 | 8/2011 |
| WO | WO 2011/146558 | 11/2011 |
| WO | WO 2012/012558 | 1/2012 |
| WO | WO 2012/021550 | 2/2012 |
| WO | WO 2012/075546 | 6/2012 |
| WO | WO 2012/122600 | 9/2012 |
| WO | WO 2013/037902 | 3/2013 |
| WO | WO 2013/185170 | 12/2013 |
| WO | WO 2014/088628 | 6/2014 |

OTHER PUBLICATIONS

Zhaoxian Zhang, et al "Titanium electrode reaction engineering", Beijing Metallurgical Industry Press, 1st ed, Apr. 30, 2009.
International Search Report and Written Opinion for International Application No. PCT/AU2014/050162 dated Nov. 6, 2014.
Winther-Jensen et al., "Towards hydrogen production using a breathable electrode structure to directly separate gases in the water

(56) References Cited

OTHER PUBLICATIONS splitting reaction," International Journal of Hydrogen Energy, May 2012, pp. 8185-8189, vol. 37, No. 10, Elsevier Ltd.

* cited by examiner

ELECTRO-SYNTHETIC OR ELECTRO-ENERGY CELL WITH GAS DIFFUSION ELECTRODE(S)

TECHNICAL FIELD

The present invention relates to electro-synthetic or electro-energy cells, such as an electrochemical cell or a fuel cell, with one or more electrodes that can be gas depolarized, and to the application or use of a distinctive gas diffusion electrode that is able to be gas depolarized, for example as a gas consuming or generating anode or cathode in electrochemical cells or devices, or in electro-energy, fuel or electro-synthetic cells or devices in general.

BACKGROUND

The use of Gas Diffusion Electrodes (GDEs) is known in several electrochemical processes. For example, hydrogen-oxygen fuel cells typically utilize the transformation of gaseous oxygen and hydrogen into liquid water at solid-phase, electrically-connected catalysts, like platinum metal.

At the present time, commercially available GDEs typically comprise of fused, porous layers of conductive particles (usually carbon particles) of different size. The outer-most layers typically contain particles of the smallest dimensions, fused together with smaller amounts of hydrophobic PTFE (polytetrafluoroethylene, or Teflon™) binder. The inner-most layers typically contain the largest particles. There may be multiple intermediate layers of intermediate particle size.

The intention of this gradation in particle size within GDEs, from largest in the center to smallest on the outer sides, is to create and control a three-phase solid-liquid-gas boundary within the electrode. This boundary should have the largest possible surface area. The creation of such a boundary is achieved, effectively, by controlling the average pore sizes between the particles, ensuring that the smallest pore sizes are at the edges and the largest are in the center. Since the pores are typically relatively hydrophobic (due to the PTFE binder), the small pore sizes at the edges (e.g. 30 microns pore size) act to hinder and limit the ingress of liquid water into the GDE. That is, water can penetrate only a relatively short distance into the GDE, where the electrochemically active surface area per unit volume, is largest. By contrast, the larger pores in the centre of the GDE (e.g. 150 microns pore size), allow for ready gas transmission at low pressure along the length of the GDE, with the gas then forming a three-way solid-liquid-gas boundary with the liquid water at the edges of the GDE, where the electrochemically active surface area per unit volume is the largest.

Layered porous electrode structures are presently the industry standard for:

(1) conventional free-standing GDEs (for example, of the type used in hydrogen-oxygen PEM fuel cells); and
(2) hybrid GDEs, where a GDE layer has been incorporated within an electrode, typically between a current collector and the gas zone.

GDEs of this type often display significant technical problems during operation. These largely derive from the difficulty of creating a seamlessly homogeneous particulate bed, with uniform pore sizes and distributions, and uniform hydrophobicity (imparted by the hydrophobic PTFE binder within the GDE). Because of the resulting relative lack of uniformity in the GDE structure, the three-phase solid-liquid-gas boundary created within the GDE may be:

Unstable and fluctuating. The location of the boundary within the GDE may be subject to changing conditions during reaction which cause the boundary to constantly re-distribute itself to new locations within the GDE during operation.

Inhomogeneous. The boundary may be located at widely and unpredictably divergent depths within the GDE as one traverses the length of the GDE.

Inconsistent and ill-defined. At certain points within the GDE, there may be multiple and not a single solid-liquid-gas boundary.

Prone to failure. The boundary may fail at certain points within the GDE during operation, causing a halt to the desired chemical reaction. For example, a common failure mode is that the GDE becomes completely filled with the liquid phase, thereby destroying the three-phase boundary; this is known in the industry as "flooding". Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. In all cases, flooding induces a decline in the voltage output and power generation of such fuel cells.

Problems of this type are not conducive to optimum operations and may result in uneven, low-yielding, incomplete or incorrect reactions, amongst others.

Conventional 3D Particulate Fixed-Bed Electrodes and GDEs

At the present time, 3D particulate fixed bed electrodes and gas diffusion electrodes (GDEs) are conventionally fabricated by mixing carbon black and PTFE powders and then compressing the solid mixture into a bulk, porous electrode.

The pore size of the resulting structure may be very roughly controlled by managing the particle size of the particulates used. However, it is difficult to achieve a uniform pore size throughout the electrode using this approach because particles, especially "sticky" particles like PTFE, often do not flow evenly and distribute themselves uniformly when compressed. A wide range of pore sizes are therefore typically obtained. It is, moreover, generally not possible to create structures with uniformly small pore sizes, such as 0.05 µm-0.5 µm in size.

The hydrophobicity of the structure is typically controlled by managing the relative quantity of PTFE incorporated into the structure. The PTFE holds the structure together and creates the required porosity. However, its quantity must be carefully controlled so as to impart the electrode with an appropriately intermediate hydrophobicity. An intermediate hydrophobicity is needed to ensure partial, but not complete water ingress. In the case of GDEs, this is needed to thereby create a solid-liquid-gas boundary within the carbon black matrix that makes up the electrode.

This method of constructing 3D particulate fixed bed electrodes and gas diffusion electrodes creates some significant practical problems when operating such electrodes in industrial electrochemical cells, particularly in electro-synthetic and electro-energy (e.g. fuel cell) applications. These problems include the formation of three-way solid-liquid-gas boundaries that are: ill-defined, inconsistent, unstable, fluctuating, inhomogeneous, and prone to failures like flooding.

Problems of this type largely arise from the intrinsic lack of control in the fabrication process, which attempts to create all of the inherent properties of the electrode—including porosity, hydrophobicity, and conductivity—in a single step. Moreover, the fabrication method seeks to simultaneously optimise all of these properties within a single structure. This is often not practically possible since the properties are inter-related, meaning that optimising one may degrade another.

Despite these drawbacks, the approach of combining particulate carbon black and PTFE into a compressed or sintered fixed bed remains the standard method of fabricating GDEs for industrial electrochemistry. This approach is used to fabricate, for example, free-standing GDEs of the type used in hydrogen-oxygen PEM fuel cells. Even where only a GDE component is required within an electrode, the standard method of fabricating that GDE component is to form it as a compressed, porous layer of particulate carbon black and PTFE.

For the above and other reasons, the conventional method of making GDEs and the properties of conventional GDEs are open to improvement.

FIG. 1 (prior art) depicts in a schematic form, a conventional 3D particulate fixed bed electrode or a gas diffusion electrode (GDE) 110, as widely used in industry at present.

In a conventional 3D particulate fixed bed electrode or GDE 110, a conductive element (e.g. carbon particles) is typically combined (using compression/sintering) with a non-conductive, hydrophobic element (e.g. polytetrafluoroethylene (PTFE) Teflon™ particles) and catalyst into a single, fixed-bed structure 110. The fixed-bed structure 110 has intermediate hydrophobicity, good but not the best available conductivity, and a pore structure that is non-uniform and poorly defined over a single region 113. When the 3D particulate fixed bed electrode or GDE 110 is then contacted on one side by a liquid electrolyte and on the other side by a gaseous substance, these physical features bring about the formation of an irregularly-distributed three-phase solid-liquid-gas boundary within the body of the electrode 110, below its outer surface 112 and within single region 113, as illustrated in the magnified view presented in FIG. 1. At the three-phase boundary, electrically connected catalyst (solid phase) is in simultaneous contact with the reactants (in either the liquid or the gas phase) and the products (in the other one of the liquid or gas phase). The solid-liquid-gas boundary within the GDE 110 therefore provides a boundary at which electrochemical liquid-to-gas or gas-to-liquid reactions may be facilitated by, for example, the application of a particular electrical voltage. The macroscopic width of the three-phase solid-liquid-gas boundary is comparable or similar in dimension to the width of the conventional GDE. The thickness of the three-phase solid-liquid-gas boundary in a conventional GDE is typically in the range of from 0.4 mm to 0.8 mm in fuel cell GDEs up to higher thicknesses, such as several millimeters, in industrial electrochemical GDEs.

The phenomenon of flooding described above, is often caused by water ingress into the gas diffusion electrode when the water is subject to any sort of external pressure. For example, in an industrial electrolytic cell of 1 meter height, the water at the bottom of the cell is pressurised at 0.1 bar due to the hydraulic head of water. If a GDE were used at this depth, the GDE would typically be immediately flooded by water ingress because modern-day GDEs have very low "wetting pressures" (also known as the "water entry pressure"), that are typically less than 0.1 bar (although GDEs with wetting pressures of 0.2 bar have recently been reported in WO2013037902). GDEs are, additionally, relatively expensive.

This is a particular problem in industrial electrochemical cells in which it is highly beneficial to apply a gas such as oxygen or hydrogen to the counter electrode, via the use of a GDE at that electrode.

Depolarization

In many industrial electrochemical processes, the counter electrode is not productive in that the counter electrode does not produce a desired and valuable product. Instead, the counter electrode produces a waste product that must be disposed of, typically at some cost. In such cases, one may "depolarize" the counter-electrode by introducing a gas such as oxygen or hydrogen to the surface of that electrode, to thereby change the half reaction that occurs at the electrode and reduce the theoretical overall cell voltage by about 1.2 V.

For example, in the traditional chlor-alkali process, which is one of the most widely used industrial electro-synthetic processes in the world, chlorine is generated at the anode from acidified 25% NaCl solution, while hydrogen is generated at the cathode from strongly caustic solution (typically 32% NaOH). The hydrogen is not wanted and must be disposed of. The electrode half-reactions are as follows:

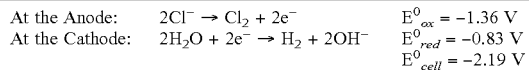

| At the Anode: | $2Cl^- \rightarrow Cl_2 + 2e^-$ | $E^0_{ox} = -1.36$ V |
| At the Cathode: | $2H_2O + 2e^- \rightarrow H_2 + 2OH^-$ | $E^0_{red} = -0.83$ V |
| | | $E^0_{cell} = -2.19$ V |

The negative sign for the $E_{cell}$ indicates that the overall reaction is not thermodynamically favoured and needs to be driven by the application of an external electrical voltage. A positive sign for the $E_{cell}$ would indicate that the overall reaction is spontaneous and generates a voltage and an electrical current. That is, it would indicate that the cell will act as a fuel cell.

As the cathode in a traditional chlor-alkali process is not productive, it can be depolarized by the addition of oxygen gas to thereby substantially decrease the overall cell voltage. The oxygen gas is most effectively introduced by using a gas diffusion electrode (GDE) at the cathode and passing the oxygen through the GDE into the system. The electrode half-reactions will then be:

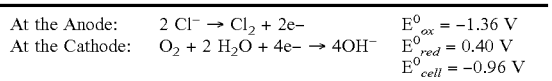

| At the Anode: | $2Cl^- \rightarrow Cl_2 + 2e-$ | $E^0_{ox} = -1.36$ V |
| At the Cathode: | $O_2 + 2 H_2O + 4e- \rightarrow 4OH^-$ | $E^0_{red} = 0.40$ V |
| | | $E^0_{cell} = -0.96$ V |

As can be seen, oxygen depolarization of the cathode in this manner reduces the cell voltage by more than half, and thereby effects a substantial improvement in the energy consumption involved in the manufacture of chlorine.

At the present time, GDEs are incorporated in only a small number of industrial applications for the purposes of depolarizing counter electrodes. This mainly involves the production of chlorine from hydrochloric acid by the companies Industrie De Nora S.p.A., Bayer AG, and ThyssenKrupp Uhde AG.

Most industrial electrochemical processes that could benefit from electrode depolarization do not presently make use of electrode depolarization. This is largely because of the expense and practical difficulties of using conventional GDEs.

For example, chlor-alkali cells are generally more than 1 meter in height. If a conventional GDE was used to depolarize the anode, which comprises one wall of the cell, the GDE would flood at the base of the GDE causing the highly caustic 32% NaOH solution to leak from the electrolyte chamber in the cell. This would occur because current-day, conventional GDEs typically flood at 0.1 bar liquid pressures. It is, consequently, not tenable to use current-day conventional GDEs in such cells.

Attempts have been made to overcome this problem. For example, WO2003035939 teaches the use of a somewhat cumbersome "gas pocket" design of electrode which allows for the introduction of oxygen at the cathode without leaking of the caustic electrolyte from the electrolyte chamber. WO2003042430 similarly seeks to overcome the problem by the use of a "percolator-type" cathode, which efficiently breaks hydraulic heads in liquid chambers but has the undesired properties of being expensive and adding ohmic drops to the cell construction.

More recently, WO2013037902, assigned to the electrode specialist company Industrie De Nora S.p.A., describes a novel fabrication technique to realise a GDE capable of withstanding 0.2 bar liquid pressure, which exceeds the 0.1 bar pressure produced by water under a 1 meter hydraulic head. The GDE described in WO2013037902 is, nevertheless, expensive and leaves little margin for error in that only a 0.1 bar overpressure will be enough to cause the highly caustic electrolyte to leak from the electrolyte chamber of the cell. Any defects in the GDE—no matter how tiny-will result in or create a risk of caustic leakage. Moreover, special manifolding is required on the cell to balance pressures.

Similar or comparable situations or problems pertain in numerous other industrial electrochemical processes that may benefit from the use of gas depolarized GDEs, if they were practically viable. These include the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, and others. Electrometallurgical applications, such as metal electrowinning, could also benefit from the energy savings associated with anode depolarization; metal electro-deposition occurs at the cathode side of such cells, while oxygen is evolved at the anode. If oxygen evolution was replaced by hydrogen oxidation on a suitable gas diffusion anode, this would generate substantial energy savings. However, the mechanical characteristics of conventional GDEs make them unsuitable for delimiting narrow-gap chambers, thereby restricting their application in the undivided electrolysis cells that are widely used in electrometallurgical processes. Moreover, conventional GDEs would leak under the hydraulic head of electrolytic solutions commonly used in industrial size electrolysers. Several industrial electrochemical processes in the pulp and paper industry may also benefit from the use of gas depolarized GDEs, including: (a) "black liquor" electrolysis, (b) "Tall Oil recovery" and (c) chloride removal electrolysis. Flooding of GDEs after the build-up of even very mild liquid pressures is, furthermore, a particular and well-recognized problem in fuel cells, such as hydrogen-oxygen fuel cells.

In summary, a need exists for a Gas Diffusion Electrode that can be gas depolarized and utilised in electro-synthetic, electrochemical, fuel and/or electro-energy cells or devices. Preferably, the Gas Diffusion Electrode should be relatively inexpensive, robust and/or mechanically strong, and have a relatively high wetting pressure. There is a need for such Gas Diffusion Electrodes that can, consequently, be readily, generally and/or beneficially deployed as gas diffusion and gas depolarized electrodes in a variety of industrial electrochemical, fuel, electro-energy and/or electro-synthetic processes, cells and/or devices.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

This Summary is provided to introduce a selection of concepts in a simplified form that are further described below in the Examples. This Summary is not intended to identify all of the key features or essential features of the claimed subject matter, nor is it intended to be used to limit the scope of the claimed subject matter.

In one example aspect, there is provided an electrode, preferably a Gas Diffusion Electrode (GDE), which can be gas depolarized. Preferably, the Gas Diffusion Electrode is relatively inexpensive, robust and/or mechanically strong, and has a relatively high wetting pressure. Embodiments of the Gas Diffusion Electrodes can, consequently, be readily, generally and/or beneficially deployed as gas diffusion and/or gas depolarized electrodes in a variety of industrial electrochemical, fuel, electro-energy and/or electro-synthetic processes, cells and/or devices.

In a further example aspect, there is provided electro-synthetic or electro-energy cells, such as an electrochemical cell or a fuel cell, with one or more electrodes that can be gas depolarized. In other example aspects, embodiments relate to applications or uses of gas diffusion electrodes that are able to be gas depolarized, for example as a gas consuming or generating anode or cathode in electrochemical cells or devices, fuel cells, or in electro-energy or electro-synthetic cells or devices in general.

In one example form, example 3D electrodes or GDEs of the current embodiments are distinguished from conventional particulate fixed-bed GDEs in that they separate the key features of a 3D electrode or GDE into two, or at least two, distinct regions, each of whose properties improve upon and may be more fully controlled than is possible within the single body of a conventional GDE. An example embodiment of such a 3D electrode or GDE may comprise a liquid-and-gas-porous conductive material, which can optionally also include a catalyst which is enhanced or optimized for its catalytic capabilities and conductivity. The conductive material is attached to, coupled to, touching, positioned adjacent to, or abuts, a gas permeable material that is non-conductive and liquid electrolyte impermeable during normal operational use of the electrode, e.g. which may be hydrophobic, for which the pore structure is selected, enhanced or optimised for gas transport properties. Normal operational use is, for example, when the electrode is functioning as intended and not flooded. In an example, a surface of the gas permeable material is facing the porous conductive material. The surface of the gas permeable material may, but need not necessarily, touch or contact the porous conductive material, for example there may be an intermediary binder material or layer that can include one or more catalysts. At or near the surface of the gas permeable material is an interface or boundary region of the gas permeable material and the porous conductive material. When the electrode is in use, a three-phase solid-liquid-gas boundary is able to form at or near the surface of the gas permeable material facing the porous conductive material. In this context, "at or near" the surface is intended to mean within a distance being the thickness of a binder material (if present, and as discussed herein), or within a distance being the macroscopic width of the three-phase solid-liquid-gas boundary itself, or within a distance of any overlap of the gas permeable material and the porous conductive material, or within a distance being the width of the porous conductive material. The three-phase solid-liquid-gas boundary need not form precisely 'at' the surface, but can form 'near' the surface in the sense of being close, neighboring, adjoining, immediately next to or within, or proximate. The three-phase solid-liquid-gas boundary can further move in response to the application of an excess gas or liquid pressure, however the boundary will remain 'near' to the surface as described during normal operational use.

Preferably, two regions (being a first region including the porous conductive material and a second region including the non-conductive gas permeable material) are substantially distinct, demarcated or separated, although they are positioned adjacent, abut, touch or adjoin each other, so that there is an interface or a boundary region, or possibly an overlap.

In such an example embodiment, the non-conductive, liquid electrolyte impermeable or hydrophobic, gas permeable material has pores that are better defined, more uniform, and of smaller average size, than can be achieved in a conventional GDE. The liquid-and-gas-porous conductor, preferably provided with a catalyst, may be more conductive than a conventional GDE, while its low hydrophobicity may see the porous conductor completely or substantially completely filled with liquid electrolyte under normal operating conditions, thereby enhancing or maximally facilitating catalysis. In contrast, in a preferred form, the high hydrophobicity of the non-conductive, hydrophobic, gas permeable material will typically see the gas permeable material completely empty or substantially empty of liquid electrolyte at atmospheric pressure, thereby enhancing or maximally facilitating gas transport into and out of the GDE.

When such an example embodiment 3D electrode or GDE is contacted on the conductive side by a liquid electrolyte and on the non-conductive side by a gaseous material, then the above physical features cause the formation of a three-phase solid-liquid-gas boundary at or near a surface of the gas permeable material facing the porous conductive material, which also can be at the interface between the two distinct regions. This boundary is quite different to the three-phase solid-liquid-gas boundary in a conventional GDE. It differs in that it is better defined, narrower, more stable and/or more robust than can be achieved in a conventional GDE. Thus, in operation of a preferred embodiment, a three-phase solid-liquid-gas boundary forms at or near a surface of the gas permeable material facing the porous conductive material (which may also be at the interface, or a boundary region, of the porous conductive material, which can include a catalyst, and the non-conductive gas permeable material). This provides a three-phase solid-liquid-gas boundary with a relatively narrow macroscopic width, for example in comparison to the width or thickness of the electrode.

These features are important because the inventors have found that example embodiment 3D electrodes or GDEs can provide, at or near the interface of the two regions, an enhanced or optimum pore structure, for example hydrophobic pore structure, that facilitates improved or maximum gas transport, with an enhanced or optimally conductive, improved or maximally catalytic structure. In effect, at the three-phase solid-liquid-gas boundary in example embodiment 3D electrodes or GDEs, each of the critical properties of a gas diffusion electrode may be made ideal, or, at least, nearer to ideal than is otherwise possible.

The inventors have further found that the effect of this enhancement or optimisation yields surprising and remarkable electrochemical performance. Despite the three-phase solid-liquid-gas boundary being narrower and confined to what appears to be a two dimensional (2D), or substantially 2D, macroscopic geometry, the electrochemical capabilities of the three-phase solid-liquid-gas boundary in example embodiment 3D electrodes or GDEs substantially improves upon and, in fact, far exceed those of conventional GDEs. Such three-phase solid-liquid-gas boundaries can, for example, impart example embodiment 3D electrodes or GDEs with a range of unexpected and novel electrochemical capabilities, including:

1. much higher wetting pressures and bubble points than can be achieved in conventional GDEs. "Wetting pressure" is defined as the lowest excess of pressure on the liquid electrolyte side of a GDE relative to the gas side of the GDE, at which the liquid electrolyte penetrates and floods the GDE. The "bubble point" is defined as the lowest excess of pressure on the gas side of a GDE relative to the liquid electrolyte side of the GDE, at which the gas blows through the GDE and forms bubbles at the electrode surface on the liquid electrolyte side. Example embodiment GDEs typically have wetting pressures and bubble points in excess of 0.2 bar, whereas conventional GDEs typically have wetting pressures and bubbles points of 0.2 bar or less,
2. lower electrical resistances, higher electrocatalytic activities and reactivities, as well as more efficient utilization of catalytic materials, if used, than can be realised in conventional GDEs, especially, but not exclusively, when operated at relatively low current densities; and
3. an apparent capacity to facilitate hitherto unachievable gas-to-liquid or liquid-to-gas electrochemical reactions, or, at least, improve upon electrochemical reactions that have not proved practically viable to date, especially, but not exclusively, when operated at relatively low current densities.

Thus, in particular examples, such 3D electrodes or GDEs display a uniquely and an exceedingly well-defined, narrow, stable, and/or robust three-way solid-liquid-gas interface. One effect created by such an interface is an unusually high electrochemical and catalytic activity that derives from the high quality of the liquid-solid-gas interface. For example, the inventors have observed that example GDEs of the present embodiments are able to spontaneously, aggressively and selectively sequester oxygen from the atmosphere, even though oxygen makes up only 20% of the atmosphere. Thus, example GDEs of this type may be used to facilitate the Dow Huron process in a more electrically and economically efficient manner than has hitherto been possible. Similarly, example GDEs have proved able to facilitate the hitherto unknown reactions that occur in a room temperature direct methane fuel cell.

These enhancements provide unexpected improvements over conventional GDEs. They appear to arise because the fabrication of conventional particulate fixed-bed GDEs as currently employed in the art, is predicated on creating all of the important physical properties at the same time within a single material. Such an approach effectively ignores the fact that the key properties of GDEs (namely: pore structure, hydrophobicity, gas transport, liquid transport, conductivity and catalytic activity) are typically inter-dependent and are therefore not open to ready, concurrent enhancement or optimisation within a single material. Example embodiment GDEs as described herein take account of this limitation and separately optimise one or more of the key properties, to thereby achieve more ideal overall properties at the interface of the two distinct regions.

The inventors have further found that example embodiment GDEs may be fabricated in an exceedingly low cost manner, allowing for the practical use of (i) relatively low current densities, which minimise electrical losses and maximise electrical efficiency, and/or (ii) low-cost catalysts comprising of Earth-abundant elements which only operate efficiently at lower current densities. By these means, it becomes possible to manufacture, practically and economically viably, large-scale electrochemical cells for use in industrial-scale electro-synthetic and electro-energy applications. Such cells may achieve energy efficiencies that have hitherto been unavailable in large-scale production and energy environments. For example, chlorine may be manufactured at scale using the chlor-alkali process with 91% energy efficiency, whereas the best available industrial chlor-alkali plants achieve 66% energy efficiency.

As used herein, a three-dimensional (3D) electrode is a solid, gas permeable or liquid flow-through electrode whose effective surface area is greater than the geometric 2D surface area of the electrode. 3D electrodes are non-planar electrodes that typically improve the transport of one or more reactant species to the 3D electrode's surface (by utilising the increased effective surface area). Reference to 3D electrodes should be read as also including flow-through electrodes or porous electrodes.

Reference to a gas permeable material should be read as a general reference including any form or type of gas permeable medium, article, layer, membrane, barrier, matrix, element or structure, or combination thereof.

Reference to a gas permeable material should also be read as including any medium, article, layer, membrane, barrier, matrix, element or structure that is penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material may be porous, may be a composite of at least one non-porous material and one porous material, or may be completely non-porous. The gas permeable material can also be referred to as a "breathable" material. By way of clarifying example only, without imposing any limitation, an example of a gas permeable material is a porous matrix, and an example of a substance from which the gas permeable material is made or formed is PTFE.

Reference to a porous conductive material should be read as including any medium, article, layer, membrane, barrier, matrix, element or structure that is penetrable to allow movement, transfer, penetration or transport of one or more gases and/or liquids through or across at least part of the material, medium, article, layer, membrane, barrier, matrix, element or structure (i.e. the porous conductive material). That is, a substance of which the porous conductive material is made may or may not be gas and/or liquid permeable itself, but the material, medium, article, layer, membrane, barrier, matrix, element or structure formed or made of, or at least partially formed or made of, the substance is gas and/or liquid permeable. The porous conductive material may be a composite material, for example composed of more than one type of conductive material, metallic material, or of a conductive or metallic material(s) and non-metallic material(s). By way of clarifying examples only, without imposing any limitation, examples of porous conductive materials include porous or permeable metals, conductors, meshes, grids, lattices, cloths, woven or non-woven structures, webs or perforated sheets. The porous conductive material may also be a material that has "metal-like" properties of conduction. For example, a porous carbon cloth may be considered a porous conductive material since its conductive properties are similar to those of a metal.

The porous conductive material may be a composite material, for example composed of more than one type of conductive material, metallic material, or of a conductive or metallic material(s) and non-metallic material(s). Furthermore, the porous conductive material may be one or more metallic materials coated onto at least part of the gas permeable material, for example sputter coated, or coated or deposited onto at least part of a separate gas permeable material that is used in association with the gas permeable material. By way of clarifying examples only, without imposing any limitation, examples of porous conductive materials include porous or permeable metals, conductors, meshes, grids, lattices, cloths, woven or non-woven structures, webs or perforated sheets. The porous conductive material may be a separate material/layer attached to the gas permeable material, or may be formed on and/or as part of the gas permeable material (e.g. by coating or deposition). The porous conductive material may also be a material that has "metal-like" properties of conduction. For example, a porous carbon cloth may be considered a 'porous conductive material' since its conductive properties are similar to those of a metal.

A desirable feature of example GDEs of the current embodiments is their ability to contain electrolytes, for example water, acid, or caustic, within electrochemical cells and devices even at relatively high applied pressures on the liquid electrolyte, whilst simultaneously bringing gases, for example oxygen or hydrogen, to the electrode interface without any need for bubble formation or substantial bubble formation. Moreover, example GDEs of the current embodiments may be significantly less expensive than conventional GDEs.

In a further example aspect, there is provided a gas permeable 3D electrode comprising: a gas permeable material; and a porous conductive material attached to or positioned adjacent to the gas permeable material. In a preferred aspect, the gas permeable material is non-conductive and liquid electrolyte impermeable, e.g. hydrophobic, during normal operational use of the electrode. Preferably, a three-phase solid-liquid-gas boundary is able to form at or near a surface of the gas permeable material facing the porous conductive material. In another aspect, there is provided a gas permeable 3D electrode comprising: a gas permeable material, preferably that is non-conductive and liquid electrolyte impermeable; a porous conductive material attached to or positioned adjacent to the gas permeable material; and a catalyst in electrical communication with the porous conductive material, where the catalyst may be located on the porous conductive material or on the gas permeable material, or the catalyst may be located on both the porous conductive material and the gas permeable material. In other aspects, the porous conductive material can be attached to, fixed to, positioned adjacent, or positioned near with some degree of separation, the gas permeable material. In another aspect, the porous conductive material is preferably attached to the gas permeable material by using a binder material, which may also be provided with one or more catalysts. The gas permeable 3D electrode can also be termed a gas permeable composite 3D electrode.

In a preferred example, the gas permeable material is non-conducting and impermeable to a liquid electrolyte, and the porous conductive material is permeable to the liquid electrolyte. Preferably the gas permeable material is a different material to the porous conductive material, which are provided as sheets or layers and laminated together.

Further example aspects, details and applications of example electrodes that can be utilised as gas depolarized electrodes, for example gas depolarized GDEs or gas depolarized 3D electrodes, can be found in the Applicant's concurrently filed PCT patent applications "Composite Three-Dimensional Electrodes and Methods of Fabrication" filed on 30 Jul. 2014, "Modular Electrochemical Cells" filed on 30 Jul. 2014, and "Method and Electrochemical Cell for Managing Electrochemical Reactions" filed on 30 Jul. 2014, which are all incorporated herein by reference.

The combination of the above properties means that example GDEs of the current embodiments may provide an inexpensive, robust, and/or mechanically-strong GDE that has a relatively high wetting pressure and unusually high electrochemical activity. GDEs of this class or type can, consequently, be readily, generally, and beneficially deployed as gas electrodes in a variety of industrial electrochemical processes and devices.

It has further been realised by the inventors that the unique qualities of the developed electrodes or GDEs, along with other physical properties, are indicative of a powerful proclivity by electrodes and GDEs of this class or type, to facilitate gas depolarization reactions at counter electrodes in industrial electrochemical, electro-synthetic and/or electro-energy processes, cells and/or devices. These advantageous properties are believed to arise from the unique features of distinctive electrodes and GDEs.

In another example aspect, there is provided an electro-synthetic or fuel cell, comprising a liquid electrolyte and a gas diffusion electrode; the gas diffusion electrode comprising: a gas permeable material; and a porous conductive material provided on a liquid electrolyte side of the gas diffusion electrode, wherein in use the gas diffusion electrode is gas depolarized. That is, a depolarizing gas is introduced into the gas permeable material. The gas diffusion electrode can be a counter electrode. In another example, two gas diffusion electrodes of this type can be provided in the cell. Optionally, both gas diffusion electrodes can be depolarized. For example a first depolarizing gas can be introduced at or into a first gas diffusion electrode, and/or a second depolarizing gas can be introduced at or into a second gas diffusion electrode.

In one example, the porous conductive material (or materials) is attached to or positioned adjacent the gas permeable material. In another example, the porous conductive material is coated or deposited on the gas permeable material. In another example, the gas permeable material (or materials) is coated or deposited on the porous conductive material. In another example the gas permeable material is non-conductive.

In another example aspect, there is provided an electro-synthetic or fuel cell, which includes an electrochemical cell, comprising: a liquid electrolyte; and a gas diffusion electrode, comprising: a gas permeable material that is substantially impermeable to the liquid electrolyte; and a porous conductive material provided on a liquid electrolyte side of the gas diffusion electrode, wherein in use the gas diffusion electrode is gas depolarized.

In another example aspect, there is provided a gas depolarized electrode for use in an electro-synthetic or fuel cell or device, the gas depolarized electrode being a gas diffusion electrode and including: a gas permeable material; and a porous conductive material provided on a liquid electrolyte side of the gas depolarized electrode. Preferably, the gas permeable material is substantially liquid electrolyte impermeable. In a preferred aspect, the gas permeable material is non-conductive. In other aspects, the porous conductive material can be attached to, fixed to, positioned adjacent, or positioned near with some degree of separation, the gas permeable material. In another aspect, the porous conductive material is preferably attached to the gas permeable material by using a binder material. The gas permeable electrode can also be termed a gas permeable composite 3D electrode.

The porous conductive material can be attached to the gas permeable material by being adhered to or laminated to the gas permeable material. Alternatively, the porous conductive material can be provided on the gas permeable material by being coated on or deposited on at least part of the gas permeable material. Alternatively, the gas permeable material can be provided on the porous conductive material by being coated on or deposited on at least part of the porous conductive material.

By way of explanatory example, the inventors have discovered that combining/laminating materials such as polymers having relatively uniform and well-defined gas permeable structures, with porous conductive materials (also referred to herein as a porous or permeable metallic element, material or layer) such as, for example, metal meshes, grids, lattices, cloths or webs, or perforated metal sheets, can yield composite 3D electrodes having unexpected and novel properties, such as unusually high electrochemical and electrocatalytic activity, robustness, and/or high effective electrochemical area per unit volume.

The inventors have further discovered that disproportionately amplified electrochemical properties are best observed when the interface or boundary region is created by a carefully calibrated fabrication process. Improved electrochemical properties are also observed when the electrode is operated at relatively low current densities, such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively. Amplified properties are observed since a well-defined, narrow, stable, and/or robust three-way solid-liquid-gas boundary is formed and maintained under operating conditions.

Thus, for example, the inventors have discovered that the porous conductive material can be or be formed as a mesh, grid, lattice, cloth, web or perforated sheet. The gas permeable material, for example providing a non-conductive polymer layer or layers, in the composite 3D electrodes may be porous, non-porous, or be comprised of a combination of a porous and non-porous material including a sandwich of a non-porous layer on top of a porous layer, provided only that the material, for example a polymer layer, is gas permeable (i.e. the polymer layer is formed of or includes one or more gas permeable materials as described previously) and is liquid electrolyte impermeable. A binder material(s), which may be provided with catalytic, conductive, and/or other materials, may be added to, positioned on, laid upon and/or laid upon and into or through the porous conductive material and/or the gas permeable material. The binder material(s) may also be present between the conductive metallic layer (i.e. the porous conductive material) and the polymer layer (i.e. the gas permeable material), that is in a boundary region, to thereby enhance the structural integrity, the electrical and structural integration, and/or the robustness of the electrodes. In a preferred form, the binder material is characterised by the fact that its primary purpose is to bind and it therefore does not provide a matrix of particulate carbon black within which a three-way solid-liquid-gas boundary is formed, as may be found in conventional 3D particulate fixed bed electrodes.

Moreover, when composite 3D electrodes of the present embodiments are configured for gas-to-liquid and/or liquid-to-gas processes, they may act as Gas Diffusion Electrodes (GDEs) that display beneficial solid-liquid-gas boundaries when in use, for example uniquely well-defined, narrow, stable, and/or robust three-way solid-liquid-gas boundaries. Such boundaries may result in unexpected and amplified electrochemical performance, especially relative to other 3D electrodes and in respect of their cost of manufacture.

Preferably, but not exclusively, GDEs of the above class or type are employed to transport gases including, but not limited to, oxygen or hydrogen, into or through the electrodes within electrochemical cells and devices for the purposes of depolarizing the electrodes. That is, preferably a depolarizing gas is received by the at least one gas diffusion electrode to gas depolarize the electrode.

Preferably, but not exclusively, the depolarizing gas changes the half-reaction that would occur at the electrode to a half-reaction that is energetically more favourable.

Preferably, but not exclusively, the electrochemical cell is used in the electrochemical manufacture of (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, (k) chlorine, (l) caustic (in general), (m) $CO_2$ from methane, and others.

In alternative examples, the electrochemical cell involves electrochemical processes unique to particular industries. Examples include:
  (i) electrometallurgical applications, such as metal electrowinning;
  (ii) pulp and paper industry applications, such as: (a) "black liquor" electrolysis, (b) "Tall Oil recovery" and (c) chloride removal electrolysis; and
  (iii) fuel cell and related device applications, such as hydrogen-oxygen fuel cells, including but not limited to alkaline fuel cells.

In another example aspect, the presence and operation of the at least one gas diffusion electrode has an industrially beneficial effect, including but not limited to:
  i. Diminishing the overall energy required of the electro-synthetic or electro-energy cell or device, relative to what would have been the case if a conventional gas diffusion electrode had been used.
  ii. Improving the cost-effectiveness and economics of the electro-synthetic or electro-energy cell or device, relative to what would have been the case if a conventional gas diffusion electrode had been used.
  iii. Improving aspects related to safety involving the electro-synthetic or electro-energy cell or device, relative to what would have been the case if a conventional gas diffusion electrode had been used.
  iv. Allowing for improved recycling or disposal of unwanted materials related to the electro-synthetic or electro-energy cell or device, relative to what would have been the case if a conventional gas diffusion electrode had been used.
  v. Allowing for larger electrochemical cells, whose height is not limited to 1 meter; this, in turn, allows for a smaller footprint of cell, thereby decreasing the floor space required to accommodate the cell.
  vi. In general, improving the practicality of the electro-synthetic or electro-energy cell or device, relative to what would have been the case if a conventional gas diffusion electrode had been used.

In a preferred embodiment, the beneficial effect/s is achieved by applying a depolarizing gas through or into the electrode.

In another example aspect, the beneficial effect/s is achieved by other means, such as, for example, by eliminating energy-wasting resistance and ohmic losses that arise from bubble formation.

In another example aspect, the beneficial effect/s arises from applying a larger or significantly larger pressure to the electrolyte (relative to the gas) without the electrolyte leaking through the gas diffusion electrode. A differential pressure of this type may, for example, have the effect of intrinsically improving the energy efficiency of the half-reaction at the electrode and thereby the energy efficiency of the overall process. Alternatively, in another example aspect, the beneficial effect/s arises from applying a larger or a significantly larger pressure to the gas (relative to the electrolyte) without the gas passing through the gas diffusion electrode to form bubbles at the liquid electrolyte side.

Preferably, the cell includes a gas region, and the gas diffusion electrode separates the liquid electrolyte and the gas region. More than one gas region can be used, for example for different gases, or the same gas. The one or more gas regions are typically for extracting or supplying gaseous reactants or products.

In another example aspect, the beneficial effect/s arises from increasing or significantly increasing the temperature of the electrolyte, for example by heating the liquid electrolyte. This is possible without risk, or with reduced risk, of the electrolyte leaking through the gas diffusion electrode. A higher temperature will, for many electrochemical processes, have the effect of improving the intrinsic energy efficiency of the half-reaction at the electrode and thereby increase the energy efficiency of the overall process. Many electrolytic cells are "self-heating" in that the excess energy which must be applied to drive the reaction is released as heat.

In another example aspect, the beneficial effect/s is achieved by modifying the conditions and cell arrangement/construction of an existing electrochemical process to take advantage of the use of example GDEs. For example, when example GDEs as disclosed herein are used as the anode and cathode, the chlor-alkali process may be modified to employ a different reactant; namely, for example, hydrochloric acid instead of brine. This modification may eliminate the need for an expensive and efficiency-dampening sodium exchange membrane between the electrodes. Moreover, when the cathode is then depolarized with oxygen, the modified cell generates only pure chlorine, and not the unwanted hydrogen by-product (nor the caustic by-product NaOH produced in the conventional chlor-alkali process), which may not be required by particular users at particular sites. A cell of this type is, additionally, amenable to small-scale on-site generation of chlorine, which, given the toxic nature of chlorine gas, may be safer than generating the chlorine at a central plant and then shipping the chlorine in cylinders or other containers to small scale users. Moreover, such a cell is amenable to be optimally configured in a highly-efficient and low-cost, flexible, spiral-wound configuration of the type described in the Applicant's concurrently filed PCT application "Modular Electrochemical Cells" filed on 30 Jul. 2014, which is incorporated herein by reference. Such a configuration may be substantially more practical and efficient than other available configurations.

In another example aspect, the beneficial effect/s is achieved by the fact that GDEs according to example embodiments may make an existing, but hitherto unviable chemical process, practically achievable. For example, the Dow-Huron process for manufacturing hydrogen peroxide in caustic streams has proved to be largely unviable because, in part, of the trickle-bed reactor used to depolarize the cathode. GDEs according to example embodiments may be used instead of this reactor and thereby potentially make the process more viable. Additionally, smaller-scale, modularised versions of this process may be created, which could open new applications that have hitherto not been considered or have proved impractical.

In another example aspect, the beneficial effect/s may be achieved by the fact that GDEs according to example embodiments make it possible and practical to carry out entirely new chemical processes, either in cells or devices. For example, hitherto unconsidered processes for the formation of fuels from carbon dioxide, or remediation of $SO_x$ and $NO_x$ pollution, are possible and practical using GDEs according to example embodiments. A hitherto unknown direct methane fuel cell has also been constructed using example embodiment GDEs.

In another example embodiment, one or more GDEs are used to inject or introduce a depolarizing gas not only into the depolarizing electrode but also in sufficient quantities to force the gas into the electrolyte to cause the formation of bubbles that will rise within the reactor, causing mixing within the electrolyte, and thereby increasing mass transfer and decreasing concentration polarization effects. Alternatively, one or more GDEs are used to inject an inert gas or some combination of inert gas and depolarizing gas. In this embodiment, the GDE acts like a fine bubble diffuser, and may carry out two functions: to add a gas to the cell and also to provide mixing. Thus, the depolarizing gas and/or an inert gas can be forced into the liquid electrolyte, via the at least one electrode, to cause bubble formation and/or mixing in the liquid electrolyte.

Preferably, but not exclusively, the porous conductive material is attached to the gas permeable material (e.g. the polymer layer) by being physically (e.g. mechanically) or chemically bonded to the gas permeable material. This is preferably, but not exclusively, achieved by the presence of a binder material or materials that act to bind the porous conductive material and the gas permeable material together. The binder material may be present everywhere, substantially everywhere or almost everywhere between or at the interface of the porous conductive material and the gas permeable material. Alternatively, the binder material may be present at a small selection of spots between the porous conductive material and the gas permeable material. The binder material or materials may further be applied in a pattern to thereby securely attach the porous conductive material to the gas permeable material. The binder material may comprise substantially or entirely, of the material which forms the gas permeable material, for example the polymer material which forms the polymer layer. Alternatively, the binder material may be a mixture and comprise one or more unrelated materials which may concurrently impart one or more other desirable properties upon the binder mixture, such as also being a conductor of electricity or a catalyst.

Additionally, the electrode or the gas permeable material (e.g. polymer layer or membrane) may comprise or be attached to or associated with a dense thin film, i.e. a barrier layer, material or film, selected to have sufficient gas permeability to allow commercially useful rates of gas transfer through the GDE. The barrier layer can be completely non-porous, nano-porous, or comprise a matrix of porous materials and non-porous materials. The barrier layer can also provide additional protection against 'flooding' of electrolyte through the electrode or GDE. Optionally, the barrier layer could be selected to limit the amount of undesired gas or gases, for example water vapour, from permeating through the gas permeable material, the porous conductive material or the electrode. Suitable materials can be chosen that, for example, have high oxygen or hydrogen transport but very low water vapour transport. To facilitate the deposition of such a barrier layer, material or film, an 'intermediate' layer that is highly uniform and has an extremely flat surface, may be first laid down. The aforementioned barrier layer, material or film may then be deposited upon the 'intermediate' layer. The intermediate membrane layer is preferably but not exclusively, porous with the pores being small and in the range of about 5 nm to about 50 nm (but often around about 10 nm or so). Common intermediate layer chemistries may be polysulfone and polyethersulfone.

In another example form, the porous conductive material (a conductive layer) is part of an outer surface of the GDE and is relatively less hydrophobic than the gas permeable material. In another example form, the bulk GDE is gas breathable and liquid impermeable.

In various further examples: a porous conductive material or layer is provided attached to, positioned adjacent to, positioned or layered upon, or at least partially within the gas permeable material; the porous conductive material or layer is associated with the gas permeable material; the porous conductive material or layer is located on and/or within the gas permeable material; and/or, the gas permeable material is located on and/or within the porous conductive material or layer. In other examples, the gas permeable material is a gas permeable membrane or structure, a gas permeable polymer membrane or structure, a gas permeable porous polymer membrane or structure, or a gas permeable porous membrane or structure.

Optionally, but preferably, the GDE is flexible. Optionally, the porous conductive material or layer is made at least partially or wholly from a substance and/or in a form that is flexible. Optionally, the gas permeable material is made at least partially or wholly from a substance and/or in a form that is flexible. Optionally, the gas permeable material is made at least partially or wholly from a polymer or a combination of polymers, for example PTFE, "expanded PTFE" (ePTFE), polyethylene or polypropylene. The polymer itself may or may not be gas permeable. For example, the polymer itself may not be gas permeable but a structure or membrane formed from the polymer is gas permeable.

In example aspects there are provided electrodes, devices or cells using one or more of the electrodes and/or methods for fabricating the electrodes, where the electrodes are used to produce gas-to-liquid and/or liquid-to-gas transformations. In non-limiting example applications the electrodes can be used: (i) in converting air-based oxygen into purer or pure oxygen; (ii) in manufacturing hydrogen peroxide; (iii) in fuel cells; (iv) in direct methane fuel cells that operate at room temperature. In other examples, the electrodes are used in other types of electrochemical devices or cells.

BRIEF DESCRIPTION OF THE DRAWINGS

Illustrative embodiments will now be described solely by way of non-limiting examples and with reference to the accompanying figures. Various example embodiments will be apparent from the following description, given by way of example only, of at least one preferred but non-limiting embodiment, described in connection with the accompanying figures.

EXAMPLES

The following modes, features or aspects, given by way of example only, are described in order to provide a more precise understanding of the subject matter of a preferred embodiment or embodiments.

A New Approach to Making 3D Electrodes and Gas Diffusion Electrodes (GDEs)

Figure 2:
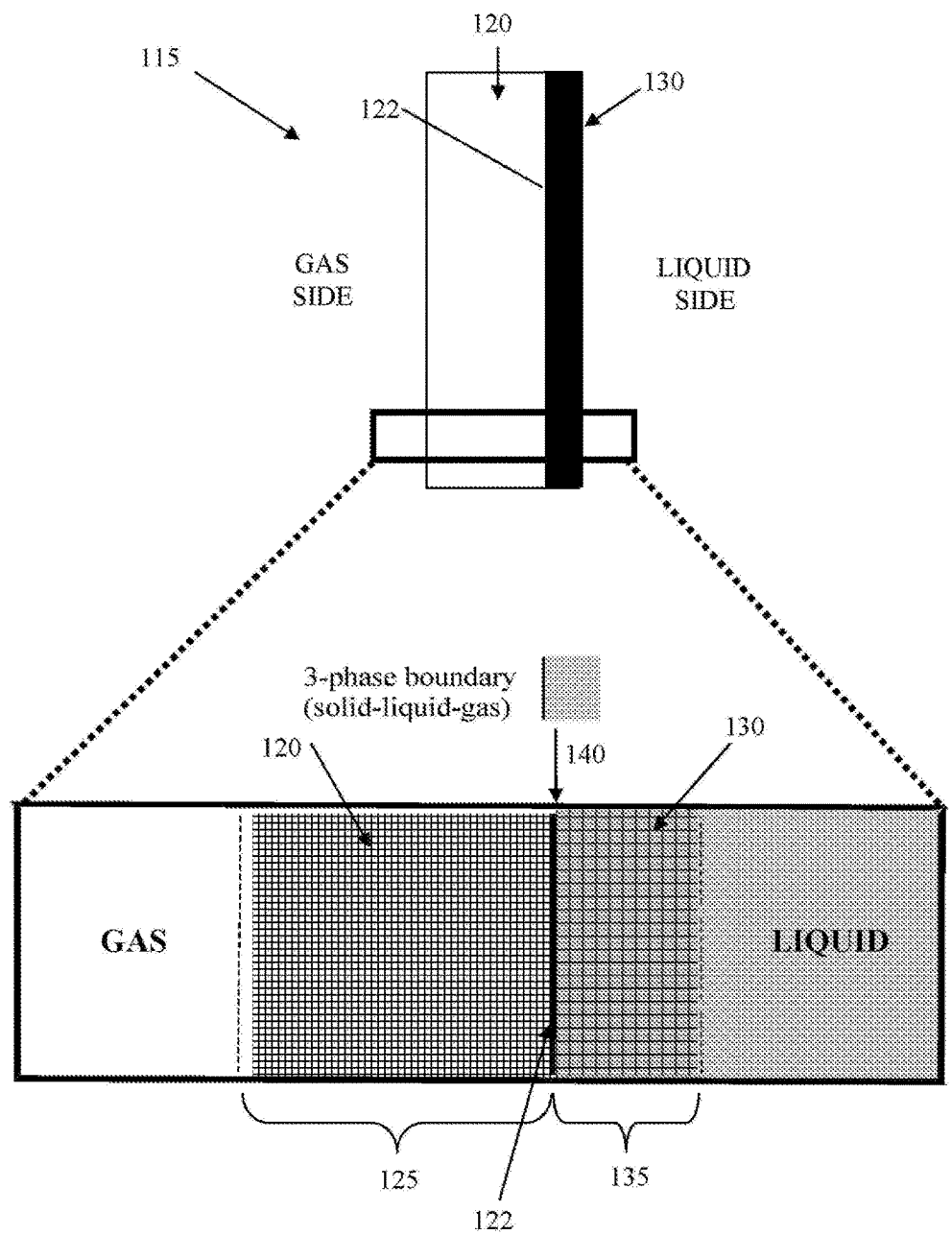
FIG. 2 depicts in schematic form, an example 3D electrode, or gas diffusion electrode, according to the present embodiments (not to scale). The lower part of the figure is a magnified view of a section of the gas diffusion electrode.

FIG. 2 illustrates in schematic form the general structure of an example 3D electrode or GDE 115 that can be used in present embodiments. A 3D electrode or GDE 115 of the present embodiments differs from a conventional 3D particulate fixed bed electrode or GDE 110 in that it separates the features of hydrophobic pore structure and conductivity, preferably catalytic conductivity, into two distinct regions, each of whose properties improve upon and may be more fully controlled than is possible in a conventional 3D particulate fixed bed electrode or GDE. In some embodiments more than two distinct regions may be possible. Thus, an example embodiment of a 3D electrode or GDE 115 may comprise of a liquid-and-gas-porous conductor 130 (i.e. a porous conductive material), that is preferably also provided with a catalyst, coupled with, attached to, abutting, or positioned adjacent a non-conductive gas permeable material 120, that is also preferably liquid electrolyte impermeable, e.g. strongly hydrophobic. The gas permeable material 120 and conductor 130 (i.e. porous conductive material) are substantially distinct, demarcated or separated, thereby providing a first region 135 (conductive region) and a distinct second region 125 (gas permeable region), respectively. The gas permeable material 120 and the conductor 130 are preferably positioned adjacent, abut, touch or adjoin each other, so that there can be touching or overlap of a periphery of the regions at a boundary region or interface 140. The non-conductive, hydrophobic, gas permeable material 120 may display pores that are better defined, more uniform, and potentially of smaller average size, than can be achieved in a conventional 3D electrode or GDE. The liquid-and-gas-porous conductor 130 may, similarly, be more conductive than a conventional 3D electrode or GDE. The low hydrophobicity of the liquid-and-gas-porous conductor (i.e. porous conductive material) 130 will usually also see it completely or substantially completely filled with liquid electrolyte under normal operating conditions, thereby maximally facilitating catalysis. By contrast, the liquid impermeability or high hydrophobicity of the non-conductive, gas permeable material 120 will typically see it completely empty or substantially empty of liquid electrolyte at atmospheric pressure, thereby maximally facilitating gas transport into and out of the GDE 115.

The gas permeable 3D electrode 115 thus provides a gas permeable material 120 that is non-conductive, and a porous conductive material 130 attached to the gas permeable material 120. In operation, the gas permeable material 120 faces a gas side of a cell and the porous conductive material 130 faces a liquid electrolyte side of the cell. In use, a three-phase solid-liquid-gas boundary is able to form at or near a surface 122 of the gas permeable material 120 facing the porous conductive material 130.

The porous conductive material 130 is coupled to, touching, positioned adjacent, attached to or abutting the non-conductive gas permeable material 120, which may be hydrophobic, to form or provide an interface 140 (or boundary region) of or between the porous conductive material 130 and the non-conductive gas permeable material 120. Preferably, this provides two regions (a first region 135 including the porous conductive material 130 and a second region 125 including the non-conductive gas permeable material 120) that are distinct, demarcated or separated. Preferably, the first region 135 and the second region 125 are positioned adjacent, abut, touch or adjoin each other, so that there is an interface 140 (or a boundary region) for the first region 135 and the second region 125. Thus, in operation of a preferred embodiment, a three-phase solid-liquid-gas boundary forms at or near the surface 122 of the gas permeable material 120 facing the porous conductive material 130, which may also be at or near the interface 140 (i.e. at or within a boundary region) between the first region 135 (i.e. the porous conductive material 130, which can include a catalyst) and the second region 125 (i.e. the non-conductive gas permeable material 120). In one example, the solid-liquid-gas boundary, which is formed during use of the electrode in a cell or reactor, has a macroscopic width that is substantially two-dimensional in relation to the width or thickness of the electrode 115. In another example, the solid-liquid-gas boundary is formed at the interface 140 of the gas permeable material 120 and the porous conductive material 130.

When such a 3D electrode or GDE 115 is contacted on the conductive side by a liquid electrolyte and on the non-conductive side by a gaseous material, then the above physical features cause the formation of a three-phase solid-liquid-gas boundary at or near the surface 122 (or interface 140 between the two regions). The three-phase solid-liquid-gas boundary is quite different to that formed in a conventional 3D electrode or GDE. The boundary differs in that it is far better defined, narrower, more stable and/or more robust than can be achieved in a conventional 3D electrode or GDE. For example, the three-phase solid-liquid-gas boundary formed at or near surface 122, or alternatively at or near interface 140, has a macroscopic width that is two-dimensional or substantially two-dimensional in relation to the width of the electrode 115.

These features are important because the inventors have found that example embodiment 3D electrodes or GDEs, such as GDE 115, may, when fabricated in a carefully calibrated way, combine at the interface 140 between gas permeable material 120 and conductor 130, an enhanced or optimum hydrophobic pore structure that facilitates enhanced or maximum gas transport, with an enhanced or optimally conductive, increased or maximally catalytic structure. In effect, at the three-phase solid-liquid-gas boundary in example embodiment 3D electrodes or GDEs, such as GDE 115, each of the critical properties of the electrode may be made ideal, or, at least, nearer to ideal than is otherwise possible.

The effect of this optimisation can be remarkable and unexpectedly significant. Despite being narrower and confined to what appears to be, macroscopically, a 2D geometry, the electrochemical capabilities of the three-phase solid-liquid-gas boundary in example embodiment 3D electrodes or GDEs, such as GDE 115, may substantially improve upon and, in fact, far exceed those of conventional 3D electrode or GDEs, such as GDE 110.

This is because the fabrication of conventional 3D electrodes or GDEs, as currently employed in the art, is predicated on creating all of the important physical properties at the same time within a single material. This approach effectively ignores the fact that the key properties of 3D electrodes or GDEs (namely: pore structure, hydrophobicity, gas transport, liquid transport, conductivity and catalytic activity) are typically inter-dependent and therefore not open to ready, concurrent optimisation within a single material. Example embodiment 3D electrodes or GDEs 115 take account of this limitation and separately optimise the key properties, to thereby achieve more optimum overall properties at the interface 140 between the gas permeable layer 120 and the conductive layer 130.

The inventors have further found that the three-phase solid-liquid-gas boundary may, in fact, at a microscopic level comprise a contorted 3D structure with an unexpectedly large overall surface area. This is particularly the case if the conductive region 135 overlaps somewhat with the gas permeable region 125.

These very fundamental enhancements may impart example embodiment 3D electrodes or GDEs, such as GDE 115, with a range of unexpected and novel electrochemical and physical capabilities. These include:

1. much higher wetting pressures and bubble points than can be achieved in conventional 3D electrodes or GDEs. "Wetting pressure" is defined as the lowest excess of pressure on the liquid electrolyte side of a 3D electrode or GDE relative to the gas side of the electrode, at which the liquid electrolyte penetrates and floods the electrode. The "bubble point" is defined as the lowest excess of pressure on the gas side of a 3D electrode or GDE relative to the liquid electrolyte side of the 3D electrode or GDE, at which the gas blows through the electrode and forms bubbles at the electrode surface on the liquid electrolyte side. Example embodiment 3D electrodes or GDEs, such as GDE 115, typically have wetting pressures and bubble points in excess of 0.2 bar, whereas conventional 3D electrodes or GDEs, such as GDE 110, typically have wetting pressures and bubbles points of 0.2 bar or less;
2. lower electrical resistances, higher electrocatalytic activities and reactivities, as well as more efficient utilization of catalytic materials, than can be realised in conventional 3D electrodes or GDEs, especially, but not exclusively, when operated at relatively low current densities; and 3. an apparent capacity to facilitate hitherto unachievable gas-to-liquid or liquid-to-gas electrochemical reactions, or, at least, improve upon electrochemical reactions that have not proved practically viable to date, especially, but not exclusively, when operated at relatively low current densities. Examples of such transformations include the electrochemical production of hydrogen peroxide from caustic and air oxygen, the production of pure oxygen from air oxygen, the operation of fuel cells with high energy efficiencies, and the direct generation of electrical current by the reaction of methane within a direct methane fuel cell.

Additionally, example embodiment 3D electrodes or GDEs, such as GDE 115, are flexible and may be double-sided, allowing them to be deployed in densely-structured, flexible, spiral-wound and other electrochemical cells, for example of the types described in the Applicant's concurrently filed PCT patent application "Modular Electrochemical Cells" filed on 30 Jul. 2014, which is incorporated herein by reference.

Example embodiment 3D electrodes or GDEs, such as GDE 115, may also be fabricated in an exceedingly low cost manner, allowing for the practical use of: (i) relatively low current densities, which minimise electrical losses and thereby maximise electrical efficiency, and (ii) low-cost catalysts comprising of Earth-abundant elements which only operate efficiently at lower current densities. By these means, it becomes possible to manufacture practically and economically viable, large-scale electrochemical cells for use in industrial-scale electro-synthetic and electro-energy applications. Such cells may achieve energy efficiencies that have hitherto been unavailable in large-scale production and energy environments. For example, chlorine may be manufactured at scale using the chlor-alkali process with 91% energy efficiency, whereas the best available industrial chlor-alkali plants achieve 66% energy efficiency.

The higher wetting pressures that can be achieved in example embodiment 3D electrodes or GDEs, such as GDE 115, relative to conventional GDEs, such as GDE 110, allow for the direct production of pressurised gases in large-scale, industrial liquid-to-gas electro-synthetic/electro-energy cells without the risk of the electrodes becoming flooded and electrolyte leaking out of the electrolyte chamber ('flooding-free' operation). The higher bubble points that can be achieved means that reactant gases may be introduced at pressure into large-scale, industrial gas-to-liquid electro-synthetic/electro-energy cells via gas diffusion electrodes, without forming energy-sapping bubbles in the liquid electrolyte ('bubble-free' operation). Further features of this aspect are described in the Applicant's concurrently filed PCT patent application "Method and Electrochemical Cell for Managing Electrochemical Reactions" filed on 30 Jul. 2014, which is incorporated herein by reference.

The present embodiments teach the approach of harnessing an interface between a liquid-and-gas-porous conductive layer and a gas permeable, hydrophobic layer to achieve practical and economic advantages such as those described above. Such advantages are achieved when the regions 125 and 135 are carefully designed/selected, fabricated in a calibrated way and located in close proximity to each other. That is, the three-phase solid-liquid-gas boundary should be enhanced or optimised, typically through carefully calibrated fabrication in order to improve upon conventional GDEs. The scope of the invention therefore includes 3D electrodes or GDEs that contain an interface of the type described above between a liquid-and-gas-porous conductive layer and a gas permeable, hydrophobic layer, and which improve in practical and economic ways upon conventional 3D electrodes or GDEs.

Fabrication of 3D Electrodes and GDEs

As noted above, a new approach to developing 3D electrodes or GDEs involves separately enhancing or optimising one or more key features of 3D particulate fixed-bed electrodes and gas diffusion electrodes in different locations and then combining the enhanced or optimised components along an interface. Thus, for example, the properties of hydrophobicity and porosity to the liquid electrolyte may be optimised in a non-conductive layer. This layer may then be combined along or about an interface, with a separate porous conductive layer in which the conductance and catalytic properties have been optimised.

The hydrophobic material may be a commercially available expanded PTFE membrane having high hydrophobicity and a substantially uniform pore size. Such membranes are manufactured to more accurate specifications than are possible in conventional 3D particulate fixed bed electrodes or GDEs.

The conductive material may be a metallic material, such as a metal mesh or grid (decorated or coated with a catalyst-binder mixture), that is inherently more conductive than the carbon black used in conventional 3D particulate fixed bed electrodes or GDEs. The porous conductive metal may be selected based on hydrophobicity to match a liquid electrolyte.

Small amounts of PTFE and carbon black may be used in the fabrication of the 3D electrode, for example in a binder material to bind the catalyst in the conductive layer to the metallic material. A key difference from conventional 3D particulate fixed-bed electrodes and GDEs is, however, that the PTFE and carbon black do not form a superstructure within which a three-way solid-liquid-gas boundary may be formed. Instead, the solid-liquid-gas boundary is formed at or near a surface of the gas permeable material facing the porous conductive material, or in another example this could be said to be at or near the interface between the hydrophobic porous region and the conductive region.

The inventors have studied such interfaces in 3D electrodes and discovered that they may yield surprisingly and unexpectedly effective electrochemical systems. Their efficacy appears to derive from their unique architecture, which is brought about by careful and calibrated construction. For improved performance, this may need to be coupled with operation of the 3D electrodes at low current density (at moderate voltages), such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively.

General Example Embodiments

A new approach to developing 3D electrodes involves adapting existing, commonly available porous materials so that they may act as practically useful 3D electrodes.

In a preferred example there is provided a 3D electrode which includes a gas permeable material that is liquid impermeable, a porous conductive material at least partially covering the gas permeable material (such as covering one side or part of one side of the gas permeable material) that is liquid permeable and gas permeable, and a binder material which adheres or attaches the gas permeable material and the porous conductive material to each other. The binder material (which may be a mixture of materials) penetrates the gas permeable material to a depth less than the thickness of the gas permeable material. In one example, the binder material can be present between the porous conductive material and the gas permeable material. In another example, the binder material is present at an interface or boundary region of the porous conductive material and the gas permeable material. In another example, the binder material adjoins the porous conductive material with the gas permeable material.

Thus, a porous conductive material (e.g. a conductive metallic layer) is provided at or near one surface of the 3D electrode and a gas permeable material (e.g. a non-conductive layer) is provided at or near the other, opposing, surface of the 3D electrode. The conductivity of the resulting composite 3D electrode thus varies along the thickness of the 3D electrode. The porous conductive material (e.g. conductive metallic layer) is gas permeable and at least partially, preferably fully, liquid permeable, whereas the gas permeable material (e.g. non-conductive layer) is gas permeable and liquid impermeable. The porous conductive material (e.g. conductive metallic layer) can be in one example part of an outer surface of the 3D electrode and is relatively less hydrophobic than the gas permeable material, whereas the bulk 3D electrode is gas breathable and liquid impermeable.

When the 3D electrode is in use, a three-phase solid-liquid-gas boundary is formed within the 3D electrode, preferably at or near the surface of the gas permeable material that faces the porous conductive material. The solid-liquid-gas boundary is narrow in macroscopic width compared to the thickness of the electrode or of the gas permeable material. Preferably, the maximum width of the solid-liquid-gas boundary is two-dimensional or substantially two-dimensional in relation to the width (or thickness) of the 3D electrode, or in relation to the width (or thickness) of the gas permeable material. In another example, the maximum width of the solid-liquid-gas boundary is less than or equal to the thickness of the applied binder material in the boundary region or interface between the gas permeable material and the porous conductive material.

The solid-liquid-gas boundary is narrow compared to the width of the electrode. This can depend on the width of the electrode materials used and the application. In one example the solid-liquid-gas boundary can have a maximum (or macroscopic) width of less than 400 µm. In other examples, the solid-liquid-gas boundary can have a maximum (or macroscopic) width of less than about 300 µm; or less than about 200 µm; or less than about 100 µm; or less than about 50 µm; or less than about 10 µm; or less than about 1 µm; or less than about 0.1 µm; or less than about 10 nm. By contrast, conventional gas diffusion electrodes typically have their solid-liquid-gas boundaries distributed over thicknesses of from 0.4 mm to 0.8 mm in the case of fuel cell gas diffusion electrodes, or even greater, such as several millimeters in industrial electrochemical gas diffusional electrodes.

In other examples, the maximum width of the solid-liquid-gas boundary can be defined in relation to the width of the electrode, or in relation to the width of one of the constituting materials or layers. In one example the solid-liquid-gas boundary can have a maximum width of less than about 30% of the width of the electrode. In other examples, the solid-liquid-gas boundary can have a maximum width of less than about 20% of the width of the electrode; or less than about 15% of the width of the electrode: or less than about 10% of the width of the electrode; or less than about 5% of the width of the electrode; or less than about 1% of the width of the electrode; or less than about 0.1% of the width of the electrode; or less than about 0.01% of the width of the electrode.

Preferably, though not necessarily, the porous conductive material is a pure or highly purified metal. For example, the porous conductive material can be, but is not limited to pure or purified nickel or Stainless Steel. Alternatively, the porous conductive material can be a metal such as Ti, Cr, Pt, Cu, Pb, Sn, Co, Mn, Au or Ag, or mixtures or alloys thereof. Alternatively, the porous conductive material could be a metal coated with another metal. For example, the porous conductive material could be stainless steel coated with nickel. Alternatively, the porous conductive material could be stainless steel coated with Ti, Cr, Pt, Cu, Pb, Sn, Co, Mn, Au or Ag. In further examples, the porous conductive material may be a polymer coated with a conductive layer or a metallic layer, such as a polymer fabric coated with a metallic layer. In still other examples, the porous conductive material may be formally non-metallic in character but display properties of electrical conduction which are similar to those of metals; for example, carbon fibre or carbon cloth materials.

In some examples, the conductive region or portion (which can include the porous conductive material and a binder material if used) of the 3D electrode comprises less than or equal to about 10% carbon atoms, or less than or equal to about 20% carbon atoms, or less than or equal to about 30% carbon atoms. The carbon atoms can be provided as part of, or attached to, the porous conductive material, and/or included as a component of the binder material, in which case the conductive region or portion is provided by the porous conductive material and the binder material. This can provide a significant benefit, as carbon is less expensive than metals and also lighter. In another example, the conductive region or portion of the 3D electrode can comprise activated carbon. In these examples, the conductive region or portion is not simply a continuous metal or continuous metal coating, such as would be obtained from metallic sputter coating. A benefit of using activated carbon is that some catalysts, such as nano-catalysts, can better associate with or bind to the activated carbon than compared to metals.

In one example, the porous conductive material is stainless steel mesh, for example 100 lines per inch (LPI) stainless steel mesh (thickness about 60-80 micron), which is applied by lamination at, for example, a temperature of 50° C. and a pressure of 500 kPa to a polymer membrane of expanded PTFE (ePTFE) that has been pre-coated by screen-printing, with a layer about 20 micron thick of a binder mixture that comprises carbon black (about 10% by weight), nickel nanoparticles (about 80% by weight), and an ionomer, such as a sulfonated tetrafluoroethylene based fluoropolymer-copolymer (e.g. Nafion™ material), (about 10% by weight).

In other examples, the layer of binder material can be from about 1 micron to about 100 microns thick, or about 10, about 30, about 40, about 50, about 60, about 70, about 80, about 90, or about 100 microns thick. The binder material may comprise:

carbon black (from about 1% to about 30% by weight, or from about 1% to about 20% by weight, or from about 1% to about 10% by weight, or from about 1% to about 5% by weight, or about 5%, or about 10%, or about 15%, or about 20%, or about 25%, or about 30% by weight), nickel particles or nanoparticles (from about 1% to about 90% by weight, or from about 1% to about 80% by weight, or from about 1% to about 70% by weight, or from about 1% to about 60% by weight, or from about 1% to about 50% by weight, or about 10%, or about 20%, or about 30%, or about 40%, or about 50%, or about 60%, or about 70%, or about 80%, or about 90% by weight), and/or an ionomer, such as a sulfonated tetrafluoroethylene based fluoropolymer-copolymer (e.g. Nafion™ material), (from about 1% to about 30% by weight, or from about 1% to about 25% by weight, or from about 1% to about 20% by weight, or from about 1% to about 10% by weight, or from about 1% to about 5% by weight, or about 5%, or about 10%, or about 15%, or about 20%, or about 25%, or about 30% by weight).

In another example, the gas permeable material is a porous polymer membrane or structure. In another example the gas permeable material can be made or formed of one or more substances selected from, but not limited to the group of PTFE, polypropylene, polyethylene or polysulfone. The gas permeable material can be any medium, article, layer, membrane, barrier, matrix, element or structure that is sufficiently porous or penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material can also be referred to as a "breathable" material. By way of example only, a gas permeable material can be a porous membrane and a substance from which the gas permeable material is made or formed can be a polymer, such as PTFE. In one example the 3D electrode is a Gas Diffusion Electrode.

Preferably, the gas permeable material has substantially uniform pore size. Between the porous conductive material (e.g. conductive metallic layer) and the gas permeable material (e.g. non-conductive polymer layer) is a binder material providing a binder layer in a boundary region, and on both sides of the boundary region the pores are substantially uniform in size and distribution. For example, the average pore size can be between about 10 nm to about 500 nm, or preferably between about 50 nm to about 500 nm, or preferably between about 100 nm to about 500 nm, or in more specific examples about 0.1, 0.2, 0.3, 0.4 or 0.5 microns in size. In a most preferred example, the gas permeable material has an average pore size of about 50 nm to about 500 nm and is formed of PTFE.

For example, a commonly available and relatively inexpensive non-conductive porous material is made or formed of "expanded PTFE", also known as ePTFE (where PTFE=polytetrafluoroethylene). ePTFE comprises a highly porous (typically 60-80% porosity) fibrous network of microscopically small, hydrophobic PTFE. An important property of ePTFE is that it is highly porous but also highly hydrophobic. Other widely-available, commodity-type porous polymer membranes, are made or formed from, but are not limited to, polypropylene, polyethylene, polysulfone, and other polymers of similar ilk.

It should be noted that, while the brand name Goretex® polymer material can be used, the inventors have found that use of Goretex® polymer material is not preferred or optimum in the applications described below. In fact, the inventors have found that ePTFE membranes manufactured by the General Electric Company, having some different properties, offer the best and most optimum utility in most electrochemical devices.

In one example, the depth to which the binder material penetrates the gas permeable material (e.g. polymer layer) is in the range of about 1 nm to about 10 μm, or about 50 nm to about 1 μm, or about 50 nm to about 500 nm. In a specific example, the porous conductive material is a nickel mesh of 100 LPI (LPI=lines per inch), the gas permeable material is a 0.2 micron PTFE membrane and the binder material is a combination of carbon black (about 10% by weight), nickel nanoparticles (about 80% by weight), and a sulfonated tetrafluoroethylene based fluoropolymer-copolymer (e.g. Nafion™ material) (about 10% by weight), and the binder material penetrates the gas permeable material to a depth greater than 0 but less than the thickness of the gas permeable material, for example less than about 850 nm.

In another form there is provided a method of fabricating a 3D electrode. The steps include selecting a gas permeable material, for example with a substantially uniform pore size, and then applying, under suitable ('calibrated') heat and pressure for lamination, a porous conductive material to partially coat the gas permeable material, with use of a binder material as an adhesive. The binder material preferably penetrates the gas permeable material to a depth less than the thickness of the gas permeable material.

The ('calibrated') lamination step can include: a particular heat or range of heats of application; a particular pressure or range of pressures of application; a particular time or period of application; and/or a particular circumstance or range of circumstances of application.

Attachment of one or more porous conductive materials, for example as one or more porous conductive layers or meshes, to the gas permeable material, for example a porous polymer membrane, using controllable lamination techniques are employed to produce 3D electrodes. When formed in this way, 3D electrodes with unexpected and improved electrochemical performance may be realised, especially relative to other 3D electrodes and to the cost of manufacture. Further, unrelated materials, for example including catalytic or other materials, can be conveniently added to, or formed upon or in-between the one or more porous conductive materials, layers or meshes, and the gas permeable material to produce 3D electrodes that are practical and useful in electro-energy or electro-synthetic applications. The availability of such 3D electrodes makes viable or improves the practicality of a range of electro-energy and electro-synthetic applications. Such applications are typically unviable or relatively less practical using conventional particulate fixed-bed or gas diffusion electrode technologies.

The porous conductive materials, for example provided as meshes, membranes or layers, can be applied to one or more gas permeable materials, for example provided as meshes, membranes or layers, having a specific, and preferably narrow, range of pore sizes, such as the widely available and relatively low cost polymer membranes used in the water purification industry. Such membranes are manufactured to contain very specific and narrow ranges of pore sizes. By adapting or modifying such membranes or other gas permeable materials to be 3D electrodes, one may conveniently impart upon the 3D electrode highly desirable and otherwise unobtainable pore properties. For example, 3D electrodes may be conveniently and reliably fabricated with tiny (for example less than 500 nm in size) and reasonably or substantially uniform pores that are not easily, reliably, or inexpensively achieved in conventional 3D electrodes. Additionally, the desired pore size can be readily varied by selecting a different gas permeable material, for example provided as a membrane or mesh, for adaption or modification into a 3D electrode. Gas permeable materials with a wide variety of pore sizes are readily available.

A porous conductive material, for example a conductive metallic material, mesh or layer, can be applied such that the produced 3D electrodes display unusually high electrochemical activities as a function of the electrochemical surface area present.

General Example Embodiments —Gas Diffusion Electrode (GDE)

When intended to be used in a Gas Diffusion Electrode (GDE) type application, the porous conductive material (e.g. metallic material or layer) is preferably, but not exclusively, applied such that the produced 3D electrodes create uniquely well-defined, narrow and stable three-way solid-liquid-gas boundaries. In a particular example, the porous conductive material may have a thickness in the range of about 1 nm to about 1000 μm, or in the range of about 1 μm to about 100 μm, or in the range of about 5 μm to about 40 μm. By controlling the pore size of the gas permeable material (e.g. a polymer layer), one may also control important physical properties of the 3D electrode, for example a 3D GDE, such as the wetting pressure, the bubble point, and the permeability to gases.

In an example embodiment in the case where a GDE is manufactured using a previously formed polymer membrane as the gas permeable material, the GDE can have substantially the same wetting pressure as that of the polymer membrane (i.e. the gas permeable material) used. In the example case where a membrane having average pore size 0.2 μm is used as the gas permeable material in the GDE, the wetting pressure of both the membrane and the GDE is 3.4 bar (such an example polymer membrane is available from the General Electric Company). Thus, liquid water will only penetrate and flood the GDE upon the application of 3.4 bar of pressure on the liquid side. The addition of a dense, thin film that is, nevertheless porous to gases but not to liquid water, on top of the PTFE may increase the wetting pressure to 10 bar or greater. By contrast, to the knowledge of the Applicant all other known GDEs have wetting pressures that currently do not exceed 0.2 bar. Thus, in one form the present example electrode has a wetting pressure above 0.2 bar, and preferably about 3.4 bar or greater.

In preferred examples the porous conductive material is attached to the gas permeable material (e.g. the polymer layer) by being physically (e.g. mechanically) or chemically bonded to the gas permeable material. This can be achieved by the presence of a binder material, or materials, that act to bind the porous conductive material and the gas permeable material together. The binder material may be present everywhere, substantially everywhere or almost everywhere between the porous conductive material and the gas permeable material. Alternatively, the binder material may be present at a selection of spots or regions between the porous conductive material and the gas permeable material. The binder material or materials may further be applied in a pattern to thereby securely attach the porous conductive material to the gas permeable material. The binder material may include, substantially or partially, the material which forms the gas permeable material, for example the polymer material which forms the polymer layer. Alternatively, binder material may be a mixture and comprise one or more unrelated materials which may concurrently impart one or more other desirable properties upon the binder mixture, such as also being a conductor of electricity or a catalyst.

In one example, the binder material attaches to the surface of the porous structure of the gas permeable material (e.g. polymer material or layer). In another example, the binder material penetrates the porous structure of the gas permeable material (e.g. polymer material or layer) to a depth less than the thickness of the gas permeable material (e.g. polymer material or layer).

Example gas permeable or breathable 3D electrodes can be formed by depositing a catalyst within a binder material (e.g. binder layer) on a gas permeable material, followed by attaching or laminating thereto, a porous conductive material. In one example, one could start with a gas permeable non-conductive material and then form thereupon, a binding layer using a binder material containing one or more catalysts. To this combination, a porous conductive material may be laminated using suitable heat and/or pressure.

In a preferred example the 3D electrode is flexible. The porous conductive material or layer can be made at least partially or wholly from a substance and/or in a form that is flexible. The gas permeable material can similarly be made at least partially or wholly from a substance and/or in a form that is flexible. Optionally, the gas permeable material is made at least partially or wholly from a polymer or a combination of polymers, for example PTFE, "expanded PTFE" (ePTFE), polyethylene or polypropylene. The polymer itself may or may not be gas permeable. For example, the polymer itself may not be gas permeable but a structure or membrane formed from the polymer is gas permeable.

Numerous other industrial electrochemical processes may benefit from the use of gas depolarized GDEs, if they were practically viable. These include the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, and others. Electrometallurgical applications, such as metal electrowinning, could also benefit from the energy savings associated with anode depolarization; metal electro-deposition occurs at the cathode side of such cells, while oxygen is evolved at the anode. If oxygen evolution was replaced by hydrogen oxidation on a suitable gas diffusion anode, this would generate substantial energy savings. However, the mechanical characteristics of conventional GDEs make them unsuitable for delimiting narrow-gap chambers, thereby restricting their application in the undivided electrolysis cells that are widely used in electrometallurgical processes. Moreover, conventional GDEs would leak under the hydraulic head of electrolytic solutions commonly used in industrial size electrolysers. Several industrial electrochemical processes in the pulp and paper industry may also benefit from the use of alternative GDEs that could be gas depolarized and withstand a higher pressure differential, including: (a) "black liquor" electrolysis, (b) "Tall Oil recovery" and (c) chloride removal electrolysis. Flooding of GDEs after the build-up of even very mild liquid pressures is, furthermore, a particular and well-recognized problem in fuel cells, such as hydrogen-oxygen fuel cells.

Thus, the electrochemical cell can be used in the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, (k) chlorine, (l) caustic (in general), (m) $CO_2$ from methane, and others.

In alternative examples, the electrochemical cell involves electrochemical processes unique to particular industries, Examples include:
- (iv) electrometallurgical applications, such as metal electrowinning;
- (v) pulp and paper industry applications, such as: (a) "black liquor" electrolysis, (b) "Tall Oil recovery" and (c) chloride removal electrolysis; and
- (vi) fuel cell and related device applications, such as hydrogen-oxygen fuel cells, including but not limited to alkaline fuel cells.

In another example aspect, the beneficial effect/s may be achieved by the fact that GDEs according to example embodiments make it possible and practical to carry out entirely new chemical processes, either in cells or devices. For example, hitherto unconsidered processes for the formation of fuels from carbon dioxide, or remediation of $SO_x$ and $NO_x$ pollution, are possible and practical using GDEs according to example embodiments.

In another example embodiment, one or more GDEs are used to inject or introduce a depolarizing gas not only into the depolarizing electrode but also in sufficient quantities to force the gas into the electrolyte to cause the formation of bubbles that will rise within the reactor, causing mixing within the electrolyte, and thereby increasing mass transfer and decreasing concentration polarization effects. Alternatively, one or more GDEs are used to inject an inert gas or some combination of inert gas and depolarizing gas. In this embodiment, the GDE acts like a fine bubble diffuser, and may carry out two functions: to add a gas to the cell and also to provide mixing. Thus, the depolarizing gas and/or an inert gas can be forced into the liquid electrolyte, via the at least one electrode, to cause bubble formation and/or mixing in the liquid electrolyte.

In various further examples: a porous conductive material or layer is provided attached to, positioned adjacent to, positioned or layered upon, or at least partially within the gas permeable material; the porous conductive material or layer is associated with the gas permeable material; the porous conductive material or layer is located on and/or within the gas permeable material; and/or, the gas permeable material is located on and/or within the porous conductive material or layer. In other examples, the gas permeable material is a gas permeable membrane or structure, a gas permeable polymer membrane or structure, a gas permeable porous polymer membrane or structure, or a gas permeable porous membrane or structure.

General Example Embodiments—3D Electrode and Gas Diffusion Electrode (GDE) with a Barrier Layer to Exclude Vapour from the Liquid Electrolyte An example embodiment 3D electrode or GDE may incorporate one or more barrier layers or barrier films that are highly or substantially permeable to the relevant gas stream, but relatively less permeable or impermeable to the transport of the reaction solvent in gaseous form. Several examples of such barrier layers or films exist. Examples of such barrier layers or films that are highly permeable to oxygen gas but poorly permeable or impermeable to water vapour include: polyolefins, poly(methylpentene), organosilicon polymer films, fluorocarbon or perfluorocarbon polymers, especially hyperbranched perfluorocarbon polymers, or mixtures thereof. The incorporation of such a barrier layer in the 3D electrode, for example a 3D GDE, preserves the gas stream outside of the 3D electrode from contamination by the gaseous form of the solvent used (e.g. water vapour) and also protects the gas channels outside of the 3D electrode from being blocked, impeded, or flooded by water condensate. The unique properties of the 3D electrode in respect of avoiding flooding, may thereby be transmitted to the entire network of gas channels and plumbing within a cell in which it is employed.

Additionally, because it can be practically difficult to completely prevent the formation of larger pores in a 3D electrode or to prevent defects from forming over the course of extended use, the barrier layer or barrier film may serve as a means to mask large pores and/or defects in the porous structure that could compromise the ability of the 3D electrode to perform a desired function, for example such as to prevent flooding.

The barrier layer or barrier film may be located on the gas side of the 3D electrode. Alternatively, the barrier layer or barrier film may be located on the liquid side of the 3D electrode, between the porous conductive material (e.g. conductive metallic material) and the gas permeable material (e.g. non-conductive polymer layer).

Preferably, the barrier layer or barrier film is highly or substantially permeable to the gases that are generated (as reaction products) or added (as reactants) from the gas side of the 3D electrode, but poorly permeable or impermeable to the solid, liquid, or gaseous components of the solvent used on the liquid side of the 3D electrode, namely, the electrolyte. For example, in 3D electrodes which form an interface between liquid water and oxygen gas, the barrier layer or barrier film is highly or substantially permeable to oxygen gas, but poorly permeable or impermeable to gaseous water vapour. In a second example in which a 3D electrode forms an interface between methane/natural gas and a liquid solvent, the barrier layer or barrier film is highly or substantially permeable to methane/natural gas, but impermeable or poorly permeable to the gaseous form of the liquid solvent.

In a particular example, the 3D electrode is a composite electrode and comprises a gas permeable material provided as a non-woven layer (e.g. high-density polyethylene fibers, such as for example Tyvek™ polymer material) attached to a barrier layer comprising a polymeric dense thin film (e.g. a polymethylpentene barrier layer) on one side, and a metal mesh on the other side, where the metal mesh is adhered to the polymer layer by a binder material.

Some General Methods of Fabricating an Example 3D Electrode or GDE

In one example, one could start with a gas permeable material provided as a non-conductive material and then apply the porous conductive material by depositing a conductive metallic material on the gas permeable material. In a further example, one or more catalysts can then be deposited as part of a binding layer, with subsequent lamination of the electrode assembly into a single structure using suitable heat and/or pressure. In a still further example, one may coat a binder material to provide a binding layer containing one or more catalysts onto a gas permeable material (e.g. a polymer layer) and then laminate the gas permeable material with a metallic material or layer pre-coated with the same binder material. Several other methods exist to fabricate an example embodiment.

Some General Advantages of Example 3D Electrodes and GDEs

As noted earlier, the presence of well-defined and narrow gas-solid-liquid interfaces in 3D electrodes of the present embodiments may eliminate many of the problems that are created in other classes of solid-liquid-gas electrodes, such as conventional gas diffusion electrodes, or trickle-bed electrodes. Examples of the problems that may be eliminated or diminished include, without limitation, instability in, inhomogeneity in, fluctuations in, and/or failure of the solid-liquid-gas boundary. Problems of this type may result in uneven, low yielding, incomplete or incorrect reactions, amongst others.

Additionally, the 3D electrodes can provide unexpectedly amplified electrochemical properties of the type describe earlier, including unusually high electrode activities per unit volume of deposited catalyst (included in the binder layer).

The inventors have found that unexpected and disproportionate advantages of this type may be realised when the electrode interface is fabricated in a careful, calibrated manner. For improved performance the electrode may also need to be operated at relatively low current densities, such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively.

Thus, for example, hydrogen-oxygen fuel cells utilizing the 3D electrodes typically require smaller quantities of catalysts than is normally the case using other types of electrodes. The produced 3D electrodes also do not necessarily require pure oxygen gas or highly compressed atmospheric air oxygen as a feedstock (as is the case in PEM fuel cells). Nor do the produced 3D electrodes necessarily require humidification of the feedstock gases (as is the case in PEM fuel cells). These advantages arise because the conductive layer in 3D electrodes of the present embodiments are well-defined, narrow, and have a high electrochemical area per unit volume of 3D electrode.

Other advantageous features which may be realised include, amongst others: (i) the catalyst in the interfacial region is maximally active, (ii) the catalyst is not wasted by being deposited in other, non-interfacial regions, where catalyst cannot act, (iii) the reactants have improved or maximum access to the electrode surface and suffer fewer limitations in terms of mass transport, and (iv) in one example application, water molecule products are readily and rapidly transported away from the reactive surface of the electrodes (due to the relatively narrow conductive layer and its high electrochemical surface area).

For illustrative purposes only and without limiting the invention, we now describe a representative common problem that may arise in conventional gas diffusion or particulate fixed bed electrodes and show how it may be eliminated in a 3D electrode of the present embodiments.

"Flooding" is a phenomenon that occurs when a liquid (product or reactant) partially or completely fills a gas diffusion electrode, thereby causing a breakdown in the solid-liquid-gas boundary and blocking electrochemical contact with the gas (reactant or product). Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. Regardless of its origin, flooding always induces a decline in the voltage output and power generation of such fuel cells.

Flooding does not, however, occur under normal operating conditions in 3D electrodes of the present embodiments since the three-phase solid-liquid-gas boundary is too well-defined and too narrow. There is a very clear separation of the liquid and gas phases in such electrodes, meaning that incremental percolation through the GDL does not occur. Moreover, the narrowness of the interface ensures that any condensation of any size is readily taken up and drawn back into the liquid phase, thereby effectively eliminating the possibility of flooding.

The above advantages confer utility and low-cost upon 3D electrodes of the present embodiments, as well as high performance relative to the current density employed. These properties make the 3D electrodes practical and useful in a variety of industrial applications, including but not limited to electro-energy and electro-synthesis applications. Many such applications are not practically viable without the use of 3D electrodes of the present embodiments. The 3D electrodes also allow the fabrication of practical and viable devices for these transformations, such as spiral-wound reactors and the like.

In further illustrative example applications, the 3D electrodes may also be used to improve or make viable electrochemical devices for, (i) converting air-based oxygen into pure or purer oxygen; (ii) manufacturing hydrogen peroxide; or (iii) use as fuel cells, both hydrogen-oxygen fuel cells and direct methane fuel cells. These example electrochemical devices share a common feature in that the 3D electrodes all display unusually high electrochemical activity relative to the current density employed. This activity appears to derive at least in part, from an unexpectedly strong capacity to sequester and consume oxygen gas from out of the air; a property that is believed to result from the well-defined and narrow three-way solid-liquid-gas boundary in the 3D electrode. The interface appears to create a remarkably selective reaction by the oxygen in air. The reaction is so strongly favoured that it continues within a sealed gas chamber even after the oxygen in the air has been largely depleted, thereby causing the formation of a partial vacuum in the gas chamber. Such a partial vacuum would normally halt or, at least, dramatically slow the reaction. However, in these cells, the vacuum continues growing until effectively all of the oxygen in the air is consumed. To the best of the inventors' knowledge, such effects have not been previously observed. This was undoubtedly because in these examples, the solid-liquid-gas boundary was carefully created to have a width/thickness of the order of 850 nm. This meant that the electrode could operate highly efficiently at a relatively low current density.

Beyond the above, 3D electrodes of the present embodiments may also display the following advantages:

(1) A dramatically higher wetting pressure than is achievable in any known conventional gas diffusion electrode. Conventional gas diffusion electrodes typically flood upon the application of <0.2 bar of external pressure. By contrast, electrodes of the current embodiments contain uniform pore structures in the gas permeable, water impermeable layers, so that they may require far higher external pressures before leaking. For example, embodiment electrodes may contain relatively small/tiny and uniform pore sizes, such as between about 10 nm to about 500 nm, or in one example about 0.2 microns, which can lead to a reduction in or avoidance of flooding of the electrode up to applied pressures of 3.4 bar. This means that a substantial pressure differential can be applied across the electrode, e.g. having an electrolyte at higher pressure on one side of the electrode compared to a gas region on the other side of the electrode, for example a pressure difference of about 3.4 bar, well above previously known electrodes. By this means, electrodes of the present embodiments can withstand a relatively higher pressure before leaking.

(2) Flexibility of the electrode; the materials used in the electrode can be optionally made to be flexible or bendable, and for example, able to be rolled or spiral-wound. The gas permeable material can be selected from, for example, different porous polymer materials and/or different pore sizes to achieve desired properties of the electrode. This flexibility distinguishes many previous electrodes that are rigid structures.

(3) The ability to produce electrodes of relatively large size. For example, for commercial applications, electrodes can be readily produced having a width and/or a length of greater than or equal to 0.05 m, 0.1 m, 0.2 m, 0.3 m, 0.4 m, 0.5 m, 1 m, or 2 m. In another example electrodes can be readily produced of about 0.05 m, about 0.1 m, about 0.2 m, about 0.3 m, about 0.4 m, about 0.5 m, about 1 m, about 2 m, or larger in width and/or length. In an application where an electrode is rolled or spiral-wound, the flat electrode before rolling may preferably have a width of about 0.05 m or greater, about 0.1 m or greater, about 0.2 m or greater, about 0.3 m or greater, about 0.4 m or greater, about 0.5 m or greater, about 1 m or greater, about 2 m or greater, and a length of about 0.5 m or greater, about 1 m or greater, about 2 m or greater, about 3 m or greater, about 4 m or greater, about 5 m or greater, about 10 m or greater. The rolled or wound electrode may have a diameter of about 0.05 m or greater, about 0.1 m or greater, about 0.2 m or greater, about 0.3 m or greater, about 0.4 m or greater, about 0.5 m or greater, or even larger. This relatively large size distinguishes many previous electrodes that can only be produced in a small size, for example up to the order of 0.01 m in size. The difference in size scale is not a trivial factor since many small electrodes cannot be simply scaled up in size. For example, in relatively small cells having small sized electrodes, it is not required to have or consider a high electrical conductivity in the cell/electrode, because the distances involved are small, so the associated resistances are relatively small. In contrast, in larger scale cells/electrodes, such as the present example, this issue is much more challenging and higher conductivity is required along very good conduction pathways. Hence, a small scale electrode structure cannot typically and simply be scaled up to a large scale electrode.

Further Aspects of Example Gas Diffusion Electrodes (GDEs)

For the purposes of this illustrative example, we refer to the combination of an expanded PTFE (ePTFE) membrane (General Electric Company; pore size 0.2 micron) (i.e. a gas permeable material) overlaid with a fine nickel mesh (200 lines per inch; manufactured by Precision eForming Inc.)

(i.e. a porous conductive material), optionally held together by a binder material, or a binder-catalyst material, including about 5-15% Nation in alcohol/water (supplied by Ion Power Inc.), and about 20-50% by weight of fillers and/or catalyst material.

Figure 1:
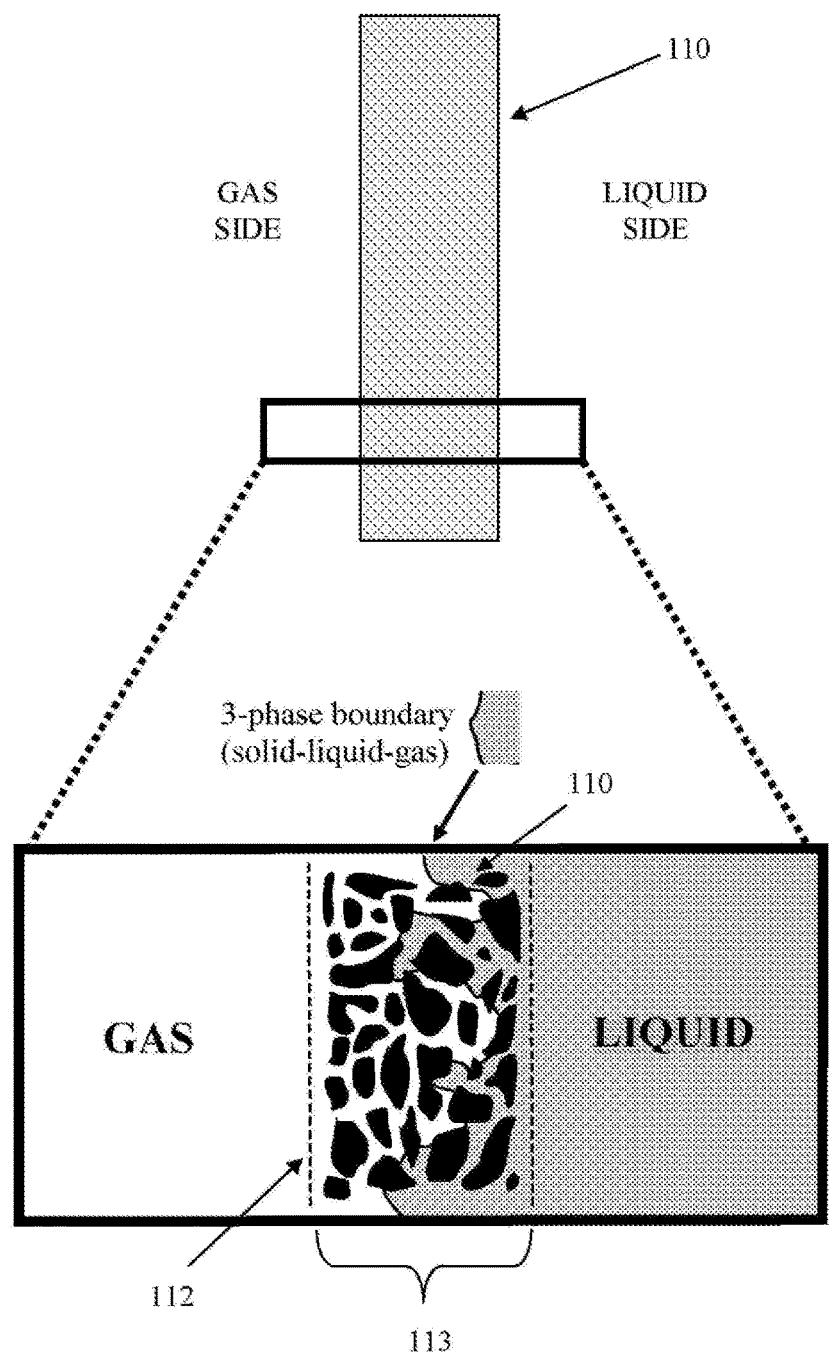
FIG. 1 (prior art) depicts in schematic form, a conventional gas diffusion electrode. The lower part of the figure is a magnified view of a section of the conventional gas diffusion electrode.

FIG. 1 depicts in a schematic form, a conventional gas diffusion electrode (GDE) 110, as widely used in industry at present (Prior Art). In cases where an electrode contains a zone or a layer that is intended to facilitate gas diffusion, FIG. 1 illustrates that gas diffusion layer or zone. FIG. 2 illustrates in schematic form the general structure of an example 3D electrode 115. In a conventional GDE 110, conductive particles (such as carbon particles) are typically mixed with non-conductive, hydrophobic Teflon particles, and then compressed and/or sintered into a single unit whose pore structure is ill-defined and non-uniform. By contrast, in an embodiment of the present GDE 115, the porous conductive material 130 and the gas permeable material 120 are substantially demarcated or separated, although there can be overlap at a boundary region. The pore structure of the gas permeable material 120, for example a non-conductive, hydrophobic material/element, is well-defined and uniform.

Figure 3:
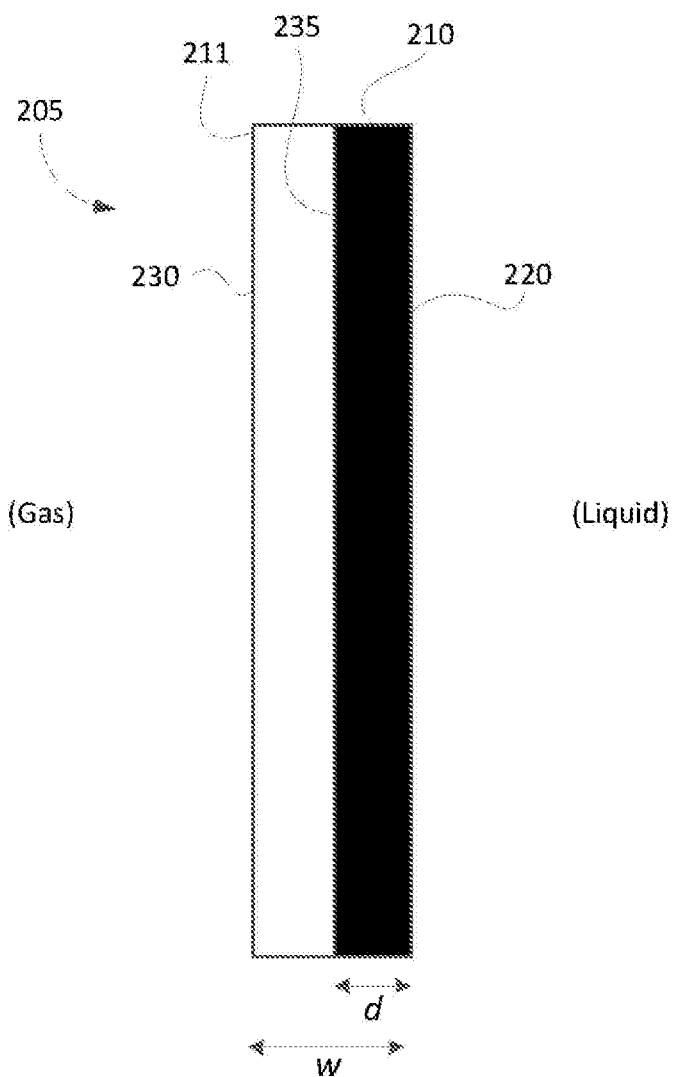
FIG. 3 depicts a schematic cross-sectional view of an example GDE (not to scale).

As can be seen in FIG. 3, the example 3D electrode 205 of width w includes a conductive layer or region 210 of width d with a non-conductive layer or region of width w-d. The dimensions are not accurate and are for illustration only. In the case of one particular example of a laminated electrode, the 3D conductive layer 210 (i.e. porous conductive material) comprises fine nickel mesh, which has a thickness of about 5-8 µm, while the 3D non-conductive layer 211 comprises an ePTFE membrane, which has a thickness of about 20 µm.

While the non-conductive layer or region 211 is thicker than the conductive layer or region 210 in this case, that need not be true in other cases of fabricated 3D electrodes. With other gas permeable materials and other techniques, this relative ratio may be quite different, with conductive layers or regions 210 being thicker and the non-conductive layers or regions 211 being thinner.

For example, in the case of an electrode where a binder material was applied with a paintbrush, the conductive layer comprised the fine nickel mesh and the binder material. The thickness of the binder material providing a binding layer was not easily controlled using a paintbrush, so that thicknesses of a binding layer of up to about 112 µm, for example, may be created. The binder material, moreover, penetrated the outermost portion of the ePTFE layer or membrane (to about 0.1-0.8 µm deep), so that the conductive portion may be cumulatively up to about 120 µm in thickness. The non-conductive portion would typically be about 19.2-19.8 µm thick. Thus, in such a case, the three-phase solid-liquid-gas boundary will fall within a maximum thickness of 0.8+120=120.8 µm. Such large thicknesses generally represent an extreme in the case of GDEs of the present embodiments, although thicknesses of 400-500 µm have also been achieved in the most extreme cases. Generally, but not exclusively, GDEs of the present embodiments formed by lamination of free-standing porous metallic structures to ePTFE membranes will have a three-phase solid-liquid-gas boundary that is less than about 100 µm thick.

In conventional GDEs, the entire GDE is conductive and different pore sizes and intermediate amounts of Teflon binder within the GDE, are used to create the solid-liquid-gas boundary that is formed inside the conventional GDE. However, because the pores in conventional GDEs are created by fusing layers of different particle size, there is relatively poor control on the pore size and distribution. The pores are therefore of a generally wide and non-uniform distribution. Moreover, the pores are generally large, being, at best, typically 30 microns in diameter at the outside edges of the GDE. The solid-liquid-gas boundary that is created within the GDE is therefore poorly controlled and ill-defined, with substantial variations in depth within the GDE. Small changes that occur during use of the GDE may therefore also shift the interface, causing the GDE to be prone to instability or even breakdown. Thus, a common problem in gas-liquid electrochemical transformations is flooding of the GDE. This occurs when the solid-liquid-gas boundary progressively relocates itself into the center of the GDE, until the GDE is effectively filled with liquid.

Whereas a conventional GDE relies upon the presence of larger pores in the center to provide for low-pressure ingress of gases to the interface, example GDEs of the present embodiments rely upon a substantial, large, relatively large or substantially large non-conductive layer or region 211 relative to the volume of the interface 235 with the conductive layer or region 210, to provide for low-pressure ingress of gases.

One advantage involves hitherto unavailable uniformity in how electrochemical gas-liquid reactions take place down the full length of the 3D GDE. Because the solid-liquid-gas boundary is so tightly constrained and uniform, such reactions will essentially occur in an identical way at all points of the interface along the length of the electrode. Practical problems arising from inhomogeneity and instability in the interface, as occur in many conventional GDEs, may therefore be largely eliminated. These include, without limitation, local excesses (or swamping/flooding) of reactants/products, leading to inefficient reaction, energy wastage (e.g. local hotspots), or electrode degradation. Moreover, once created, the interface is relatively stable and easily maintained— more stable and easily maintained that conventional GDEs. These properties result in 3D electrodes that may be more active per unit electrochemical area or per unit volume of catalyst than comparable conventional GDEs.

Another feature is that the solid-liquid-gas boundary is relatively delicate. By this it is meant that the solid-liquid-gas boundary can be degraded (reversibly and temporarily) by non-judicious applications of gas pressure (from the gas-facing side). For example, even relatively small over-pressures on the gas side of the GDE can push the liquid out of the conductive layer, diminishing the surface area of the boundary. This will occur at the so-called "bubble point" of the membrane polymer layer. In the extreme case, the liquid may even be pushed away from the electrode, effectively, destroying the solid-liquid-gas boundary or making it so small as to be practically useless. Moreover, in such a situation, gas bubbles may become trapped in the conductive layer or region 210, making it difficult (but not impossible) to regenerate the electrode. To avoid these possibilities, it is generally desirable or necessary to closely control external gas pressures and ensure that the conductive layer or region 210 is properly "wetted" prior to operation. Once operating, GDEs of the present embodiments are generally highly stable. While the solid-liquid-gas boundaries are "delicate" in that they may be destroyed or disrupted upon the application of excesses of pressure, it should be noted that the pressures required to disrupt the three-phase boundaries are much higher than is the case in conventional GDEs. That is, the three-phase solid-liquid-gas boundaries in example GDEs are much less delicate than is the case for conventional GDEs.

Considering another aspect of example electrodes, there are various ways to measure air permeability of a material.

For example, porosimietry can be used to determine the flow rate of air through membranes and coated membranes in units of liters per minute (L/min) as a function of applied pressure (in units of psi). Another way to measure air permeability is to use the 'Gurley number' scale, which is obtained with a Gurley densitometer. This measures the time (in seconds) taken to pass a particular fixed volume of air (2.5 cm$^3$) through a sample of fixed area (0.645 cm$^2$) at a fixed applied pressure (0.44 psi). The air permeability of the sample is inversely proportional to the Gurley number. That is, the larger the Gurley number, the less permeable to air is the sample.

Present example 3D electrodes, for example using a treated or coated ePTFE membrane, have an air permeability that is very similar to that of the untreated or uncoated ePTFE membrane, at all measured applied pressures. By contrast, the air permeability of a conventional gas diffusion electrode using a Gortex™ membrane as an 'electrolyte leakage barrier' declines very substantially. For example, Gortex™ membranes used in conventional gas diffusion electrodes typically have Gurley numbers of 50-800 seconds. In one example, after they were laminated to a conventional gas diffusion electrode, their Gurley number increased to about 9,000-16,000 seconds. This means that it took 20-180 times longer to transfer the same quantity of air through such an electrode (with a Gortex™ membrane) as it took to transfer the same quantity of air through the Gortex™ membrane only.

Thus, in some particular example 3D electrodes according to present embodiments, an advantage is that the 3D electrodes have improved permeability to air, or are substantially permeable to air, whereas conventional 3D electrodes are less so. That is, in one example, the air permeability of the 3D electrode is similar to, about equal to, the same as, or is substantially similar to, substantially about equal to, or substantially the same as, the air permeability of the gas permeable material (e.g. polymer membrane).

Figure 4:
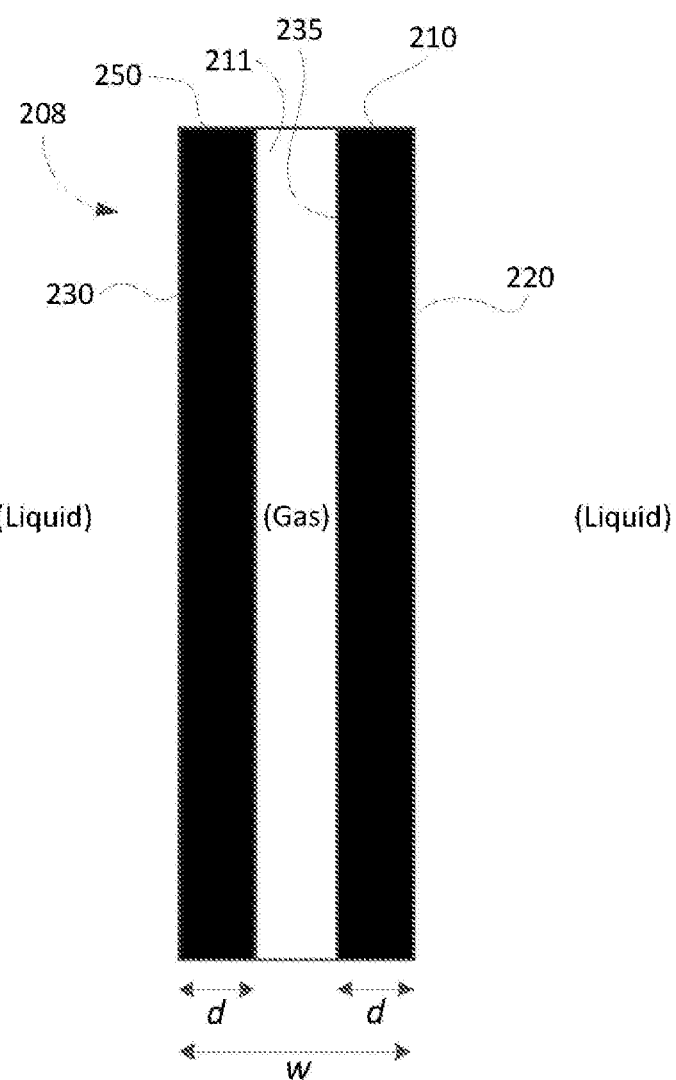
FIG. 4 depicts a schematic side view of an example GDE in which the two outer surfaces are both conductive (not to scale).

FIG. 4 schematically illustrates a GDE 208 in which a gas permeable material, such as a gas permeable polymer layer, has been laminated with, or attached to a porous conductive material, such as a conductive metallic layer, on both of its sides. The second conductive layer 250 may be applied to the GDE 208 at the same time as the first conductive layer 220. Alternatively the second conductive layer 250 may be applied after the first conductive layer 220 is applied. The same means of fabrication described in the earlier examples, or other means, may be used to generate the double-sided GDE 208.

Regardless of its method of manufacture, the effect of having metallic layers, regions or coatings on both sides of the GDE 208 is to make the central, non-conductive core or region 211, also a channel along which gases can pass. The outer metallic layers, regions or coatings face the liquid phase (e.g. in one example water).

The resulting membranous gas channel 211 within the body of such a double-sided gas diffusion electrode 208 may be remarkably permeable to gases. That is, the resulting gas channel may be able to accommodate and carry unexpectedly large quantities of gas even at atmospheric pressure. For example, in a particular but non-limiting application, when acting as a cathode in a water electrolysis cell operating at a current density of about 10 mA/cm$^2$ (which results in the generation of 1000 liters of hydrogen per day per square meter of electrode geometric surface), such a double-sided gas diffusion electrode 208 can extend up to about 2.5 meters away from an attached hydrogen collection apparatus without the inner gas channel of the electrode 208 becoming saturated and unable to carry more hydrogen at any point along its length. Such a double-sided GDE 208 may be used by dipping into a solution of electrolyte, with gas fed to or from the non-conductive central region or core 211.

Novel Properties of Example Gas Diffusion Electrodes (GDEs)—the Effect of Pressure and Temperature on Energy Efficiency and Flooding A feature of example GDEs of the present embodiments is that they allow for the application of a higher pressure to the liquid electrolyte than is present on the gases in the GDE. High liquid pressures (relative to the corresponding pressure of the gas on the gas-facing side of the GDE) often have the effect of improving the energy efficiency of electrochemical reactions. By contrast, conventional GDEs typically can only deal with very low liquid pressures before they flood (and thereby become inoperable).

For example, GDEs containing as their polymer layer, a General Electric Company PTFE membrane with average pore size 0.2 µm (used for membrane distillation in the water purification industry), are typically able to withstand up to about 3.4 bar of liquid pressure before they flood. This is because the PTFE membrane has a wetting pressure (or "water-inlet" pressure) of 3.4 bar.

Thus, an electrochemical cell employing such GDEs may have its liquid electrolyte pressurised up to 3.4 bar higher, in this case, than the pressure of the gases in and on the gas-facing sides of the GDEs. Many electrochemical processes involving gas-to-liquid or liquid-to-gas transformations are favourably affected by differential pressures of this type. Such a large pressure differential may therefore have the effect of substantially increasing the energy efficiency of the half-reaction which occurs at the GDE electrode. That is, one may achieve a particular rate of production at a lower applied cell voltage than was otherwise needed.

By contrast, conventional GDEs typically have wetting pressures below 0.2 bar, meaning that they flood upon the application of more than 0.2 bar to the liquid electrolyte. The option to apply higher differential pressures above 0.2 bar to liquid electrolytes in such cases, is therefore not available.

Thus, in one example embodiment, an electrochemical cell employing a GDE can have its liquid electrolyte pressurised to at least 0.2 bar and up to about 3.4 bar higher than the pressure of the gases in and on the gas-facing sides of the GDE.

A second feature of example GDEs of the present embodiments is their unusual properties at increasing temperatures. One effect of higher temperatures is to increase the amount of water vapour within a GDE and therefore also to increase the potential for condensation of that water vapour (flooding) within the GDE. An example GDE, with a high wetting pressure of, for example, 3.4 bar, is far less easily wet (if not being, effectively un-wettable) than a conventional GDE with a wetting pressure of 0.1 bar. For this reason, the conventional GDE will be at greater risk of flooding with increasing temperature than a GDE of the present embodiments with a higher wetting pressure (e.g. 3.4 bar).

Thus, cells employing example GDEs of the present embodiments may have their liquid electrolyte heated to higher temperatures than those having conventional GDEs, without risk of flooding the GDE. For many electrochemical processes, higher temperatures have the effect of improving the energy efficiency of the half-reaction at the electrode and thereby the increasing the energy efficiency of the overall process. Moreover, most electrolytic cells are "self-heating" in that the excess energy which must be applied to drive the reaction, is released as heat.

Illustrative Example—Fabricating Electrodes Using Deposition of Conductive Metals In other alternative examples there are provided 3D electrodes which include a gas permeable material and a porous conductive material partially coating the gas permeable material. Referring back to FIG. 3 to illustrate this electrode structure, the porous conductive material penetrates the gas permeable material to a depth (d) less than the thickness (w) of the gas permeable material. For example, the depth is between about 5 nanometers to about 0.4 millimeters, dependent on sufficient thickness of the gas permeable material, e.g. gas permeable membrane. Alternatively, in another preferred form, the depth is between about $1/100,000^{th}$ to about $1/1.5^{th}$ of the thickness of the gas permeable material.

A conductive layer is formed at one surface of the 3D electrode and a non-conductive layer is provided or formed at the other, opposing, surface of the 3D electrode. The conductivity of the 3D electrode thus varies along the thickness of the 3D electrode. The conductive layer is gas permeable and at least partially liquid permeable, whereas the non-conductive layer is gas permeable and liquid impermeable. The conductive layer is part of an outer surface of the 3D electrode and is relatively less hydrophobic than the gas permeable material, whereas the bulk 3D electrode is gas breathable and liquid impermeable.

In other example forms: when used as a GDE, a three-way solid-liquid-gas boundary is formed within the 3D electrode; the solid-liquid-gas boundary is narrow in macroscopic width compared to the thickness of the 3D electrode or the gas permeable material. For example, the solid-liquid-gas boundary may be up to 850 nm wide.

Generally, for the examples discussed here, there is provided a process for preparing a 3D electrode or a GDE, comprising the steps of: a fabrication step to fabricate the 3D electrode or a GDE, including determining or setting a width of a three-phase solid-liquid-gas boundary, preferably where the width is narrow in relation to the width of the 3D electrode or a GDE; and an operation step to operate the 3D electrode or a GDE, preferably in a cell, at low current density, for example from 1 mA/cm² to 500 mA/cm², or from 1 mA/cm² to 200 mA/cm², or from 1 mA/cm² to 100 mA/cm², inclusively.

Referring back to FIG. 3 as a structural illustration for this alternative example, where the metallic and/or binder material has penetrated the pores of the non-conductive layer or region 211 the conductive layer or region 210 closest to the interface 235 or boundary region may also have a pore structure and other properties (e.g. hydrophobicity, wetting, and gas/liquid permeability), that are essentially identical, or, at least, very similar, to that of the non-conductive layer or region 211. In such a case, the boundary region or interface 235 between the layers or regions 210, 211 is not so much characterised by a structural change, as by an electrical change. It is, effectively, only a boundary region or interface of electrical conductivity. On one side of boundary or interface 235, layer or region 210 is conductive or somewhat conductive, whereas on the other side of boundary or interface 235, layer or region 211 is non-conductive. Moreover, on both sides of the boundary, boundary region or interface 235, the pores are uniform and small (about 0.2 micron in this case, although smaller pores can be obtained using other membranes). For this type of example 3D electrode, there is a substantially uniform or highly uniform pore structure and distribution, especially about the conductive-non-conductive boundary, which can be readily varied by merely selecting a different membrane to use as a gas permeable material. Important other properties (e.g. hydrophobicity, wetting, and gas/liquid permeability) are also unchanged on both sides of the interface 235.

The gas permeability of the conductive layer or region 210 is, moreover, either identical to or greater than that of the non-conductive layer or region 211 (except, of course, in the non-optimum case where the membrane has been blocked by an over-thick application of the conductive layer). Thus, gases may readily and uniformly pass through the electrode 205 (in this alternative example). The gas permeability of the 3D electrode 205 is, additionally, readily characterizable, being created by and being substantially the same as that of the uncoated gas permeable material, for which gas permeability data may routinely exist.

The liquid permeability of a 3D electrode depends largely or even entirely on the gas permeable material and the liquid with which it interacts. A hydrophilic polymer allows a hydrophilic liquid to pass through evenly and uniformly. The same is true for a hydrophobic polymer interacting with a hydrophobic liquid. In the case where there is a mismatch between the polymer and the liquid, an interface is created between the liquid and the 3D electrode. The extent and nature of that interface depends on the materials involved.

In further various examples, the wetting pressure for the GDEs is the same as that of the polymer layer or membrane used (for example the General Electric Company membrane of 0.2 μm average pore size), which is about 3.4 bar. Thus, only upon the application of 3.4 bar of pressure on the liquid side does liquid water penetrate and pass through the membrane, thereby flooding the membrane. By contrast, all other GDEs known to the Applicant have wetting pressures that do not exceed 0.2 bar.

In various further examples: a porous conductive material or layer is provided at least partially within the gas permeable material; the porous conductive material or layer is associated with the gas permeable material; the porous conductive material or layer is located on and within the gas permeable material, and/or, the gas permeable material is located on and within the porous conductive material or layer. Preferably, though not necessarily, the conductive material is a metal, which after being applied is in the form of the porous conductive material. For example, the conductive material forming the porous conductive material can be Nickel. Alternatively, the metal could be Ti, Cr, Pt, Cu, Pb, Sn, Co, Mn, Au or Ag. Further, the porous conductive material could be formed of carbon black particles.

In further examples, the depth (d) of the conductive layer or portion is in the range of about 1 nm to about 10 μm, or about 50 nm to about 1 μm, or about 50 nm to about 500 nm. In a specific example, the porous conductive material is formed of Nickel, the gas permeable material is a 0.2 micron PTFE membrane and the depth is greater than 0 and less than about 850 nm.

In an example method of fabricating this form of 3D electrode, the steps include selecting a gas permeable material, for example with a substantially uniform pore size, and then applying, as a calibrated step, a conductive material to partially coat the gas permeable material, thereby forming a porous conductive material. The porous conductive material penetrates the gas permeable material to a depth less than the thickness of the gas permeable material. The calibrated step can include: a particular mode of application; a particular time or period of application; a particular electrical current or range of current of application; a particular temperature or range of temperature of application; and/or a particular circumstance or range of circumstances of application. The ideal conditions by which the calibrated deposition is performed, are typically determined by a program of study to realise a suitably narrow and well-defined solid-liquid-gas boundary in the desired range of widths, such as from 50 to 850 nm width. In one example, the conductive material can be Nickel and can be applied by vacuum deposition at a loading of greater than about 0.455 g/m² and less than about 3.64 g/m². Preferably, in this particular example, the Nickel is provided at a loading of about 1.82 g/m², which has the effect of imparting the electrode with unexpectedly amplified electrochemical properties when operated at a current density of 10 mA/cm² in the manufacture of: (i) pure oxygen from air oxygen, (ii) hydrogen peroxide from aqueous alkaline solution, or (iii) electrical potential and current in an alkaline fuel cell or a direct methane fuel cell.

Calibrated or careful application of one or more electrically conductive materials to gas permeable materials, for example porous polymer membranes, using controllable coating techniques can be used to produce 3D electrodes. When formed in a calibrated manner, one or more conductive layers may form part of a 3D electrode with unexpected and improved electrochemical performance, especially relative to other 3D electrodes and to the cost of manufacture. Further layers, for example including catalytic or other materials, can be conveniently added to, or formed upon the one or more conductive layers to produce more complex 3D electrodes that are practical and useful in electro-energy or electro-synthetic applications.

Example gas permeable or breathable 3D electrodes can be formed by depositing a conductive material or layer on a gas permeable material and, optionally, subsequently depositing a catalyst on the conductive material or layer. In one example, one could start with a gas permeable non-conductive material and then form the conductive material or layer on the gas permeable non-conductive material, and thereafter, deposit one or more catalysts.

In the case of an example 3D electrode manufactured in this manner, and referring back to the structure illustrated in FIG. 3, a gradual change in hydrophobicity exists in moving from the outside surface 220 through the conductive layer or region 210 which may penetrate the gas permeable material to depth d. The outer metal-binder surface 220 is relatively less hydrophobic, but this becomes more hydrophobic on moving into the non-conductive layer or region 211 toward the highly hydrophobic, non-conductive surface 230. The distance over which this hydrophobicity changes may be small, in one example being effectively only the depth into which the binder material penetrates the gas permeable material, for example in the case of ePTFE pore structure about 0.1-0.8 μm. This is narrower than the depth d, which defines or approximates the thickness of the conducting layer (for example about 8 μm to about 120 μm in some examples).

Thus, for this particular 3D electrode, a liquid solvent like water is likely able to partially penetrate at least some of the way into the conductive outer layer or region 210, which in one example form may be provided by applying or depositing a metallic coating. But water will be repelled and unable to penetrate into the highly hydrophobic interior. The liquid is therefore limited to, in one example the about 0.1 μm to about 0.8 μm thick outermost portion of the ePTFE, which has a high internal surface area, most of which may be conductive (after attachment of the metallic coating). The ingress of liquid water into the electrode 205 is therefore tightly controlled and a solid-liquid-gas boundary is created within, in one example, the outermost layer of about 0.1 μm to about 0.8 μm in depth. At this interface, gas from the non-conductive side 230 of the electrode 205 encounters liquid ingression from the outside of the membrane, at the conductive, metallized region.

According to various aspects provided by way of example:

(1) Carefully calibrated application of one or more conductive materials to gas permeable materials, such as porous polymer membranes, using controllable coating techniques can produce 3D conductive electrodes of remarkable and unexpected robustness, activity, and electrochemical area per unit volume, and which, when configured for gas-to-liquid and/or liquid-to-gas processes, display uniquely well-defined, narrow, and stable three-way solid-liquid-gas boundaries;

(2) When applied in a calibrated manner, conductive layers of this type constitute the formation of a 3D electrode with unexpected and amplified electrochemical performance, especially relative to other 3D electrodes and to the cost of manufacture;

(3) Additional layers including catalytic or other materials may be conveniently added to, or formed upon the conductive one or more layers to yield more complex 3D electrode structures that are practically useful in, especially, electro-energy or electro-synthetic applications;

(4) The availability of 3D electrodes, for example fabricated as described in points (1)-(3) above, makes viable or improves the practicality of a range of electro-energy and electro-synthetic applications. Such applications are typically unviable or relatively less practical using conventional fixed-bed or gas diffusion electrode technologies.

In various example forms, the coating techniques include but are not limited to metal vacuum-coating, sputter-coating, dip-coating, electroless- and electro-coating, powder-coating, and the like. In various example forms, the catalytic or other layers are applied by techniques, including but not limited to: electro- or electroless-coating, powder-coating, dip-coating, vacuum-coating, and the like. While coating techniques such as these have been previously applied to membranes which have subsequently been used to facilitate electrocatalytic transformations, the inventors have found that such metal-coating can be optimised in a different way, which provides for novel and improved catalytic properties, especially, but not exclusively, when operated at low current density. The unique mode of optimisation in such cases is directed at achieving a well-defined and narrow solid-liquid-gas boundary during operation as a GDE, such as having a macroscopic or maximum width of from about 50 to about 850 nm.

Optionally, but preferably, the 3D electrode is flexible. Optionally, but preferably, the gas permeable material is made at least partially or wholly from a substance that is flexible, for example at least partially or wholly from a polymer or a combination of polymers, for example PTFE, ePTFE, polyethylene, polysulfone or polypropylene. The polymer itself may or may not be gas permeable. For example, the polymer itself may not be gas permeable but a structure or membrane formed from the polymer is gas permeable.

Fabricating GDEs Using Lamination

In another specific example, an expanded PTFE (ePTFE) membrane manufactured by General Electric Company for the water treatment industry (pore size 0.2 micron) had a fine nickel mesh (200 line per inch; manufactured by Precision eForming Inc.) laid down upon the membrane. The mesh was then carefully lifted, starting at one edge and a layer of a binder material (15% Nafion in alcohol/water; supplied by Ion Power Inc., containing 10% by weight of carbon black, supplied by Sigma-Aldrich) was applied to the membrane surface. The mesh was thereafter released and allowed to contact the coated membrane. After leaving to dry for 4 hours at 60° C., the mesh was adhered to the surface of the PTFE membrane. This fabrication method may be amended in several ways. The binder material may be applied or painted over the unconnected mesh and the membrane and then dried, causing the mesh to adhere to the membrane. Alternatively, the binder material may be separately applied to the membrane surface and the mesh, with the coated, wet membrane and mesh then married up and dried.

Further aspects and details of example electrodes that can be utilised as GDEs can be found in the Applicant's concurrently filed PCT patent application "Composite Three-Dimensional Electrodes and Methods of Fabrication" filed on 30 Jul. 2014, which is incorporated herein by reference.

Deploying Example Embodiment GDEs in Industrial Applications

The 3D electrodes being applied as GDEs allows a new type of electro-synthetic (i.e. electrochemical) or electro-energy cell to be achieved. The cell includes a liquid electrolyte and at least one gas diffusion electrode as discussed above. The GDE in use can operate as a gas depolarized electrode and includes a gas permeable material that is substantially impermeable to the liquid electrolyte, as well as a porous conductive material provided on a liquid electrolyte-facing side of the at least one gas diffusion electrode. The porous conductive material can be attached to the gas permeable material by being laminated to the gas permeable material. Alternatively, the porous conductive material is attached to the gas permeable material by being coated on at least part of the gas permeable material.

The GDE and the materials or layers used to form the GDE are optionally, but preferably, flexible. This advantageously allows the GDE, and reactors or cells which include the GDE, to be bent and wound. In order to form spiral wound devices, a multi-layered arrangement of flat-sheet membranes may be rolled up into a spiral wound arrangement. The spiral wound arrangement may then be encased in a casing, which holds the spiral-wound element in place within a module whilst allowing for electrolyte to transit through the module. Alternatively and optionally, the multi-layered electrochemical reactor in a flat-sheet arrangement is not wound into a spiral, but deployed in its flat-sheet arrangement, that is the electrochemical reactor is a flat layered arrangement. An advantage of this cell arrangement is that it provides for high density of construction and may thereby provide an inexpensive way of deploying gas diffusion electrodes in an electrochemical reactor or cell.

In another embodiment there is provided an electrochemical reactor, comprising a plurality of hollow fibre electrodes (as either or both of cathode or anode) and a plurality of other electrodes (as the opposite electrode). A plurality of hollow fibre cathodes comprise a hollow fibre gas permeable, but electrolyte-impermeable material having a conductive layer, that may include a catalyst. A plurality of hollow fibre anodes comprise a hollow fibre gas permeable membrane having a conductive layer that may include a catalyst. Further details of these aspects can be found in the Applicant's concurrently filed PCT patent application "Modular Electrochemical Cells" filed on 30 Jul. 2014, which is incorporated herein by reference.

Utilising GDEs with Wetting Pressures/Bubble Points Above 0.2 Bar

GDEs of this type or class may be very useful in industrial electrochemical reactions when embodiments of the method and/or electrochemical cell are applied. The resulting improvement in energy efficiency or other benefits that are typically realised originate in two key features which must be created and maintained in GDEs in order to achieve maximal efficacy:

a. The three-way solid-liquid-gas interface within the GDE should be maintained in a well-defined, narrow, and/or stable state during operation. The higher the quality of this interface and its reproducibility, the more electrochemically and catalytically active the GDE is likely to be. This is because gas-liquid reactions depend critically on a clear and invariant interface.

b. The electrode face of the GDE should be maintained as bubble-free or substantially free of new bubble formation, during operation. This is because bubbles at the electrode surface hinder reactants from reaching the surface and products from departing from the surface (the bubbles "mask" the electrode surface). Additionally, bubbles displace electrolyte from between the electrodes (i.e. they replace electrolyte with gaseous voids). This has the effect of potentially greatly increasing the solution resistance, resulting in wasteful energy consumption.

Embodiments of the method and/or electrochemical cell help to improve, create and/or maintain the above features, as best possible for the GDEs used. For illustrative purposes only, we describe examples of some representative case where the method and/or electrochemical cell helps to create and maintain the above features in a GDE with a wetting pressure and/or bubble point of more than 0.2 bar.

In one example, the method and electrochemical cell may help maintain the quality of the three-way solid-liquid-gas interface, whilst still creating conditions that are maximally advantageous for the reaction itself. Thus, consider a reaction which is most advantageously carried out at very high absolute gas pressure. Normally it would be extremely difficult to apply a very high gas pressure through a GDE whilst still maintaining the gas-liquid interface. However, example embodiments allow for high or extremely high gas pressures, by providing that the liquid phase is pressurised such that the differential pressure of the gas phase over the liquid phase does not reach the bubble point. In this way, the quality of the gas-liquid interface is maintained and, indeed, provides a means to create and maintain the gas-liquid interface even at high or very high applied gas pressures.

In another example, the method and/or electrochemical cell helps suppress bubble formation at the GDE for the case of an electrochemical process where a large differential pressure of the liquid side over the gas side, is preferred or optimum. This may arise when a reactant chemical species in the liquid electrolyte is transformed electrochemically into a gaseous product at the electrode surface of the GDE. In such a case, a high pressure differential of the liquid side over the gas side will typically have the effect of increasing the threshold partial pressure of the gas at the electrode surface required to create and hold up a bubble in the liquid electrolyte. This threshold partial pressure will, theoretically, be increased by the same amount as the differential pressure. For example, consider the situation where, at atmospheric pressure, bubbles are formed in the liquid electrolyte at the conductive surface of a GDE when the gas partial pressure at that surface reaches 5 bar. Now consider the situation where 2 bar of pressure is applied to the liquid phase, while the gas phase is maintained at atmospheric pressure. In order to form bubbles at the electrode surface, the gas partial pressure at the surface would now have to be more than 7 bar (=5 bar normally+2 bar additional applied pressure). In making bubble formation more difficult, the product gas is thereby instead encouraged to migrate directly from the electrode surface through the gas permeable, liquid-impermeable portion of the GDE to its gas-facing side.

The method and/or electrochemical cell may similarly help suppress bubble formation at the GDE in an electrochemical process where a reactant gas is transformed into a liquid-product at the GDE. In this case, the reactant gas migrates from the gas side through the GDE to its electrically conductive surface to there be transformed into the liquid-phase product. In such cases, bubbles are formed at the electrode surface only when the gas pressure exceeds the so-called "bubble point" of the GDE. The effect of increasing the pressure on the liquid side of the GDE is then, effectively, also to increase the bubble point by the same amount and thereby make bubble formation less likely. For example, the bubble point of the above-cited GDE utilizing expanded PTFE (ePTFE) membrane with 0.2 µm pores, is in the region of 2 bar. Thus, if, during a sudden and unexpected gas pressure swing, the GDE gas pressure were to reach 2 bar while the GDE liquid pressure was atmospheric, bubbles will form at the electrode surface. However, if the liquid was pressurised to 3 bar, then bubbles will form at the electrode surface only if the GDE gas pressure were to unexpectedly reach 5 bar (=2 bar normal bubble point+3 bar additional applied pressure). Thus, high pressures on the liquid electrolyte relative to the gas side of the GDE may discourage and suppress bubble formation in this case also.

In avoiding or suppressing bubble formation in one of the above ways, one may therefore:
  (i) increase the inherent efficiency of the liquid-to-gas chemical transformation, and/or
  (ii) minimize the negative effects that are typically associated by the presence of bubbles at electrode surfaces in electrochemical cells.

For example, GDEs may be conveniently and reliably fabricated with tiny (less than about 500 nm, or less than about 250 nm) and uniform pores that are not easily or inexpensively achieved in the fabrication of conventional GDEs. For example, the average pore size can be from about 50 nm to about 500 nm, or from about 100 nm to about 500 nm, or from about 100 nm to about 250 nm, or in more specific examples about 0.1, 0.2, 0.3, 0.4 or 0.5 microns. Additionally, the desired pore size and other properties can be readily varied by simply selecting a different polymer membrane for adaption into a GDE. Membranes with a wide variety of pore sizes and uniformly-distributed physical properties are readily available. By controlling the pore size of the substrate polymer, one may also control important physical properties of the GDE, such as the wetting pressure, the bubble point, and its permeability to gases.

GDEs of this class or type typically have substantially the same wetting pressure as that of the gas permeable polymer membrane substrate used. For example, a PTFE membrane (available from General Electric Company for membrane based distillation) having average pore size 0.2 µm has a wetting pressure of 3.4 bar. A GDE containing such a membrane as the non-conductive, gas permeable, polymer layer (the gas permeable material), next to or on which the metallic material, element or coating (the porous conductive material) is located, will typically also display a wetting pressure of about 3.4 bar. Thus, liquid water will only penetrate and flood the GDE upon the application of 3.4 bar of pressure by, or on the liquid. Moreover, PTFE is resistant to, and unaffected by caustic solutions, such as the 32% NaOH solutions used at the cathode in chlor-alkali cells. Metallic elements laminated with, attached to or coated on the PTFE membranes, such as nickel or nickel meshes, are also resistant to and unaffected by caustic solutions.

By contrast, conventional GDEs have wetting pressures that are said not to exceed 0.2 bar, meaning that they readily allow electrolyte to leak even at very mild liquid pressures.

The ability to produce electrodes of relatively large size. For example, for commercial applications, electrodes can be readily produced having a width and/or a length of greater than or equal to 0.05 m, 0.1 m, 0.2 m, 0.3 m, 0.4 m, 0.5 m, 1 m, or 2 m. In another example electrodes can be readily produced of about 0.05 m, about 0.1 m, about 0.2 m, about 0.3 m, about 0.4 m, about 0.5 m, about 1 m, about 2 m, or larger in width and/or length. In an application where an electrode is rolled or spiral-wound, the flat electrode before rolling may preferably have a width of about 0.05 m or greater, about 0.1 m or greater, about 0.2 m or greater, about 0.3 m or greater, about 0.4 m or greater, about 0.5 m or greater, about 1 m or greater, about 2 m or greater, and a length of about 0.5 m or greater, about 1 m or greater, about 2 m or greater, about 3 m or greater, about 4 m or greater, about 5 m or greater, about 10 m or greater. The rolled or wound electrode may have a diameter of about 0.05 m or greater, about 0.1 m or greater, about 0.2 m or greater, about 0.3 m or greater, about 0.4 m or greater, about 0.5 m or greater, or even larger. This relatively large size distinguishes many previous electrodes that can only be produced in a small size, for example up to the order of 0.01 m in size. The difference in size scale is not a trivial factor since many small electrodes cannot be simply scaled up in size. For example, in relatively small cells having small sized electrodes, it is not required to have or consider a high electrical conductivity in the cell/electrode, because the distances involved are small, so the associated resistances are relatively small. In contrast, in larger scale cells/electrodes, such as the present example, this issue is much more challenging and higher conductivity is required along very good conduction pathways. Hence, a small scale electrode structure cannot typically and simply be scaled up to a large scale electrode.

Further aspects and details of example electrodes that can be utilised as gas depolarized electrodes, for example gas depolarized GDEs, can be found in the Applicant's concurrently filed PCT patent applications "Composite Three-Dimensional Electrodes and Methods of Fabrication" filed on 30 Jul. 2014, "Modular Electrochemical Cells" filed on 30 Jul. 2014, and "Method and Electrochemical Cell for Managing Electrochemical Reactions" filed on 30 Jul. 2014, which are all incorporated herein by reference.

A depolarizing gas can be received by at least one gas diffusion electrode to gas depolarize the electrode. The depolarizing gas changes a half-reaction that would occur at the at least one gas diffusion electrode to a half-reaction that is energetically more favourable. By adapting gas permeable materials (e.g. non-conductive, gas permeable, hydrophobic membranes) to the fabrication of gas diffusion electrodes one may conveniently impart pore properties to the gas diffusion electrode that are highly desirable, uniformly-dispersed, and otherwise un-obtainable. Other desirable properties may also be imparted to the GDE, such as wetting, hydrophobic/hydrophilic and gas or liquid permeation properties.

The following examples provide more detailed descriptions of particular embodiments. The examples are intended to be illustrative and not limiting to the scope of the invention.

Example 1

The Phenomenon of Gas Depolarization

In the majority of industrial electrochemical processes, the counter electrode is not productive to the process. By using, for example, an oxygen- or a hydrogen-depolarized electrode, the theoretical cell voltage can be decreased by about 1.23 V.

Hydrogen Depolarized Anodes: For example, at low pH, in the presence of water as an electrolyte, the following reaction is common at the anode of industrial electrolytic processes:

$$2H_2O \rightarrow O_2 + 4H^+ + 4e^- \quad E^0_{ox} = -1.23 \text{ V}$$

However, when the anode is depolarized by the addition of hydrogen gas, the following reaction occurs:

$$H_2 \rightarrow 2H^+ + 2e^- \quad E^0_{ox} = 0.00 \text{ V}$$

The effect of changing the anode reaction is therefore to decrease the overall cell voltage by 1.23 V.

A similar situation pertains at high pH, in the presence of water as an electrolyte, when the following reaction is common at the anode of industrial electrolytic processes:

$$4OH^- \rightarrow O_2 + 2H_2O + 4e^- \quad E^0_{ox} = -0.40 \text{ V}$$

However, when the anode is depolarized by the addition of hydrogen gas, the following reaction occurs:

$$H_2 + 2OH^- \rightarrow 2H_2O + 2e^- \quad E^0_{ox} = 0.83 \text{ V}$$

The effect of changing the anode reaction is therefore to decrease the overall cell voltage by 1.23 V.

Oxygen Depolarized Cathodes: At low pH, in the presence of water as an electrolyte, the following reaction is common at the cathode of industrial electrolytic processes:

$$2H^+ + 2e^- \rightarrow H_2 \quad E^0_{red} = 0.00 \text{ V}$$

However, when the anode is depolarized by the addition of oxygen gas, the following reaction occurs:

$$O_2 + 4H^+ + 4e^- \rightarrow H_2O \quad E^0_{red} = 1.23 \text{ V}$$

The effect of changing the cathode reaction is therefore to decrease the overall cell voltage by 1.23 V.

Similarly, at high pH, in the presence of water as an electrolyte, the following reaction is common at the cathode of industrial electrolytic processes:

$$2H_2O + 2e^- \rightarrow H_2 + 2OH^- \quad E^0_{red} = -0.83 \text{ V}$$

However, when the anode is depolarized by the addition of oxygen gas, the following reaction occurs:

$$O_2 + 2H_2O + 4e^- \rightarrow 4OH^- \quad E^0_{red} = 0.40 \text{ V}$$

The effect of changing the cathode reaction is therefore to decrease the overall cell voltage by 1.23 V.

Example 2

Improving the Energy Consumption of the Chlor-Alkali Process by Using Gas Diffusion Electrodes (GDEs)

Figure 5:
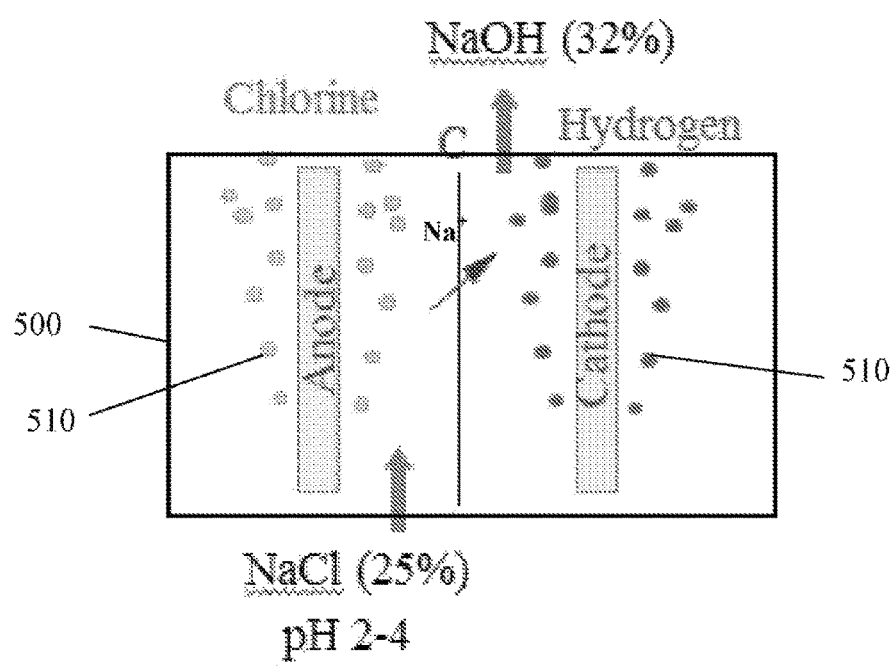
FIG. 5 (prior art) depicts a schematic illustration of the chlor-alkali process in a conventional electrochemical cell.

FIG. 5 (prior art) schematically illustrates the electrode configuration in a modern-day conventional chlor-alkali cell 500. An anode is bathed in a brine solution (typically 25% NaCl) that has been acidified to pH 2-4. Under the applied potential, bubbles of chlorine gas form (from the chloride ions in the solution) on the anode. The bubbles are collected at the top of the cell. The excess $Na^+$ ions then migrate across an ion exchange membrane (in this example a Na-exchange membrane, marked as "C" in FIG. 5) into a separate chamber in which the cathode is present. The electrolyte in the cathode chamber is typically highly alkaline, being 32% NaOH ('caustic'). The caustic is a potentially valuable product of the process, which is typically sold at commercial prices. Under the applied potential, bubbles of hydrogen gas form at the cathode and are collected at the top of the cell. The hydrogen is an unwanted by-product of the process and must be disposed of.

The half-reactions that occur are, as noted previously:

| At the Anode: | $2Cl^- \rightarrow Cl_2 + 2e^-$ | $E^0_{ox} = -1.36$ V |
|---|---|---|
| At the Cathode: | $2H_2O + 2e^- \rightarrow H_2 + 2OH^-$ | $E^0_{red} = -0.83$ V |
| | | $E^0_{cell} = -2.19$ V |

While the formal cell voltage is 2.19 V, a substantially higher voltage must generally be applied to drive the process in practical applications. This is, in part, to overcome the solution resistance created by the bubbles 510 of gas present in the solution at the anode and cathode. Additionally, before they are released, the bubbles coat a substantial portion of the electrodes, thereby reducing the electrochemically active surface area and productivity of each electrode and creating further resistance; this is known as "masking" of the electrode.

For example, in a typical industrial "membrane" chlor-alkali cell, the driving voltage is in the range 3.0-3.6 V, with a current density of 200-500 mA/cm² (This data is drawn from Table 6.19.6 on page 796 of the book "Chemical Technology, An Integral Textbook", by Andreas Jess and Peter Wasserscheid, Wiley-VCH, 2013). The electrical energy required to manufacture 1 kg of chlorine under these circumstances can be calculated to be 2.49 kWh/kg $Cl_2$. The theoretical minimum electrical energy required for the reaction ($E_{cell}$ 2.19 V) is 1.65 kWh/kg $Cl_2$. A typical industrial cell of this type therefore operates with an electrical efficiency of: (1.65/2.49)×100=66% electrical efficiency. The remaining electrical energy is released as heat.

Figure 6:
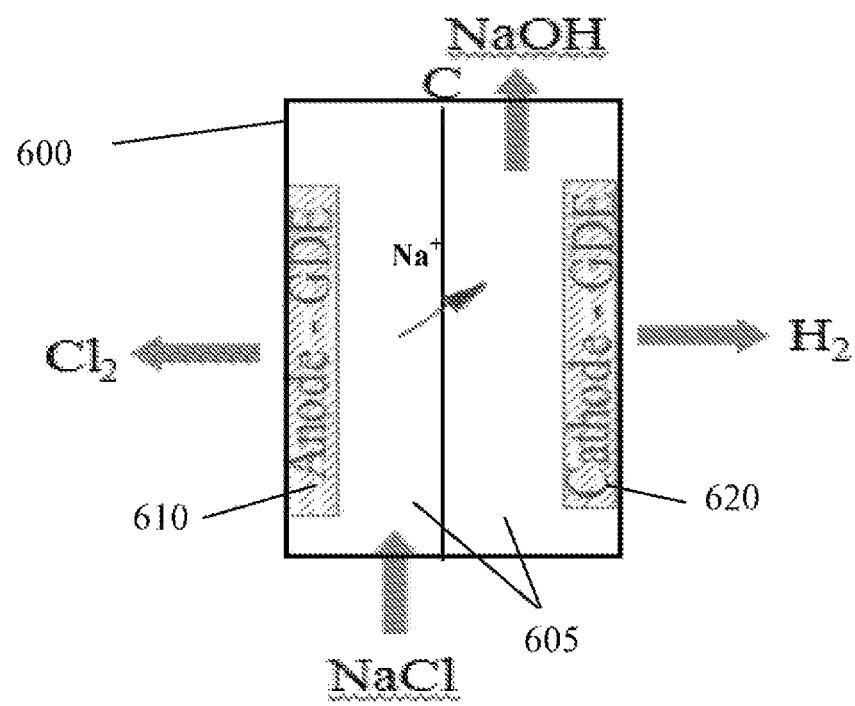
FIG. 6 depicts a schematic illustration of the chlor-alkali process adapted to use GDEs at each electrode in an electro-synthetic (i.e. electrochemical) cell.

The efficiency of the chlor-alkali process can be improved when both electrodes are replaced by GDEs according to one or more of the example embodiments described herein. This case is schematically depicted in FIG. 6. The half-reaction at each electrode remains the same as those above.

A key change in the cell in FIG. 6 relative to FIG. 5, is that bubbles of gas are no longer produced, or at least not substantially produced, at either the anode or the cathode. Instead, the chlorine and hydrogen gases pass through their respective GDEs without bubble formation. The absence of bubbles significantly reduces the solution resistance in the cell and also eliminates the phenomenon of "masking" on the electrode surfaces where bubbles adhere to the electrode surfaces. As such, the use of such GDEs may substantially enhance the electrical efficiency of the overall process, meaning that a lower driving voltage may be applied for the same rate of generation of chlorine gas and/or caustic.

Thus, there is provided an electro-synthetic or electro-energy cell 600 comprising a liquid electrolyte 605 and a gas diffusion electrode (the anode 610 or the cathode 620). The gas diffusion electrode includes a gas permeable material that is substantially impermeable to the liquid electrolyte; and a porous conductive material provided on a liquid electrolyte side of the gas diffusion electrode, that is adjacent the NaCl or NaOH solutions.

Furthermore, as shown in FIG. 6, the cell 600 includes a second gas diffusion electrode. In this example, the first gas diffusion electrode is the cathode 620 and the second gas diffusion electrode is the anode 610. The second gas diffusion electrode includes a second gas permeable material that is substantially impermeable to the liquid electrolyte, and a second porous conductive material provided on a liquid electrolyte side of the second gas diffusion electrode.

The second gas permeable material can be the same as the first gas permeable material. Alternatively, the second gas permeable material can be different to the first gas permeable material. The second porous conductive material can be the same as the first porous conductive material. Alternatively, the second porous conductive material can be different to the first porous conductive material.

The inventors have examined a chlor-alkali cell comprising two example embodiment GDEs. The GDEs were based on an expanded PTFE (ePTFE) membrane. It should be noted that the specific GDEs used in the following example are by way of illustration only, other types of example GDE as described herein could be used.

The cathode and anode GDEs were fabricated as follows: an expanded PTFE (ePTFE) membrane (manufactured by General Electric Company; pore size 0.2 micron) was vacuum- (sputter-) deposited with a thin layer of platinum (Pt) using the vacuum-/sputter-coating techniques described in Applicant's concurrently filed PCT patent application "Composite Three-Dimensional Electrodes and Methods of Fabrication" filed on 30 Jul. 2014, which is incorporated herein by reference. The Pt coating layer thickness on each electrode was optimally found to be about 100 nm. While platinum does react with chlorine, this generally only occurs at a notable rate above 100° C., with little reaction occurring at room temperature. The resulting GDEs were combined as anode and cathode in an electrochemical cell, which was charged with a 20% NaCl solution (pH 2-4) in the anolyte chamber and a 20% NaOH solution in the catholyte chamber. A cation exchange membrane (CMI7000 supplied by Membranes International Inc) was placed between the electrodes, equidistant to each of the electrodes. The cell was operated at room temperature. While the CMI7000 membrane does not prevent back-migration of hydroxide into the anolyte chamber as can be achieved using Nafion 324 or a Nafion 900 series membrane, it was convenient to use it in this example because the cell was operated for only a relatively short period during which minimal hydroxide cross-over would have occurred.

In order to be practically useful in small-scale, "on-site" modular cells, the abovementioned Pt-coated ePTFE anode and cathode combination needed to achieve a current density of about 10 mA/cm$^2$. Experiments showed that, with a 1 cm gap between them, the Pt-coated ePTFE electrodes achieved a steady current of 9-10 mA/cm$^2$ at an applied voltage of 2.4 V at 25° C. During operation at 2.4 V, chlorine gas was generated at the anode and hydrogen gas at the cathode without noticeable bubble formation of either gas in the NaCl electrolyte. The chlorine gas was characterised by its pale green-yellow colour and the fact that, when bubbled through water, it turned the water strongly acidic. The hydrogen gas was colourless and did not affect the pH of water through which it was bubbled. The relative volumes of the gases matched their expected stoichiometry.

Significantly, the low cost of the ePTFE membranes meant that the cell could operate in a practically and economically useful manner at only 2.4 V with a current density of 10 mA/cm$^2$. This corresponds to an energy requirement for the manufacture of 1 kg of chlorine and an equivalent amount of caustic of: 1.81 kWh/kg Cl$_2$. The overall energy efficiency of the electrochemical process is then: (1.65/1.81)×100=91%.

Thus, while a standard industrial chlor-alkali cell, operating at 3.0-3.6 V, achieves only 66% electrical energy efficiency, a comparable cell using GDEs of the abovementioned type operating at 2.4 V, may achieve 91% energy efficiency.

The cost of electrical energy comprises, on average 50% of the total cash production costs and taxes in an industrial chlor-alkali plant. Diminishing the energy requirement per kilogram of chlorine and an equivalent amount of caustic from 2.49 kWh to 1.81 kWh, therefore creates a reduction in overall costs in the order of: [(((2.49−1.81)/2.49)×100)×0.5] =13.7%.

Because of the absence of bubbles in the electrolyte during operation, there was, in fact, no need for the sodium ion exchange membrane to keep the hydrogen and chlorine bubbles separate, as is required in a conventional chlor-alkali cell. Moreover, the Pt electrodes are highly resistant to reaction with Cl$_2$ at room temperature. Thus, it was possible to remove the cation exchange membrane and operate the cell as a "flow-through" cell, in which the NaCl electrolyte was slowly and constantly pumped through the cell. The sodium hydroxide formed at the cathode, was then swept away to waste, and not concentrated or collected.

In such a cell, using the above Pt-coated ePTFE membrane electrodes, chlorine gas and hydrogen gas could also be produced at about 9-10 mA/cm$^2$ at 2.4 V. This indicated that Na$^+$ transport across the cation exchange membrane did not comprise the slowest, rate-determining step in the previously described cell. Moreover, the cell was now filled with 20%/NaCl solution (pH 2-4) with no separation into cathode and anode electrolyte chambers. The half reaction at the cathode therefore changed to the acid version of the hydrogen generation reaction, namely:

| At the Anode: | $2Cl^- \rightarrow Cl_2 + 2e^-$ | $E^0_{ox} = -1.36$ V |
|---|---|---|
| At the Cathode: | $2H^+ + 2e^- \rightarrow H_2$ | $E^0_{red} = 0$ V |
| | | $E^0_{cell} = -1.36$ V |

Note that the $E_{cell}$ thereby changes from 2.19 V to 1.36 V, indicating a lower theoretical energy requirement of only 1.03 kWh/kg of chlorine. This means that, with careful and calibrated application of the platinum catalysts, it is possible to reduce the electrical energy required in practical terms to still lower quantities.

It should be noted that there are some disadvantages to a flow-through cell of this type. These include: (1) catalysts that are sensitive to chlorine gas cannot be used at the cathode (for example, nickel used as the cathode turns green due to attack by chlorine), and (2) some of the chlorine gas formed at the anode will dissolve and react with the NaOH formed to produce sodium hypochlorite dissolved in the electrolyte. The sodium hypochlorite is, effectively, chlorine in solution, so that the equivalent amount of chlorine will not be recovered as a gaseous product; that is, the yield of gaseous chlorine cannot be 100%.

On the positive side, the electrolyte that is passed through the cell may be suitable for use in other applications, such as water treatment applications, where anti-microbial or anti-fungal properties are required, or for the neutralisation of acid streams that may be produced elsewhere by the user.

The above examples do not take account of further significant sources of savings that may be achieved in respect of chlorine manufacture. These include the fact that, using such ePTFE GDEs:

(1) The chlorine gas may readily be produced at pressure because the GDEs do not flood or leak electrolyte until the application of more than 3.4 bar of differential pressure (of the liquid side over the gas side), and
(2) The waste heat generated may be more effectively harnessed, to thereby improve the overall energy efficiency still further.

In respect of (1) above. A major disadvantage of using gas diffusion electrodes of the conventional type in chloro-alkali processes to-date, has been the inability to readily produce chlorine gas at pressure. As noted in the background section of this specification, this was because conventional gas diffusion electrodes become flooded and leak at electrolyte pressures greater than 0.1-0.2 bar above the pressure on the gas side of the GDE. With so slim an allowable differential pressure across the GDEs, it becomes difficult and risky to pressurise the electrolyte such that its pressure always remains less than 0.1-0.2 bar greater than the pressure on the gas side of the GDEs. In other words, it becomes problematic to pressurise the system to thereby generate product chlorine gas at pressure. Current industrial chlor-alkali cells using conventional GDEs cannot be pressurised, on their liquid electrolyte side, to more than 0.2 bar above their gas side, before the GDEs flood, causing the electrolyte to leak. The chlorine produced in such a cell may instead have to be pressurised using a separate compressor.

By contrast, the above ePTFE electrodes have a wetting pressure of 3.4 bar, meaning that the liquid electrolyte can be pressurised to up to 3.3 bar more than the gas side without the GDEs flooding and leaking. With so large a differential pressure available over the GDEs, it is practically much easier and safer to pressurise the liquid electrolyte, whilst still maintaining the product gases at a pressure within 3.4 bar of the pressure applied to the liquid side. That is, it is practically possible to generate product chlorine gas at pressure, whereas that is less practicable when using conventional GDEs.

Thus, a further way in which the efficiency of the chlor-alkai process can be improved is by allowing for the application of a higher pressure to the liquid electrolyte than exists on the gas in the GDE. High liquid pressures (relative to the corresponding pressure of the gas on the gas-facing side of the GDE) often have the effect of improving the energy efficiency of the electrode reaction. That is also true in the case of the chlor-alkali process, where the productivity of the anode and the cathode at fixed cell voltages below 3 V, increase (either linearly or non-linearly, depending on the catalysts used) with increasing pressure.

A chlor-alkai cell employing such GDEs may therefore have its liquid electrolyte pressurised up to 3.4 bar higher than the pressure of the gases on the gas-facing sides of the GDEs. Such a large pressure differential may increase the energy efficiency of the process and the cell. That is, for a particular, constant rate of production of chlorine and caustic, a lower applied cell voltage may be required. Moreover, the chlorine is then produced at pressure, without the need for a compressor.

Indeed, it is possible to produce chlorine at essentially any pressure, provided only that the pressure exerted on the liquid electrolyte is not more than 3.4 bar higher than the pressure of the product gas streams.

Referring to (2) above: another way in which the efficiency of the chlor-alkai process can be improved is by the application of higher temperatures in the cell. One effect of higher temperatures is to increase the amount of water vapour within a GDE and therefore also to increase the potential for condensation of that water vapour (flooding) within the GDE. A GDE with a high wetting pressure of, for example, 3.4 bar, is effectively un-wettable compared to a conventional GDE with a wetting pressure of 0.1 bar. For this reason, the conventional GDE will be at greater risk of flooding with increasing temperature than a GDE according to an example embodiment with a higher wetting pressure (e.g. 3.4 bar).

Thus, a chlor-alkai cell employing GDEs according to example embodiments may have its liquid electrolyte heated to higher temperatures without risk of flooding the GDE, than is the case if conventional GDEs were used. For many electrochemical processes, higher temperatures have the effect of intrinsically improving the energy efficiency of the half-reaction at the electrode and thereby increasing the energy efficiency of the overall process.

Moreover, most chlor-alkali cells are "self-heating" in that the excess energy which must be applied to drive the reaction is released as heat. The excess heat must be managed to prevent over-heating. In a cell that operates at 91% energy efficiency, the excess heat is smaller and more easily managed than in a cell which operates only at 66% energy efficiency. This factor also provides a significant potential cost saving.

A small-scale reactor for manufacturing chlorine by one of the above processes may, additionally, take the form of a flexible, spiral-wound module of the type described in the Applicant's concurrently filed PCT patent application "Modular Electrochemical Cells" filed on 30 Jul. 2014 that is incorporated herein by reference. Such spiral-wound reactors have been found to be exceedingly energy efficient and cost-effective. As such, they may dramatically improve the practicality and desirability of on-site production.

Example 3

Figure 7:
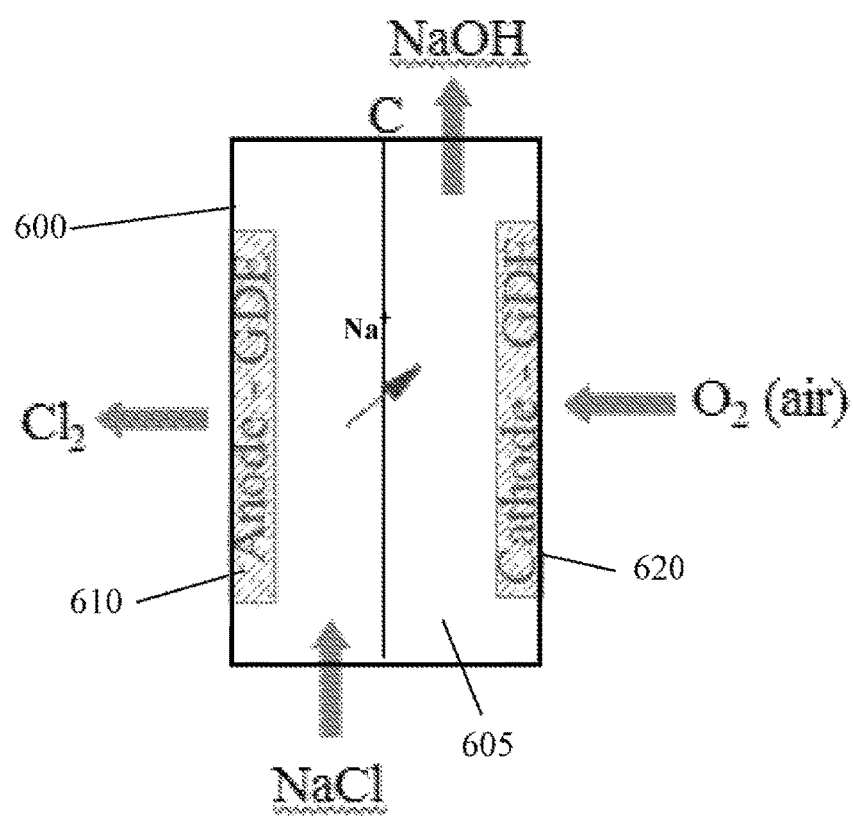
FIG. 7 depicts a schematic illustration of the chlor-alkali process adapted to use GDEs at each electrode, with depolarizing oxygen introduced at the cathode, in an electro-synthetic (i.e. electrochemical) cell.

Improving the Energy Consumption of the Chlor-Alkali Process by Using Gas Diffusion Electrodes in which the Cathode is Oxygen-depolarized A further way in which the efficiency of the chlor-alkai process may be improved is schematically depicted in the cell 600 shown in FIG. 7. In this case, both the anode 610 and cathode 620 have been replaced with GDEs (as in FIG. 6) and in use, no or substantially no bubbles of gas form at either the anode or the cathode. However the cathode is now supplied with oxygen, as a depolarizing gas, through the gas-facing side of the cathode. In this example a depolarizing gas is not supplied to or through the anode (i.e. the second gas diffusion electrode). The reactions occurring in the cell 600 are thereby changed to

| At the Anode: | $2\ Cl^- \rightarrow Cl_2 + 2e-$ | $E^0_{ox} = -1.36\ V$ |
| At the Cathode: | $O_2 + 2\ H_2O + 4e- \rightarrow 4OH^-$ | $E^0_{red} = 0.40\ V$ |
| | | $E^0_{cell} = -0.96\ V$ |

As can be seen, the theoretical cell voltage declines by more than half from 2.19 V to 0.96 V. This decreases the theoretical minimum electrical energy required to produce 1 kg of chlorine from 1.65 kWh/kg $Cl_2$ to 0.73 kWh/kg $Cl_2$. By this means, a very substantial cost and energy saving may potentially be realised. However, that saving will be offset by the added cost of the GDE relative to a conventional electrode, and the need to supply oxygen as a feedstock in the reaction.

The company DuPont developed a chlor-alkali cell utilizing an oxygen depolarized cathode in the 1990's. The cell used a conventional GDE on the cathode side only, with chlorine being produced in the form of bubbles at the anode. The half reactions that occurred in the Du Point cell were those shown above.

The inventors have carried out these reactions using GDEs of an example embodiment at both the anode and the cathode. The GDEs were based on an expanded PTFE (ePTFE) membrane. It should be noted that the specific GDEs used in the following example are by way of illustration only, other types of example GDE as described herein could be used.

The cathode and anode GDEs were fabricated as follows: an expanded PTFE (ePTFE) membrane (manufactured by General Electric Company; pore size 0.2 micron) was vacuum- (sputter-) deposited with a thin layer of platinum (Pt) using a vacuum-/sputter-coating technique. The Pt coating layer thickness on each electrode was found to optimally be about 100 nm. The resulting GDEs were combined as anode and cathode in an electrochemical cell, which was charged with a 20% NaCl solution (pH 2-4). The NaCl electrolyte was slowly pumped through the cell; there was no sodium ion exchange membrane between the cathode and anode in the cell. The gas chamber at the cathode was left open to the air, meaning that it was supplied with air oxygen. It was not supplied with pure oxygen from a cylinder. (It should be noted that air oxygen would not normally be used in a "Du-Pont"-type oxygen-depolarised chlor-alkali cell since the air contains $CO_2$, which would typically dissolve in the caustic catholyte solution, causing precipitation of carbonates, which would block the pores in the GDE. In a cell without a Na-exchange membrane, it is possible to use air oxygen, because the $CO_2$ will not form carbonate precipitates in the acidified NaCl electrolyte solution. As oxygen comprises only 20% of air, one would, nevertheless, expect a cell employing air oxygen to exhibit lower activity than one fed with pure oxygen)

In such a flow-through cell, the cathode half-reaction occurs under acid conditions, so that half-reactions are:

| | | |
|---|---|---|
| At the Anode: | $2 Cl^- \rightarrow Cl_2 + 2e-$ | $E^0_{ox} = -1.36$ V |
| At the Cathode: | $O_2 + 4H^+ + 4e^- \rightarrow H_2O$ | $E^0_{red} = 1.23$ V |
| | | $E^0_{cell} = -0.13$ V |

Note that the $E_{cell}$ is 0.13 V, which is one sixteenth that of a conventional chloro-alkali cell, giving it a minimum theoretical energy consumption of 0.098 kWh per kg of chlorine produced. This means that, with careful choice of catalysts, it will be possible to reduce the electrical energy required in practical terms to still lower quantities.

In order to be practically useful in small-scale, "on-site" modular cells the abovementioned Pt-coated ePTFE anode and cathode combination needed to achieve a current density of about 10 mA/cm². Experiments showed that, with a 1 cm gap between them and the cathode GDE left open to the air, the Pt-coated ePTFE electrodes achieved a steady current of 7 mA/cm² at an applied voltage of 0.96 V at 25° C. During operation at 0.96 V, chlorine gas was generated at the anode without noticeable bubble formation in the NaCl electrolyte. The chlorine gas was characterised by its pale green-yellow colour and the fact that, when bubbled through water, it turned the water strongly acidic.

Because of the absence of bubbles in the electrolyte during operation, there was no need for any sort of diaphragm (e.g. a sodium ion exchange membrane) to collect and keep the chlorine bubbles separate, as is required in a conventional chlor-alkali cell. Moreover, the movement of the NaCl electrolyte also contributed to eliminating the need for a sodium ion exchange membrane in the cell. The sodium hydroxide formed, was swept away to waste, and not concentrated or collected.

Significantly, the low cost of the ePTFE membranes meant that the cell could operate in a close-to-practically useful manner at only 0.96 V with a current density of about 7 mA/cm². This corresponds to an energy requirement for the manufacture of 1 kg of chlorine of: 0.73 kWh/kg $Cl_2$, which is the same as the theoretical minimum energy requirement of the DuPont cell. This lower energy requirement is, at least partly, due to the fact that caustic is not manufactured per se, but rather formed in dilution as an unwanted by-product.

Moreover, a standard industrial chlor-alkali "membrane cell" requires 2.49 kWh to manufacture 1 kg of chlorine (and an equivalent amount of caustic). By contrast, the above cell with an oxygen-depolarized cathode, requires only 0.73 kWh to manufacture 1 kg of chlorine. This amounts to a saving in electrical energy of: ((2.49−0.73)/2.49)× 100=70.7% (neglecting the value of the caustic that would also have been manufactured).

As noted earlier, the cost of electrical energy comprises, on average 50% of the total cash production costs and taxes in an industrial chlor-alkali plant. Diminishing the energy requirement per kilogram of chlorine from 2.49 kWh to 0.74 kWh, therefore creates a reduction in overall costs in the order of: 70 3×0.5=35.2% (neglecting the value of the caustic that would also have been manufactured).

A notable feature of this cell is that there were few, if any, increases in input costs. Thus, for example, the cell operated effectively using air oxygen, meaning that there was no need to supply pure oxygen as a feedstock. As far as the inventors are aware, no oxygen depolarized chlor-alkali cell has been reported that successfully uses air oxygen at the cathode because of the problem that air $CO_2$ dissolves and forms precipitates in the catholyte. Moreover, the GDEs used are inexpensive, being routinely manufactured as a commodity item by the water treatment industry. Furthermore, as noted previously, the use of ePTFE electrodes means that the cell could be more readily pressurised, generating pressurised chlorine, without leaking of the electrolyte. The stream of air oxygen into the cathode and the liquid electrolyte would, in that case, also have to be pressurised.

Because of the energy efficiency of the cell, management of waste heat is also a substantially less significant problem than in conventional chlor-alkali cells.

As noted above, there are some disadvantages to a flow-through cell of this type. These include: (1) catalysts that are sensitive to chlorine gas cannot be used at the cathode; for example, nickel used at the cathode turns green due to attack by chlorine in such a flow-through cell, and (2) some of the chlorine gas formed at the anode will dissolve to form sodium hypochlorite in the electrolyte. This, chlorine in solution, will not be recovered as a gaseous product, so that the yield of gaseous chlorine cannot be 100%.

On the positive side, the electrolyte that is passed through the cell will be suitable for use in other applications, such as water treatment applications, where anti-microbial or anti-fungal properties are required.

A small-scale reactor for manufacturing chlorine by the above processes may, additionally, take the form of a flexible, spiral-wound module. Such spiral-wound reactors have been found to be exceedingly energy efficient and cost-effective.

Example 4

Using Gas Diffusion Electrodes to Improve the Energy Consumption of Hydrochloric Acid Recycling to Generate Chlorine without Caustic Another alternative in respect of generating chlorine, is to generate it from waste hydrochloric acid. Hydrochloric acid is often a waste product in chlorination reactions, so that means of regenerating chlorine gas from hydrochloric acid may be commercially valuable.

The joint venture company of Uhde and De Nora (known as UhdeNora) have developed an electrochemical technique for recycling hydrochloric acid. Their cell comprises a gas diffusion cathode combined with a standard chlorine-generating anode. According to reports, the UhdeNora cells routinely operate at 1.4 V and 500 mA/cm$^2$, giving them an energy requirement of 1.06 kWh per kg of chlorine produced.

Figure 8:
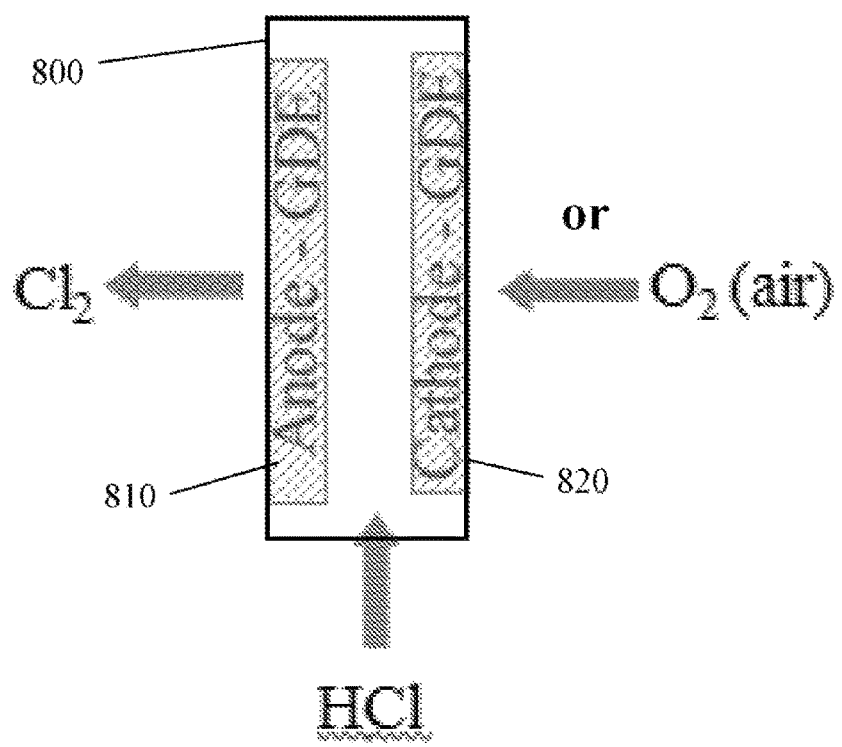
FIG. 8 depicts a schematic illustration of the chlor-alkali process adapted to use GDEs at each electrode, with depolarizing oxygen introduced at the cathode, and hydrochloric acid as reagent, in an electro-synthetic (i.e. electrochemical) cell.

FIG. 8 schematically depicts how this process may be made more energy and cost efficient using example GDEs as described herein. The cell 800 illustrated in FIG. 8 adapts the cell design in FIG. 7 by changing the reactant to hydrochloric acid (HCl). The cell 800 includes a GDE as the anode 810 and a GDE as the cathode 820. This eliminates the need for two electrolyte chambers to keep the product gases separate (since the chlorine electrode, the anode GDE 810, does not generate bubbles of chlorine). The ion exchange membrane in this example, the sodium exchange membrane marked "C", between the electrodes in FIG. 7, may be completely eliminated in FIG. 8 if the cathode GDE 820 comprises entirely of materials that are impervious to reaction with chlorine.

There are two options to operate such a cell. In the first option, the cell is operated with hydrogen (H$_2$) generated, bubble-free, at the cathode. In the second option, the cathode GDE has O$_2$ introduced into it, causing it to act as an oxygen-depolarized cathode.

The half reactions in the former process are:

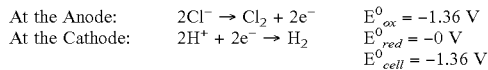

| At the Anode: | 2Cl$^-$ → Cl$_2$ + 2e$^-$ | $E^0_{ox}$ = −1.36 V |
| At the Cathode: | 2H$^+$ + 2e$^-$ → H$_2$ | $E^0_{red}$ = −0 V |
| | | $E^0_{cell}$ = −1.36 V |

The half-reactions in the latter process, involving an oxygen depolarized cathode, are as follows:

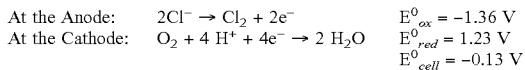

| At the Anode: | 2Cl$^-$ → Cl$_2$ + 2e$^-$ | $E^0_{ox}$ = −1.36 V |
| At the Cathode: | O$_2$ + 4 H$^+$ + 4e$^-$ → 2 H$_2$O | $E^0_{red}$ = 1.23 V |
| | | $E^0_{cell}$ = −0.13 V |

As can be seen, the cell voltage is 1.36 V in the former case and a mere 0.13 V in the latter case. In both of these cases, the cell voltage is substantially less than the conventional chlor-alkali process. In use, no or substantially no bubbles of gas form at either the anode or the cathode.

The theoretical minimum electrical energy needed to generate 1 kg of chlorine in the former cell is 1.03 kWh/kg Cl$_2$. In the latter cell, with an oxygen depolarized cathode, it is 0.098 kWh/kg Cl$_2$.

It should be noted that there is no caustic generated in either of these cases, chlorine is the only product. This is ideal and more practical than the conventional chlor-alkali process for users who want and need only chlorine and have no need for caustic. Additionally, the very low pH of the hydrochloric acid electrolyte suppresses chlorine dissolution in solution and avoids the formation of sodium hypochlorite in the electrolyte, since sodium hypochlorite reacts with acid to form gaseous chlorine.

Moreover, because of the simplicity of the cell 800 and the low energy consumption of the cell, it is possible to deploy this process in a small-scale, on-site process for industrial users who only need relatively small amounts of chlorine. Such users are today typically supplied with chlorine gas in cylinders, which has to be transported from centralised chlor-alkali facilities. By performing on-site production of chlorine, one eliminates the need to transport the highly toxic and dangerous chlorine gas. More correctly, one substitutes the transport of chlorine with the transport of hydrochloric acid, which is, relatively speaking, safer to transport. A safety improvement is thereby potentially realised.

There is also a possible recycling benefit to using the process described above. For example, many users of chlorine, Cl$_2$, end up incorporating only one of the two Cl atoms in Cl$_2$ into their product, with the other atom being converted into hydrochloric acid, or a chloride salt. For example, during the manufacture of PVC with Cl$_2$, only one of the two Cl atoms ends up in the PVC. The other goes into the waste stream, from where it must be recycled back into Cl$_2$. Thermochemical recycling is very energy intensive. A simple on-site method, such as the above, to convert hydrochloric acid into chlorine therefore offers an alternative that may be highly beneficial.

Not only would the transport of Cl$_2$ thereby be eliminated in such cases, but the need to transport its precursor, hydrochloric acid, would be half of that which would otherwise be required. These improvements offer potentially significant energy and cost savings. They may also dramatically improve the practicality of chlorine production, consumption, and recycling, for many industrial users.

A small-scale reactor for manufacturing or recycling chlorine by this process may, additionally, take the form of a flexible, spiral-wound module. Such spiral-wound reactors have been found to be exceedingly energy efficient and cost-effective. As such, they may dramatically improve the practicality and desirability of on-site production and recycling.

The inventors have tested the electrolysis of hydrochloric acid in the two versions described above where hydrogen is produced at the cathode, using a cell of the type shown in FIG. 8, employing GDEs of an example embodiment. The GDEs were based on an expanded PTFE (ePTFE) membrane. It should be noted that the specific GDEs used in the following example are by way of illustration only, other types of example GDE as described herein could be used.

The cathode and anode GDEs were fabricated as follows: For the hydrogen generating cell above, an expanded PTFE (ePTFE) membrane (manufactured by General Electric Company; pore size 0.2 micron) was vacuum- (sputter-) deposited with a thin layer of platinum (Pt) using a vacuum-/sputter-coating technique. The Pt coating layer thickness on each electrode was found to optimally be about 100 nm. For the oxygen-depolarised cell above, the ePTFE membranes were vacuum-coated with titanium (100 nm thick; for the anode) or nickel (100 nm thick; for the cathode). The resulting GDEs were combined as anode and cathode in an electrochemical cell, which was charged with a 36% HCl solution. The HCl electrolyte was slowly pumped through the cell; there was no ion exchange membrane between the cathode and anode in the cell.

In order to be practically useful in small-scale, "on-site" modular cells, the abovementioned ePTFE anode and cathode combination typically need to achieve a current density of about 10 mA/cm². Experiments showed that, with a 1 cm gap between them, the Pt-coated ePTFE electrodes of the above HCl cell achieved a steady current of 10 mA/cm² at an applied voltage of 1.4 V at 25° C. During operation, chlorine gas was generated at the anode and hydrogen gas was generated at the anode without noticeable bubble formation in the HCl electrolyte. The chlorine gas was characterised by its pale green-yellow colour and the fact that, when bubbled through water, it turned the water strongly acidic. The hydrogen was colourless and did not change the pH of water through which it was bubbled.

Because of the absence of bubbles in the electrolyte during operation, there was no need for any sort of diaphragm (e.g. a sodium ion exchange membrane) to collect and keep the chlorine and hydrogen bubbles separate, as is required in a conventional chlor-alkali cell. Moreover, because the materials in both GDEs were impervious to HCl and $Cl_2$, there was no need for an ion exchange membrane between the electrodes in the cell.

Significantly, the low cost of the ePTFE membranes meant that the cell could operate in a close to practically useful manner at only 1.4 V with a current density of 10 mA/cm². This corresponds to an energy requirement for the manufacture of 1 kg of chlorine of: 1.06 kWh/kg $Cl_2$. The overall energy efficiency is therefore: $(1.03/1.06) \times 100 = 97\%$.

Thus, the higher energy version of the cell in FIG. 8, where hydrogen is produced at the cathode ($E_{cell} = 1.36$ V) was able to produce chlorine with the same energy requirement as the equivalent oxygen depolarized cell developed by UhdeNora (1.06 kWh/kg $Cl_2$). In other words, even without the effect of a depolarized cathode, the same, low energy requirement was achieved.

Moreover, a standard industrial chlor-alkali "membrane cell" requires 2.49 kWh to manufacture 1 kg of chlorine and equivalent quantity of caustic. By contrast, the above cell, using HCl as electrolyte and operating without an oxygen-depolarized cathode, required only 1.06 kWh to manufacture 1 kg of chlorine. This amounts to a saving in electrical energy of: $((2.49-1.06)/2.49) \times 100 = 57\%$ (neglecting the cost of the HCl relative to NaCl, and the value of the caustic that would be produced in a conventional chlor-alkali process).

As noted earlier, the cost of electrical energy comprises, on average 50% of the total cash production costs and taxes in an industrial chlor-alkali plant. Diminishing the energy requirement per kilogram of chlorine from 2.49 kWh to 1.06 kWh, therefore creates a reduction in overall costs in the order of: $57 \times 0.5 = 29\%$ (neglecting the cost of the hydrochloric acid reactant relative to NaCl, and the value of the caustic that would be produced in a conventional chlor-alkali process).

Further experiments considered the lower energy of the above cells, namely the oxygen-depolarised HCl cell. With a 1 cm gap between them, the Ti-coated (anode) and Ni-coated (cathode) ePTFE electrodes of the above HCl cell, with the cathode open to air oxygen, achieved a steady current of 11 mA/cm² at an applied voltage of only 0.3 V at 25° C. During operation, chlorine gas was generated at the anode. The chlorine gas was characterised by its pale green-yellow colour and the fact that, when bubbled through water, it turned the water strongly acidic.

Thus, the lower energy version of the cell in FIG. 8, where the cathode is depolarised by oxygen ($E_{cell} = -0.13$ V), was able to produce chlorine with an energy requirement of only 0.227 kWh/kg $Cl_2$. This is well below any comparable process available at the present time. It should be noted however, that after some time of operation, the nickel on the cathode displayed a slight green tinge, suggesting that, while chlorine dissolution in the HCl electrolyte was suppressed, it was not completely eliminated. Nevertheless, it appears that the overwhelming majority of the measured current related to the cathodic reaction shown above ($O_2 + 4 H^+ + 4e^- \rightarrow 2 H_2O$) and not to the reaction of nickel and chlorine.

Moreover, a standard industrial chlor-alkali "membrane cell" requires 2.49 kWh to manufacture 1 kg of chlorine and equivalent quantity of caustic. By contrast, the above cell, using HCl as electrolyte and operating with an oxygen-depolarized cathode supplied with air oxygen, required only ca. 0.227 kWh to manufacture 1 kg of chlorine. This amounts to a saving in electrical energy of: $((2.49-0.227)/2.49) \times 100 = 90.9\%$ (neglecting the cost of the HCl relative to NaCl, and the value of the caustic that would be produced in a conventional chlor-alkali process). Given that the cost of electricity comprises 50% of the average cash costs of a typical chlor-alkali plant, such modifications may potentially yield a decrease in cash costs of 45.4% (neglecting the cost of the HCl relative to NaCl, and the value of the caustic that would be produced in a conventional chlor-alkali process).

A notable feature of both of the above cells is that there were few, if any, increases in input capital costs. Thus, for example, the GDEs used are inexpensive, being routinely manufactured as a commodity item by the water treatment industry. Furthermore, as noted previously, the use of ePTFE electrodes means that the cell could be readily pressurised, generating pressurised chlorine, without leaking of the electrolyte and without need for a downstream compressor. The liquid electrolyte would, in that case, have to be pressurised.

Because of the energy efficiency of the cell, management of waste heat is also a substantially less significant problem than in conventional chlor-alkali cells.

Example 5

Using Gas Diffusion Electrodes to Produce Caustic without Chlorine

Figure 9:
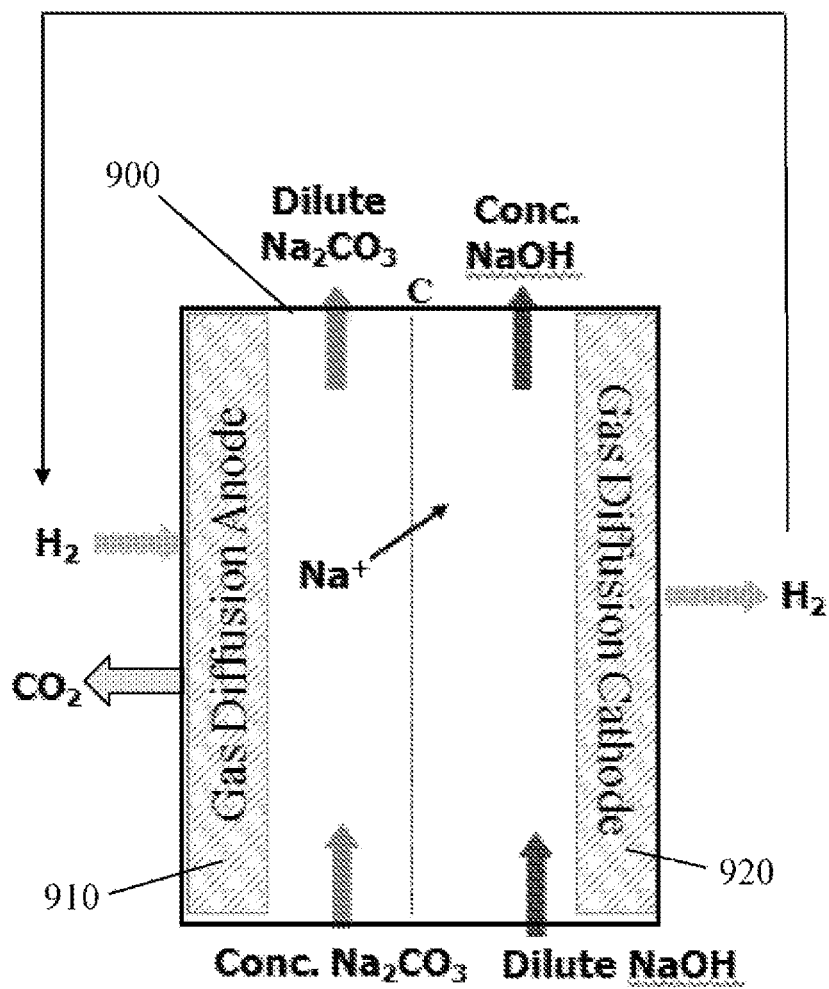
FIG. 9 depicts a schematic illustration of the chlor-alkali process adapted to make only caustic in an electro-synthetic (i.e. electrochemical) cell.

FIG. 9 schematically depicts another modification that can be applied to the chlor-alkali process. Some industrial users require only the caustic NaOH produced in the chlor-alkali process and not the chlorine at all. U.S. Pat. No. 5,246,551 describes a process and cell for making caustic without making chlorine. FIG. 9 schematically depicts a cell 900 configured to carry out this process, but equipped with GDEs according to example embodiments at the anode 910 and cathode 920.

The cell 900 must be fed with concentrated $Na_2CO_3$ and dilute NaOH. The dilute NaOH may be a recycled or it may be a waste product from the users own production facility. $Na_2CO$ is readily available and inexpensive. The cell generates concentrated NaOH, which is then used by the industrial user. It also generates dilute $Na_2CO_3$, which is non-toxic and non-hazardous, and therefore inexpensively disposed of. The only other product would be $CO_2$, coming off the anode 910. In use, no or substantially no bubbles of gas form at either the anode or the cathode.

The half reactions in this cell are:

At the Anode: $H_2 \rightarrow 2H^+ + 2e^-$      $E^0_{ox} = \sim 0.7$ V (@ pH 12)
$2H^+ + CO_3^{2-} \rightarrow CO_2 + H_2O$ -continued At the Cathode: $2H_2O + 2e- \rightarrow H_2 + 2OH$  $E^0_{red} = -0.83$ V
$E^0_{cell} = -0.13$ V As can be seen, there is a very low cell voltage, and therefore a low energy requirement in the form of electrical energy. The cathode 920 could be depolarized by oxygen to reduce the cell voltage still further, however the hydrogen needed to depolarize the anode 910 would then have to be supplied externally. Instead, it is more convenient to allow the cathode to generate hydrogen and then use this hydrogen to depolarize the anode.

Not only is the cell 900 and process well-tailored to the needs of industrial consumers who require only caustic—the process decouples caustic production from chlorine production—but other savings may also be realised. For example, since there is no chlorine production at the anode (that may be interfered with by caustic), the sodium exchange membrane, "C", in FIG. 9 need not be perfluorinated. This offers a potentially very significant saving in the cell construction and overcomes a key limitation and expense in the chlor-alkali process.

Example 6

Using Gas Diffusion Electrodes to Modify the Chlor-alkali Process in Order to Yield Significant Energy Savings Table I provides estimates of the power consumption for the different variants of the chlor-alkali process described above. As can be seen, there are significant potential energy savings achieved by making use of GDEs according to example embodiments and tailoring or modifying the original process to suit these GDEs.

TABLE I

| Technology | Power Consumption (kWh/kg $Cl_2$ or caustic) [theoretical minimum] |
|---|---|
| Current Chlor-alkali - Industry standard | 2.49 kWh/kg $Cl_2$ [1.65 kWh] |
| Chlor-alkali with $H_2$ - Example 2 | 1.81 kWh/kg $Cl_2$ [1.65 kWh] |
| Chlor-alkali with ODC - Example 3 | 0.73 kWh/kg $Cl_2$ [0.73 kWh] |
| Chlorine from HCl - Example 4 (with $H_2$) | 1.06 kWh*/kg $Cl_2$ [1.03 kWh] |
| Chlorine from HCl - Example 4 (with ODC) | 0.227 kWh*/kg $Cl_2$ [0.098 kWh] |
| Caustic without Chlorine | 1.2 kWh** |

Per kilogram of combined products (chlorine plus sodium hydroxide).
*only produces chlorine.
**estimate; only produces caustic.
ODC = Oxygen Depolarized Cathode.

Example 7

Using Gas Diffusion Electrodes to Improve the Electrocatalytic Synthesis of Peroxide by the Dow-Huron Process The Dow-Huron process was developed in the 1970-80's for the electrochemical manufacture of hydrogen peroxide in the basic solutions that are used by the pulp and paper industry. This industry is the biggest user of hydrogen peroxide (as a bleaching agent for the manufacture of white paper). The chemical half-reactions that occur in this process (in 1 M NaOH electrolyte) are:

Cathode: $2 O_2 + 2 H_2O + 4 e^- \rightarrow 2 HO_2^- + 2 OH^-$
Anode: $4 OH^- \rightarrow O_2 + 2 H_2O + 4 e^-$
OVERALL: $O_2 + 2 OH^- \rightarrow 2 HO_2^-$  $E^0_{cell} -0.476$ V As can be seen, the overall reaction consumes base, OH, and oxygen, $O_2$, to make the hydroperoxide ion, $HO_2^-$, which is the natural state of hydrogen peroxide under basic conditions. Catalysts capable of facilitating hydroperoxide formation are required.

Figure 10:
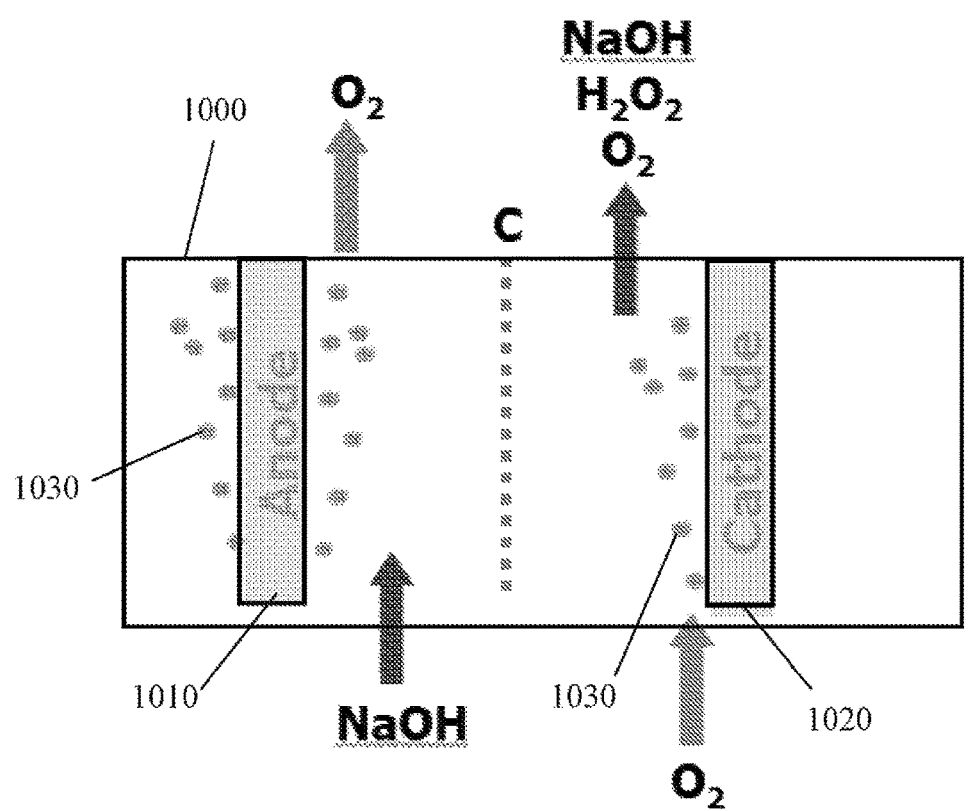
FIG. 10 (prior art) depicts a schematic illustration of the Dow-Huron process in a conventional electrochemical cell.

FIG. 10 schematically depicts a cell 1000 for carrying out the Dow-Huron process. In its original form, the process used a packed bed cathode, through which bubbles of oxygen gas were percolated, along with caustic solution. The reactor is described in U.S. Pat. No. 4,431,494. It involves a "trickle-bed" arrangement into which pure oxygen or an "oxygen-containing gas" (e.g. air) is pumped. Pure oxygen is generated at the anode 1010 and may be recycled back into the cathode 1020. Thus bubbles 1030 of $O_2$ gas are produced at the anode 1010 and the cathode 1030. The hydrogen peroxide that is produced, is used directly as it is produced, in a pulp and paper mill.

The Dow-Huron process has not been commercially successful, partly because of the inefficiency of the trickle-bed reactor used to introduce oxygen at the cathode. This inefficiency limits the process to low current densities.

Figure 11:
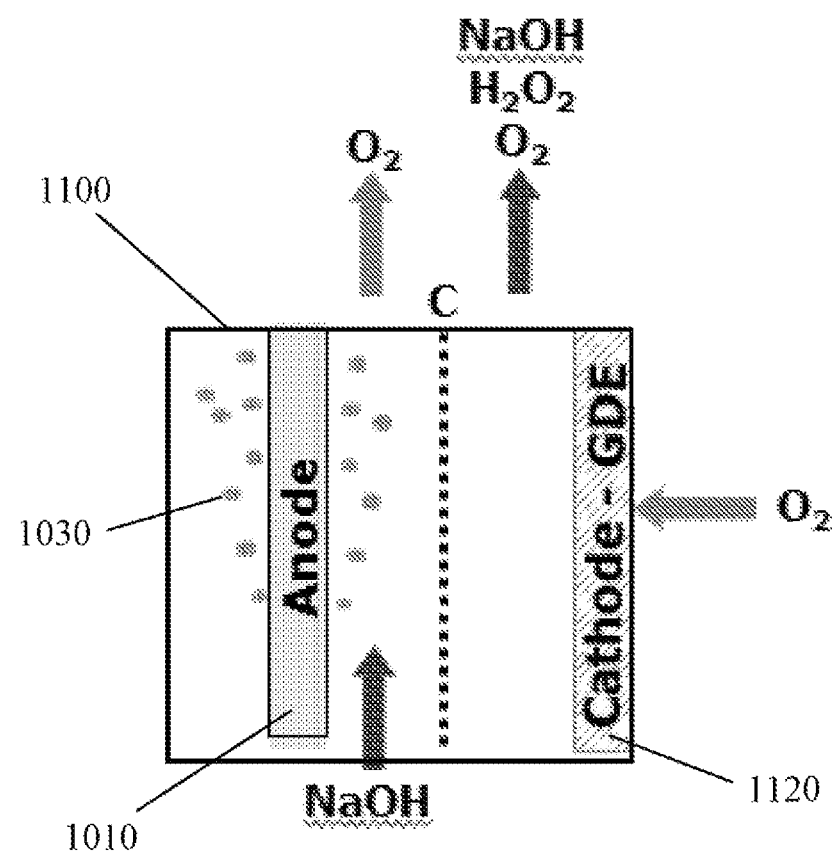
FIG. 11 depicts a schematic illustration of the Dow-Huron process, modified to use an example GDE in an electro-synthetic (i.e. electrochemical) cell.

FIG. 11 shows a variation of the Dow-Huron process in which the trickle-bed cathode 1020 has been replaced in a cell 1100 with a GDE cathode 1120 into which oxygen, or an oxygen-containing gas mixture is pumped. The efficiency of the depolarizing half-reaction at the anode 1010 is increased and current density may thereby be increased. In use, no or substantially no bubbles of $O_2$ gas form at the cathode (GDE) 1120.

Figure 12:
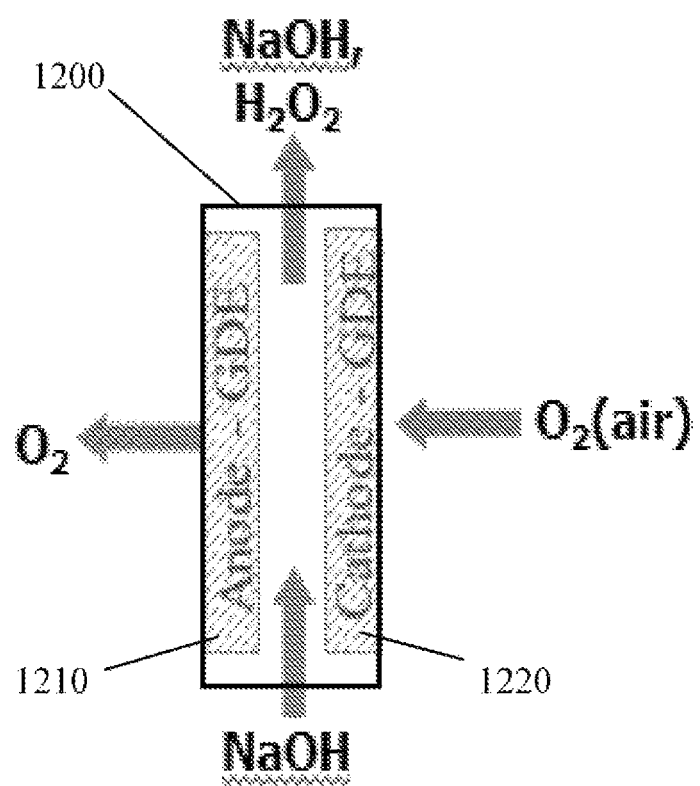
FIG. 12 depicts a schematic illustration of the Dow-Huron process, modified to use example GDEs in an electro-synthetic (i.e. electrochemical) cell.

FIG. 12 schematically depicts a cell 1200 for the Dow-Huron process using GDEs as both the anode 1210 and the cathode 1220. As can be seen, no bubbles are formed at either electrode 1210, 1220. There is therefore no need for the energy-sapping diaphragm or membrane "C" in FIG. 11, provided that the 1 M NaOH electrolyte is pumped sufficiently fast through the electrode gap that any hydroperoxy ion formed at the cathode is unable to reach the anode. Moreover, because of the low-cost of the GDEs it is possible to economically introduce them at both the anode and the cathode, thereby improving the efficiency at each electrode. Oxygen is produced at and extracted from the cell through the anode being a second gas diffusion electrode.

The inventors have constructed and tested such a cell 1200 using an example GDE. The GDE substrate was a PTFE membrane (0.2 micron pore size, from General Electric Company) of the type used for membrane based distillation in the water purification industry. For both of the anode 1210 and cathode 1220 GDEs, the membrane was either: (i) coated with a thin layer of nickel (by carefully calibrated vacuum deposition of nickel, to lay down 3.64 g of nickel per 1 square meter of geometric are), or (ii) a 200 LPI nickel mesh and a binder were laminated to the membrane.

Figure 13:
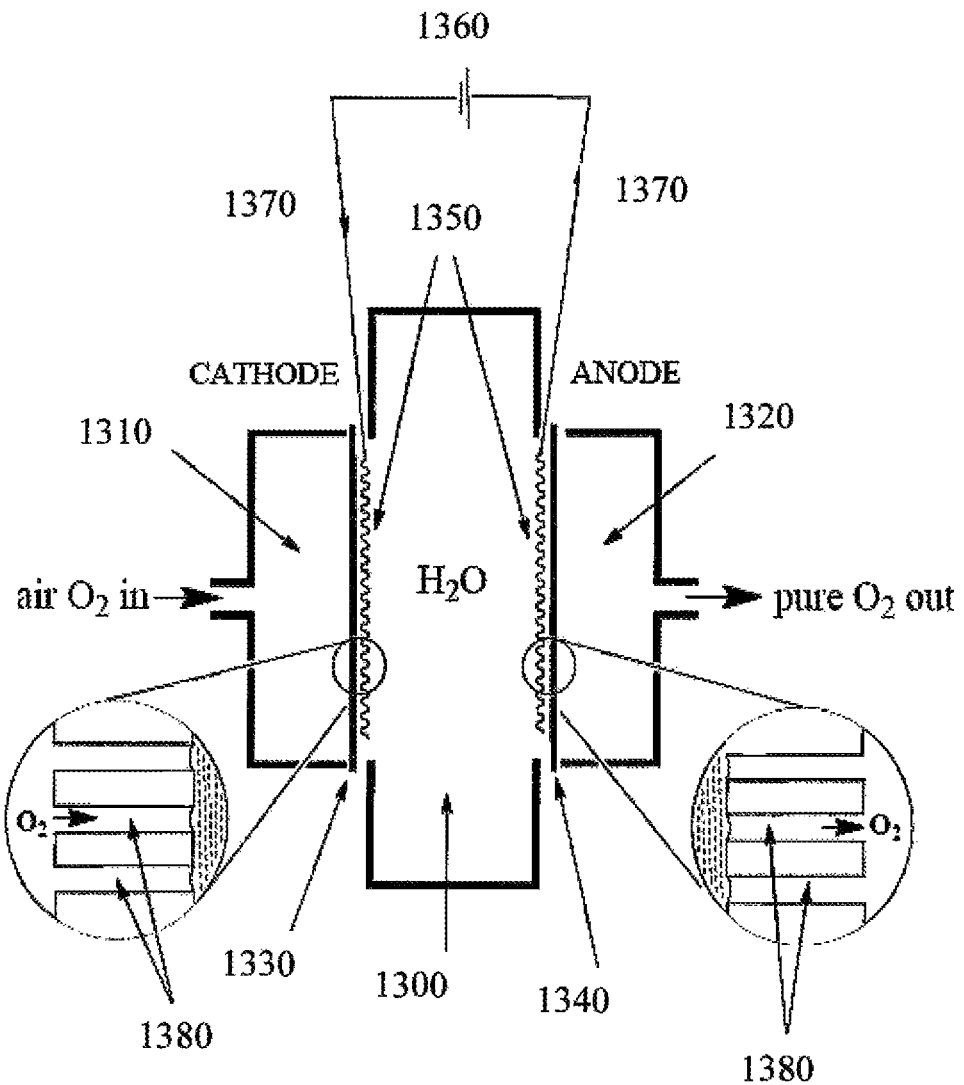
FIG. 13 illustrates a schematic of an example cell (not to scale).

The GDEs were placed in a cell shown schematically in FIG. 13. The cell in FIG. 13 includes the following parts: a central water reservoir 1300 (containing aq. 1 M KOH), which has a water-free oxygen entry chamber 1310 (i.e. gas region) on the left side and a water-free oxygen generation chamber 1320 (i.e. gas region) on the right side. Between the water reservoir 1300 and the oxygen entry chamber 1310 is the cathode GDE electrode 1330 (as described above).

Between the water reservoir 1300 and the oxygen generation chamber 1320 is the anode electrode 1340 (as described above). On or close to the surface of the breathable electrodes 1330 and 1340 is a conductive layer containing a suitable catalyst 1350.

When an electrical current is applied to the electrodes by the direct current power source 1360, then electrons flow along the outer circuit as shown in 1370. That current causes oxygen from the air to react on the surface of the cathode electrode 1330; pure oxygen is also generated on the surface of the anode electrode 1340. No bubbles are formed at either the anode or cathode surface, the oxygen passes through the hydrophobic pores 1380 of the GDE electrodes, as shown in the enlarged inset images for the scheme on the right of FIG. 13. Liquid water cannot pass through these pores 1380 since the hydrophobic surfaces of the pores 1380 repel the water. The surface tension of the water thereby prevents droplets of water from disengaging from the bulk of the water to pass through the pores. The membranes of electrodes 1330 and 1340 therefore act as a gas permeable, water-impermeable barrier. In this cell, air was used as the oxygen source for the cathode. Air would not normally be used in the Dow Huron process because the carbon dioxide in the air would dissolve in the electrolyte and form insoluble carbonates that would eventually block the pores of the GDE at the cathode. In this case however, the tests were run for a suitably short period that this would not block the reaction. Moreover, since air contains only 20% oxygen, it would provide more demanding conditions than would be the case if pure oxygen was used.

In this cell, peroxide is formed in the electrolyte, which may be pumped away from the electrodes using a small pump. The pumping is necessary to prevent the hydroperoxide ions that are formed at the cathode from reacting at the anode. This process and cell demonstrates that GDEs can be fabricated and used to carry out the Dow-Huron process for the electrochemical manufacture of hydrogen peroxide.

A feature of the process used is that the inventors surprisingly discovered that it was not necessary to pump air into the unsealed and open cathode oxygen entry chamber, as is the case for pure oxygen with the trickle-bed reactor that is conventionally used in the Dow-Huron process. Instead, the nickel-coated PTFE membrane electrode at the cathode aggressively extracted the oxygen from non-flowing ambient atmospheric air within the chamber. That is, the gas diffusion electrode extracts oxygen from ambient atmospheric air. This could be demonstrated by connecting a plastic tube to the chamber entrance, with its other end dipped into a reservoir of water. Under these circumstances, the cathode GDE was found to extract and consume oxygen from the air in the chamber, causing a column of water to be drawn up into the tube. If left indefinitely, the entire tube and eventually the entire cathode gas chamber filled up with water. The only explanation for this phenomenon was that oxygen in the chamber was spontaneously extracted from the atmospheric air, causing a low pressure (partial vacuum) to form in the attached tube. Even at the low partial pressures of oxygen that were thereby created, oxygen was still rapidly sequestered from the remaining air by the membrane electrode.

This activity of the cathode GDE to selectively pull oxygen out of the air is remarkable and significant; it stands in contrast to the relatively much lower activity of the trickle-bed reactor and to the very much lower activity of conventional GDEs. It demonstrates that GDEs according to example embodiments have an unusually high tendency to facilitate gas depolarization of electrodes, even where this gas is in a highly diluted and impure form (e.g. oxygen in air).

The cell and technology described above could potentially produce peroxide/hydroxide solutions for pulp and paper, estimated at 1 million tonne per year with substantially lower power consumption and lower cost than is currently possible.

Example 8

Using Gas Diffusion Electrodes to Electro-catalytically Convert Atmospheric Oxygen to Pure Oxygen An adaption of the Dow-Huron process has been described in the scientific literature. A paper published in the *Journal of Applied Electrochemistry* (1997) Vol. 27, Page 83, teaches that, if the electrolyte containing peroxide is not pumped away and the peroxide contacts the anode of that cell, the reaction at the anode changes to that given below:

| Cathode: | $O_2$ (air) + $H_2O$ + 2 e$^-$ → $HO_2^-$ + $OH^-$ |
| Anode: | $HO_2^-$ + $OH^-$ → $O_2$ (pure) + $H_2O$ + 2 e$^-$ |
| OVERALL: | $O_2$ (air) → $O_2$ (pure) |

That is, the excess hydroperoxide ion generated at the cathode may migrate to the anode, where it is preferentially oxidized. In such a situation, the cell effectively converts atmospheric oxygen (only 20% pure) at the cathode into pure oxygen (100% pure) at the anode. This is done electrochemically.

Currently, most pure oxygen is manufactured cryogenically, an expensive and large-scale process. The above electrochemical process may potentially be performed on a much smaller scale.

Moreover, in the publication above, a conventional GDE was used at the cathode, with the atmospheric air having to be pumped through the 15 mm diameter air cathode at a rate of 140 mL/min in order for the process to work. By contrast, when the same process was carried out using the apparatus shown in FIG. 13 using the GDEs described above, there was no need to pump air through the cathode at all. The cathode GDE extracted oxygen from the ambient air within the oxygen gas chamber without any need for an overpressure of atmospheric air. This, once again demonstrated how extraordinarily active example embodiment GDEs may be.

Figure 14:
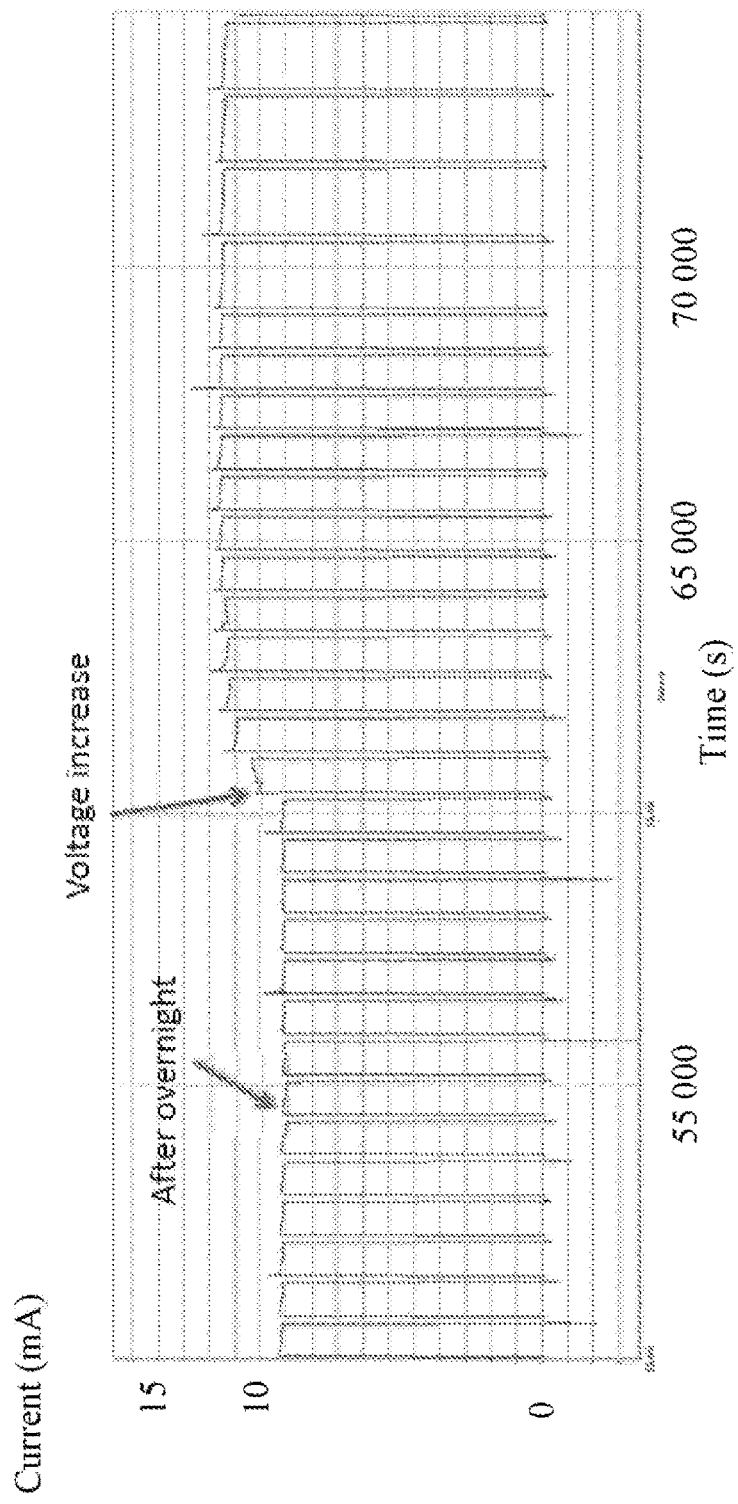
FIG. 14 depicts the current obtained in Example 8 versus time, with regular switching on and off of the voltage and an increase of the voltage as shown.

FIG. 14 shows a current plot of such an oxygen purification process over several days, with switching on and off of the applied voltage at regular intervals. The process made use only of the ambient air, with no air being pumped into the oxygen entry chamber. As can be seen, despite this the overall reaction was remarkably stable.

Example 9

Using Gas Diffusion Electrodes to Fabricate Efficient and Practical Fuel Cells—an Example Hydrogen-oxygen Fuel Cell The example cell in FIG. 13 may also be adapted to operate as a fuel cell, using GDEs according to example embodiments as electrodes, where oxygen gas is introduced through the gas diffusion electrode and hydrogen gas is introduced through a second gas diffusion electrode. In such an application it is not necessary to use pure oxygen or compressed air, as is normally the case. Instead, atmospheric oxygen at normal air pressure may be used in the oxygen gas chamber 1310 on the left side. Hydrogen must be simultaneously introduced into the gas chamber 1320 on the right side, with the result that an electrical current is generated, according to the half-reactions below:

With water-generating catalysts (basic conditions):

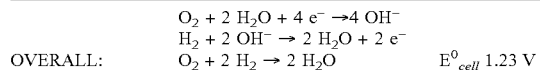

| | $O_2 + 2\,H_2O + 4\,e^- \rightarrow 4\,OH^-$ | |
|---|---|---|
| | $H_2 + 2\,OH^- \rightarrow 2\,H_2O + 2\,e^-$ | |
| OVERALL: | $O_2 + 2\,H_2 \rightarrow 2\,H_2O$ | $E^0_{cell}$ 1.23 V |

OR:
With water-generating catalysts (acidic conditions):

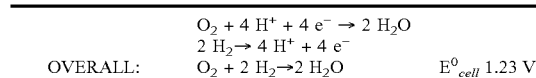

| | $O_2 + 4\,H^+ + 4\,e^- \rightarrow 2\,H_2O$ | |
|---|---|---|
| | $2\,H_2 \rightarrow 4\,H^+ + 4\,e^-$ | |
| OVERALL: | $O_2 + 2\,H_2 \rightarrow 2\,H_2O$ | $E^0_{cell}$ 1.23 V |

Note that such a fuel cell is, in effect, a "doubly gas depolarized" electrochemical cell. It is in principle, similar to a Proton-Exchange Membrane (PEM) fuel cell, except that the proton-exchange membrane, which is normally located between the electrodes, is replaced by a small water reservoir 1300. Water formed in the above reactions moves directly into the water reservoir 1300, thereby avoiding any possibility of flooding the gas diffusion layer and thereby maintaining a very clear and well-defined solid-liquid-gas boundary in the 3D electrodes. Protons are readily able to migrate between the electrodes through the water between the electrodes. This arrangement also eliminates the need to humidify the feed gases, which is a substantial extra cost in PEM fuel cells. Humidification of the feed gases is needed in PEM fuel cells in order to maintain the moisture content of the PEM, which ensures good proton conductivity between the electrodes. In a fuel cell using example embodiment GDEs there is no need for a proton exchange membrane, thereby entirely eliminating a highly expensive component.

The inventors have tested the fabrication of a fuel cell using GDEs of an example embodiment. The GDEs were based on an expanded PTFE (ePTFE) membrane. It should be noted that the specific GDEs used in the following example are by way of illustration only, other types of example GDE as described herein could be used.

The cathode and anode GDEs were fabricated as follows: An expanded PTFE (ePTFE) membrane (manufactured by General Electric Company; pore size 0.2 micron) was vacuum- (sputter-) deposited with a thin layer of platinum (Pt). The Pt coating layer thickness on each electrode was found to optimally be about 100 nm. The resulting GDEs were combined as anode and cathode in an electrochemical cell, which was charged with a 6 M KOH solution. Pure hydrogen gas was allowed to flow through the anode gas chamber and oxygen or air through the cathode gas chamber at 1 bar. There was no ion exchange membrane between the cathode and anode in the cell.

Figure 15:
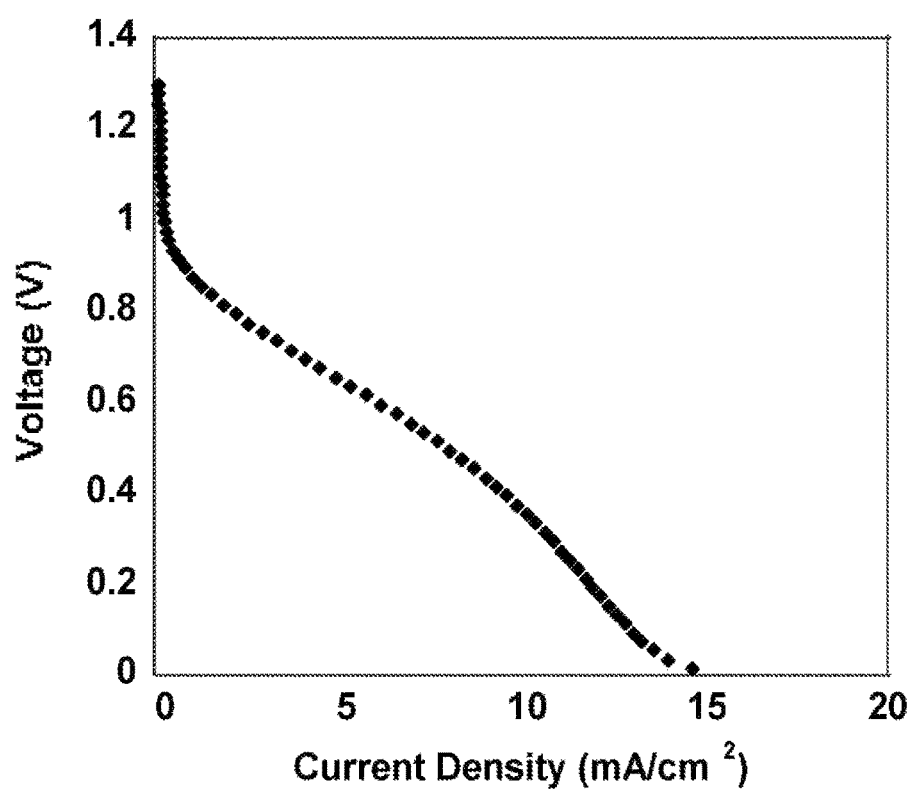
FIG. 15 depicts the polarisation curve generated by the hydrogen-oxygen fuel cell described in Example 9.

In order to be practically useful in small-scale, "on-site" modular cells, the abovementioned Pt-coated ePTFE anode and cathode combination needed to achieve a current density of about 10 mA/cm². Experiments showed that, with a 1 cm gap between them, the Pt-coated ePTFE electrodes achieved a steady current of 10 mA/cm² whilst a generating a voltage of 0.4 V at 25° C. FIG. 15 depicts the polarization curve obtained. As can be seen, it is characteristic of classical fuel cell behaviour.

Considering that current day commercial PEM fuel cells achieve about 0.5-0.6 V at 70-80° C. with about 6 bar pressure applied, the data in FIG. 15 at 25° C., is notable. Relatively speaking, it demonstrates high electrical efficiency at very low capital cost. Moreover, the fuel cell in FIG. 15 does not require humidified gases, nor an expensive PEM membrane, nor compression of the oxygen-containing gas, in order to operate. It is, furthermore, not prone to flooding and is manufactured from ePTFE membranes that are inexpensively available from the water treatment industry.

Example 10

Using Gas Diffusion Electrodes to Fabricate Electrochemical Cells that Facilitate a Direct Methane Fuel Cell that Operates at Room-temperature In a truly remarkable finding, the inventors have discovered that, when used as the anode and cathode in a cell, GDEs of the present embodiments can also provide a room temperature, direct methane fuel cell, where oxygen gas is introduced through the gas diffusion electrode and methane gas is introduced through a second gas diffusion electrode.

Figure 16:
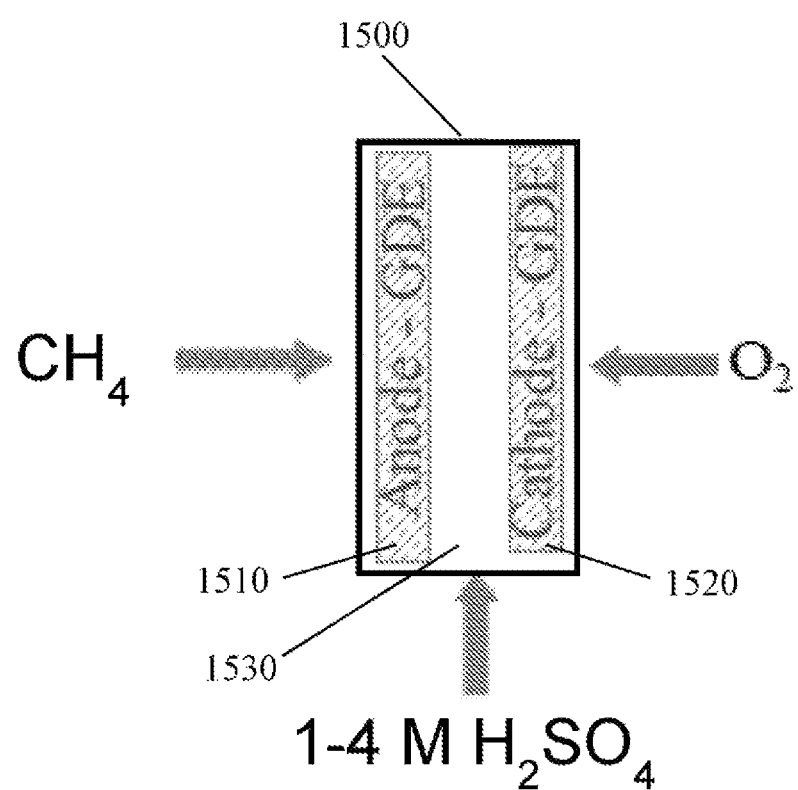
FIG. 16 depicts a schematic illustration of a direct methane fuel cell that operates at room-temperature.

FIG. 16 depicts a simple cell construction for such an embodiment. The cell in FIG. 16 includes the following parts: a central water reservoir 1530 (containing aq. 1-4 M $H_2SO_4$), which has a gas diffusion electrode (cathode) 1520 through which oxygen is introduced on the right-hand side and a gas diffusion electrode (anode) 1510 through which methane is introduced on the left-hand side.

In such an application an electrical current should be generated, according to the half-reactions below:

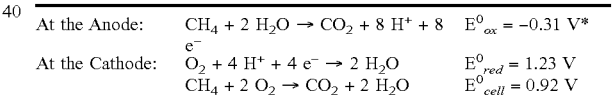

| At the Anode: | $CH_4 + 2\,H_2O \rightarrow CO_2 + 8\,H^+ + 8\,e^-$ | $E^0_{ox} = -0.31\,V^*$ |
|---|---|---|
| At the Cathode: | $O_2 + 4\,H^+ + 4\,e^- \rightarrow 2\,H_2O$ | $E^0_{red} = 1.23\,V$ |
| | $CH_4 + 2\,O_2 \rightarrow CO_2 + 2\,H_2O$ | $E^0_{cell} = 0.92\,V$ |

*unconfirmed, but $E^0_{red}$ is believed to be about −0.31V.

Note that the $E^0_{cell}$ is positive, meaning that the system should generate a voltage and a current. However, to date, no direct methane fuel cell has been demonstrated that operates at room temperature. This is because a suitable cell arrangement and catalyst for methane oxidation have not been identified. Note also that the above cell is, effectively, a methane oxidation cell in which the cathode has been depolarized by feeding in oxygen.

The inventors have found however that a direct methane fuel cell of this type, that operates at room temperature, can be fabricated using GDEs of an example embodiment. The GDEs were based on an expanded PTFE (ePTFE) membrane. It should be noted that the specific GDEs used in the following example are by way of illustration only, other types of example GDE as described herein could be used.

The cathode and anode GDEs were fabricated as follows: an expanded PTFE (ePTFE) membrane (manufactured by General Electric Company; pore size 0.2 micron) was vacuum- (sputter-) deposited with a thin layer of platinum (Pt). The Pt coating layer thickness on each electrode was found to optimally be about 100 nm. The resulting GDEs were combined as anode and cathode in an electrochemical cell of the type shown in FIG. 16, which was charged with a 1-4 M $H_2SO_4$ solution. Pure methane gas was allowed to flow through the anode GDE and oxygen or air through the cathode GDE at atmospheric pressure. There was no ion exchange membrane between the cathode and anode in the cell.

Figure 17:
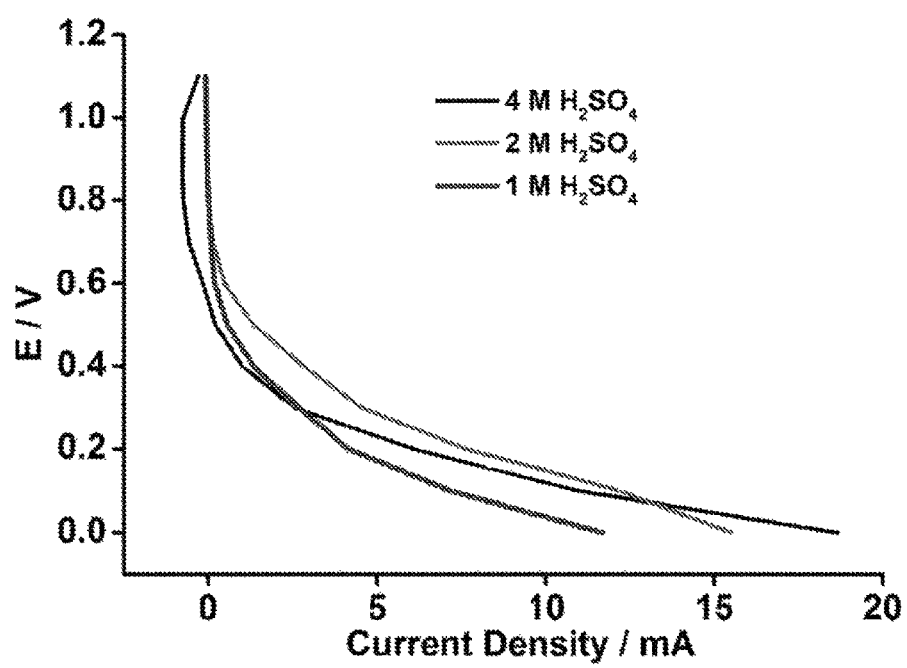
FIG. 17 depicts polarisation curves for a direct methane fuel cell, after flushing with methane and oxygen for 20 minutes.

FIG. 17 depicts the polarization curves obtained when a 1 cm gap was present between the Pt-coated ePTFE electrodes and the cell was allowed to stand for >20 min with the gases passing through their respective chambers, before the polarization curve was recorded. As can be seen, the data depicts classical fuel cell behaviour. As can also be seen, the cell achieved a potentially useful 10 mA/cm² at about 0.15 V when using 4 M $H_2SO_4$.

To the best of the inventor's knowledge, this is the first example of a direct methane fuel cell that operates with possibly useful currents at room temperature. The example embodiment GDEs clearly made this result possible.

It should be noted that the cell did display anomalous behaviour in that the currents below about 0.4 V were only obtained if the cell was allowed to stand for some time with the gases passing through their respective chambers, before the curve was recorded. A second scan immediately after a first scan, showed the same currents at voltages above 0.4 V, but smaller and not larger currents below 0.4 V.

To try to explain this behaviour, further studies were carried out on the cell. These suggested that at about 0.4 V, there may have been a change in the electrochemical behaviour of the cell. This may have been caused by: (1) the formation of a methanic polymer over the face of the methane electrode (in analogy with methanol fuel cells where a methanolic polymer is known to form over the face of the methanol electrode; this polymer must be periodically ejected by reverse biasing the cell), (2) a kinetic effect in which the methane displayed a low affinity for the platinum catalyst below 0.4V, so that once all of the Pt-bound methane was consumed, it took some time for more methane to bind and react on the platinum at voltages below 0.4 V; or, alternatively, (3) an additional reaction taking place intermittently below about 0.4 V.

Example 11

Using Gas Diffusion Electrodes in Cells for Manufacturing Fuels from Carbon Dioxide Current technologies for the manufacture of formate or other organics from $CO_2$, involve cells which bubble carbon dioxide in the cathode electrolyte solution, or use slightly alkaline solution to provide bicarbonate to the cathode. Gas diffusion electrodes according to example embodiments may be beneficially used to provide carbon dioxide directly to the cathode. For example, a GDE having lead as the metallic element is capable of producing formate in sodium sulfate pH2 solution at 1 kA/m² and 100% efficiency.

Example 12

Using Gas Diffusion Electrodes in Cells for Pollution Remediation by Removal of $SO_2$ and $NO_x$ In most coal-fired power stations, emitted gases are scrubbed and then oxidized either directly or indirectly, using silver, bromine, and the like. With the use of low-cost GDEs according to example embodiments, these pollutants can potentially be used to drive a fuel cell, thereby generating further electrical current whilst simultaneously remediating pollution.

Figure 18:
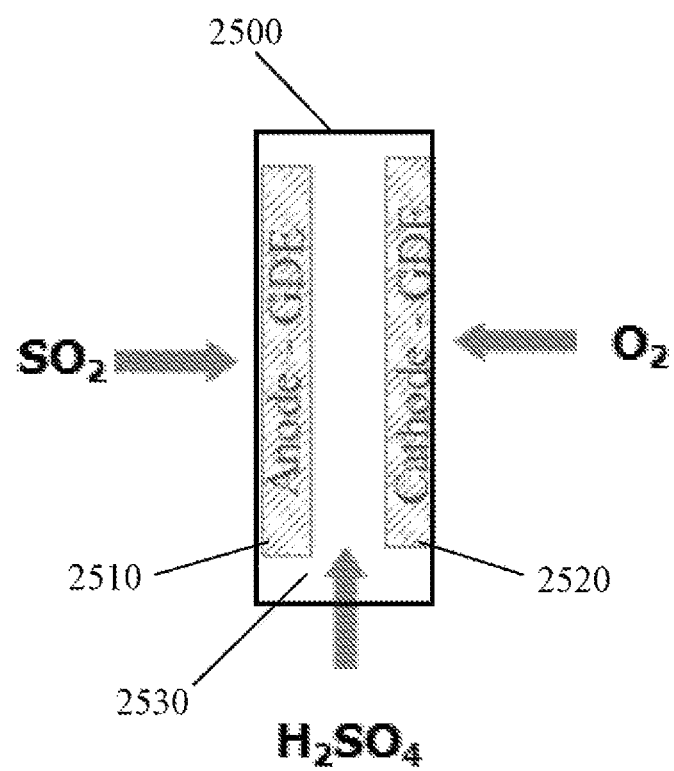
FIG. 18 depicts a schematic illustration of an example fuel cell that may be used for pollution remediation.

FIG. 18 schematically depicts the cell arrangement for such an example fuel cell 2500. As can be seen, both of the anode 2510 and the cathode 2520 are GDEs according to example embodiments. The liquid electrolyte 2530 is or includes sulfuric acid, $H_2SO_4$. A gas stream containing $SO_2$ or $NO_x$ is introduced into the anode, while oxygen (either pure or from the air) is introduced into the cathode. That is, the fuel cell 2500 has a liquid electrolyte that is or includes sulfuric acid, and oxygen is introduced through the gas diffusion electrode, acting as a cathode 2520, and $SO_2$ or $NO_x$ gas is introduced through a second gas diffusion electrode, acting as an anode 2510. The reactions are:

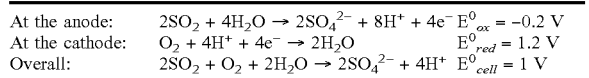

At the anode: $2SO_2 + 4H_2O \rightarrow 2SO_4^{2-} + 8H^+ + 4e^-$ $E^0_{ox} = -0.2$ V
At the cathode: $O_2 + 4H^+ + 4e^- \rightarrow 2H_2O$ $E^0_{red} = 1.2$ V
Overall: $2SO_2 + O_2 + 2H_2O \rightarrow 2SO_4^{2-} + 4H^+$ $E^0_{cell} = 1$ V As can be seen, the equilibrium cell voltage is positive, being 1 V. This means that the cell produces energy and can run as a fuel cell. While the kinetics of $SO_2$ electrooxidation are known to be slow, the low cost of the GDEs means that it is not uneconomical to operate a device with large surface area at low current density. Such spiral-wound reactors have been found to be exceedingly energy efficient and cost-effective, even when they are operated at current densities as low as 10 mA/cm². As such, they may dramatically improve the practicality and desirability of on-site production and recycling.

Example 13

Using Gas Diffusion Electrodes in Cells for Other Electrochemical Processes

Ozone Production: A high cell voltage is generally required to make ozone. The key reactant is oxygen, whose content when dissolved in solution is low, thereby limiting the efficiency of the process and requiring decomposition of the water electrolyte. Oxygen fed directly to an anode GDE according to example embodiments allows for higher current densities and electrical efficiencies than have been hitherto possible.

Sodium/Lithium Production. Sodium and lithium are produced from chloride melts. A GDE anode that efficiently removes chlorine gas produced at the anode may be beneficial in allowing for the cell gap to be decreased.

Pulp and Paper Industry: Black Liquor Electrolysis and Tall Oil Recovery. The pH of so-called "Black liquor" is decreased using a hydrogen depolarized anode while recovering caustic at the cathode. The hydrogen produced at the cathode is cycled to the anode. Currently organics foul the expensive DSA-$O_2$ anodes used (DSA=Dimensionally Stable Anodes). However, GDEs according to example embodiments may mitigate this problem. They are also substantially cheaper than the current DSA-$O_2$ anodes. Similar pH changes and fouling that occur in "Tall Oil recovery", may be mitigated by the use of GDEs according to example embodiments. "Chloride removal" may be carried out as described in the example above on chlorine electrolysis from hydrochloric acid.

Other industrial electrochemical processes which may benefit from use of the GDEs according to example embodiments include the production of (1) Potassium permanganate
(2) Chlorate
(3) Perchlorate
(4) Fluorate
(5) Manganese dioxide (hydrogen is produced at the cathode)

Example 14

Using Gas Diffusion Electrodes in Cells for Other Industrial Processes

In several other industrial processes, electrochemical reactors involving gas depolarized counter electrodes, may be beneficially used. This specification does not attempt to describe all possible electrochemical processes that may benefit from the use of example embodiment GDEs. It is to be understood that the approaches provided herein may be applicable to a wide variety of industrial electrochemical processes.

Example 15

Using Flexible 3D Electrodes to Form a Spiral-wound Cell or Device

As previously discussed, example 3D electrodes and GDEs can be flexible. The 3D electrodes or GDEs can be formed as anodes and cathodes for use in a variety of cells, devices or reactors. The 3D electrodes or GDEs can be stacked or layered, for example as alternating anodes/cathodes and with any required intervening spacer layers, insulating layers, gas channel layers, feed channels or the like. Selected edges of the 3D electrodes or GDEs can be sealed while other selected edges are left unsealed for gas or liquid ingress or egress, as required.

Figure 19:
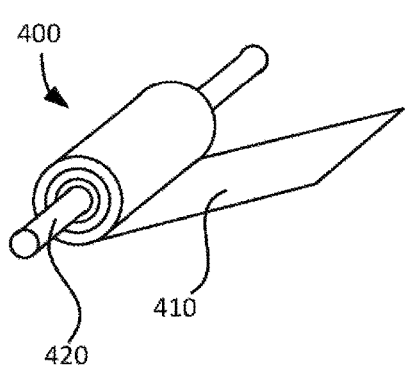
FIG. 19 schematically illustrates an example of how one or more flexible 3D electrodes can be rolled or spiral-wound.

FIG. 19 schematically illustrates an example partially produced spiral-wound cell, device or reactor 400. One or more flexible 3D electrodes or GDEs 410, for example a layered stack of flexible 3D electrodes or GDEs formed as anode-cathode pairs or series, can be rolled or spiral-wound about a central tube, conduit or section 420. Some applications may call for a single flexible 3D electrode or ODE to be rolled or wound.

Figure 20:
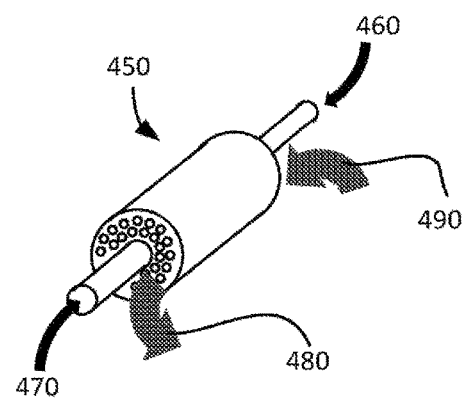
FIG. 20 schematically illustrates an example of how flexible 3D electrodes, for example after being stacked or layered as anode-cathode pairs, can be formed into an example spiral-wound cell or device.

FIG. 20 schematically illustrates an example of how flexible 3D electrodes or GDEs, for example after being stacked as anode-cathode pairs or series, can be formed into an example spiral-wound cell, device or reactor 450. To minimise the overall footprint of a cell, a multi-layered arrangement of flat-sheet flexible 3D electrodes may be rolled up into a spiral-wound cell 450. The spiral-wound cell 450 may then be encased in a casing, which still allows for electrolyte to transit through the cell 450. 3D electrodes or GDEs acting as anodes and cathodes can be attached to a central tube 420 in such a way that unsealed edges of the electrodes properly transport liquid/gases. For example, electrolyte can be introduced to the rolled 3D electrodes or GDEs at input edges 490, and electrolyte can exit the rolled 3D electrodes or GDEs at exit edges 480. Also for example, a gas or gases can be introduced to the rolled 3D electrodes or GDEs at gas input 460, and a gas or gases can exit the rolled 3D electrodes or GDEs at gas exit 470. The liquid and gas plumbing can vary depending on the specific structure or application.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

Optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The invention claimed is:

1. An electro-synthetic or fuel cell, comprising:
a liquid electrolyte;
a depolarizing gas in a gas region; and
a gas diffusion electrode, comprising:
a gas permeable porous membrane that is non-conductive and at least partially impermeable to the liquid electrolyte; and
a porous conductive material positioned on a liquid electrolyte side of the gas diffusion electrode;
wherein the membrane separates the electrolyte from the gas region; and
wherein a larger pressure is applied to the liquid electrolyte relative to the depolarizing gas in the gas region.

2. The cell of claim 1, wherein the membrane has a wetting pressure of at least 0.2 bar.

3. The cell of claim 1, wherein the porous conductive material is attached to the membrane.

4. The cell of claim 3, wherein the porous conductive material is attached to the membrane by being laminated to the membrane.

5. The cell of claim 3, wherein the porous conductive material is attached to the membrane by a binder mixture layer.

6. The cell of claim 5, wherein the binder mixture layer comprises a conductive material, a catalyst, and a binder polymer.

7. The cell of claim 6, wherein the binder mixture layer comprises carbon particles, metal particles, a catalyst material, and a polymeric binder.

8. The cell of claim 1, wherein the depolarizing gas is oxygen or hydrogen.

9. The cell of claim 7, wherein the catalyst material is present in the binder mixture layer in an amount from 20% to 50% by weight.

10. The cell of claim 1, wherein the depolarizing gas is oxygen and is introduced through the gas diffusion electrode or a second gas diffusion electrode.

11. The cell of claim 1, wherein the cell is a fuel cell and the depolarizing gas is oxygen gas which is introduced through the first gas diffusion electrode and hydrogen gas is introduced through a second gas diffusion electrode.

12. The cell of claim 11, wherein the liquid electrolyte includes sulphuric acid, and the first gas diffusion electrode is configured to operate as a cathode, and $SO_2$ or $NO_x$ gas is introduced through the second gas diffusion electrode, which is configured to operate as an anode.

13. The cell of claim 1, wherein the gas diffusion electrode is flexible.

14. The cell of claim 1, wherein bubbles of gas are not produced at the gas diffusion electrode.

15. The cell of claim 1, wherein the membrane has an average pore size of 50 nm to 500 nm and is formed of PTFE.

16. The cell of claim 9, wherein the porous conductive material is a metal mesh.

17. The cell of claim 1, wherein the membrane is made of a material selected from the group consisting of PTFE, ePTFE, polypropylene, polyethylene and polysulfone.

18. The cell of claim 1, wherein the cell is a spiral-wound cell.

19. An electro-synthetic or fuel cell, comprising:
a liquid electrolyte;
a depolarizing gas in a gas region; and
a gas diffusion electrode, comprising:
  a gas permeable porous membrane that is non-conductive and at least partially impermeable to the liquid electrolyte; and
  a porous conductive material positioned on a liquid electrolyte side of the gas diffusion electrode;
  wherein the membrane separates the electrolyte from the gas region;
  wherein the gas diffusion electrode includes a barrier layer having a permeability to the depolarizing gas that is greater than a permeability to a gaseous reactant solvent.

20. The cell of claim 19, wherein the barrier layer comprises a member of the group consisting of a polyolefin, a poly(methylpentene), an organosilicon polymer film, a fluorocarbon polymer, and a perfluorocarbon polymer.

21. A method for depolarizing an electrochemical cell comprising a liquid electrolyte; a gas region; and a first gas diffusion electrode comprising a gas permeable porous membrane that is non-conductive and at least partially impermeable to the liquid electrolyte; a porous conductive material positioned on a liquid electrolyte side of the gas diffusion electrode; wherein the membrane separates the electrolyte from the gas region, the method comprising delivering a depolarizing gas to the gas diffusion electrode via the gas region to gas depolarize the electrode, wherein a larger pressure is applied to the liquid electrolyte relative to the depolarizing gas in the gas region.

22. The method of claim 21, wherein the method is used in the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, (k) chlorine, or (l) caustic (in general).

23. The method of claim 21, further comprising producing hydrogen peroxide using a Dow-Huron process, wherein the depolarizing gas is oxygen or a mixture containing oxygen, the depolarizing gas is introduced through the gas diffusion electrode.

24. The method of claim 21, further comprising extracting oxygen from ambient atmospheric air with the gas diffusion electrode.

25. The method of claim 21, further comprising producing formate from $CO_2$ gas which is introduced through the gas diffusion electrode.

26. The method of claim 21, wherein the depolarizing gas changes a half-reaction that would occur at the gas diffusion electrode to a half-reaction that is energetically more favourable.

27. The method of claim 21, wherein the depolarizing gas is introduced through the gas diffusion electrode.

28. An electrochemical cell, comprising:
a counter-electrode;
an electrolyte chamber containing a liquid electrolyte on a liquid side of a multi-layered gas diffusion electrode; and
a gas region containing a depolarizing gas on a gas side of the multi-layered gas diffusion electrode;
wherein a larger pressure is applied to the liquid electrolyte relative to the depolarizing gas in the gas region:
the multi-layered gas diffusion electrode comprising at least three layers, including:
  a first layer that is porous, non-conductive, hydrophobic, and gas-permeable;
  a third layer that is porous, conductive, liquid-permeable and gas-permeable; and
  a second layer between and adhering to both the first layer and the third layer, the second layer comprising a binder and a conductive material;
wherein the hydrophobic first layer separates the gas region from the electrolyte chamber.

29. The cell of claim 28, wherein the first layer and the third layer are separate and distinct from one another.

30. The cell of claim 28, wherein the depolarizing gas is selected to be consumed at the multi-layered gas diffusion electrode while a second gas is produced at the counter-electrode.

* * * * *